United States Patent
Sudo et al.

(10) Patent No.: US 7,463,577 B2
(45) Date of Patent: Dec. 9, 2008

(54) OFDM COMMUNICATION METHOD AND OFDM COMMUNICATION DEVICE

(75) Inventors: Hiroaki Sudo, Yokohama (JP); Takatoshi Sugiyama, Musashino (JP); Yusuke Asai, Musashino (JP)

(73) Assignee: Panasonic Corporation, Osaka (JP)

( * ) Notice: Subject to any disclaimer, the term of this patent is extended or adjusted under 35 U.S.C. 154(b) by 783 days.

(21) Appl. No.: 10/488,610

(22) PCT Filed: Apr. 9, 2003

(86) PCT No.: PCT/JP03/04475

§ 371 (c)(1),
(2), (4) Date: Mar. 4, 2004

(87) PCT Pub. No.: WO03/085869

PCT Pub. Date: Oct. 16, 2003

(65) Prior Publication Data

US 2004/0233838 A1 Nov. 25, 2004

(30) Foreign Application Priority Data

Apr. 9, 2002 (JP) ............... 2002-106059
Apr. 9, 2002 (JP) ............... 2002-107105

(51) Int. Cl.
*H04J 11/00* (2006.01)
*H04J 1/00* (2006.01)
*H04Q 7/00* (2006.01)

(52) U.S. Cl. ............ 370/208; 370/334; 370/343

(58) Field of Classification Search .......... 370/203, 370/208, 210, 295, 319, 334, 339, 343, 349
See application file for complete search history.

(56) References Cited

U.S. PATENT DOCUMENTS

| | | | | |
|---|---|---|---|---|
| 6,496,144 B2 * | 12/2002 | Tanaka et al. | ............... | 342/378 |
| 6,801,586 B1 * | 10/2004 | Imamura | ............... | 375/340 |
| 6,850,481 B2 * | 2/2005 | Wu et al. | ............... | 370/208 |
| 6,985,434 B2 * | 1/2006 | Wu et al. | ............... | 370/208 |
| 7,039,004 B2 * | 5/2006 | Sun et al. | ............... | 370/208 |
| 2001/0018483 A1 | 8/2001 | Schulz et al. | | |
| 2001/0053143 A1 * | 12/2001 | Li et al. | ............... | 370/344 |
| 2003/0021332 A1 | 1/2003 | Li | | |
| 2007/0053282 A1 * | 3/2007 | Tong et al. | ............... | 370/208 |
| 2007/0253324 A1 * | 11/2007 | Ma et al. | ............... | 370/208 |

FOREIGN PATENT DOCUMENTS

| | | |
|---|---|---|
| JP | 2001036442 | 2/2001 |
| JP | 2001345777 | 12/2001 |
| JP | 2002044051 | 2/2002 |
| JP | 2002368718 | 12/2002 |

OTHER PUBLICATIONS

PCT International Search Report dated Jul. 22, 2003.

* cited by examiner

*Primary Examiner*—Brenda Pham
*Assistant Examiner*—Mon Cheri S Davenport
(74) *Attorney, Agent, or Firm*—Dickinson Wright, PLLC

(57) ABSTRACT

When OFDM signals are transmitted from a plurality of antennas, a pilot carrier is transmitted from one antenna among the plurality of antennas, and a null signal is transmitted from an antenna other than that antenna by a subcarrier of the frequency band that transmits the pilot carrier.

2 Claims, 56 Drawing Sheets

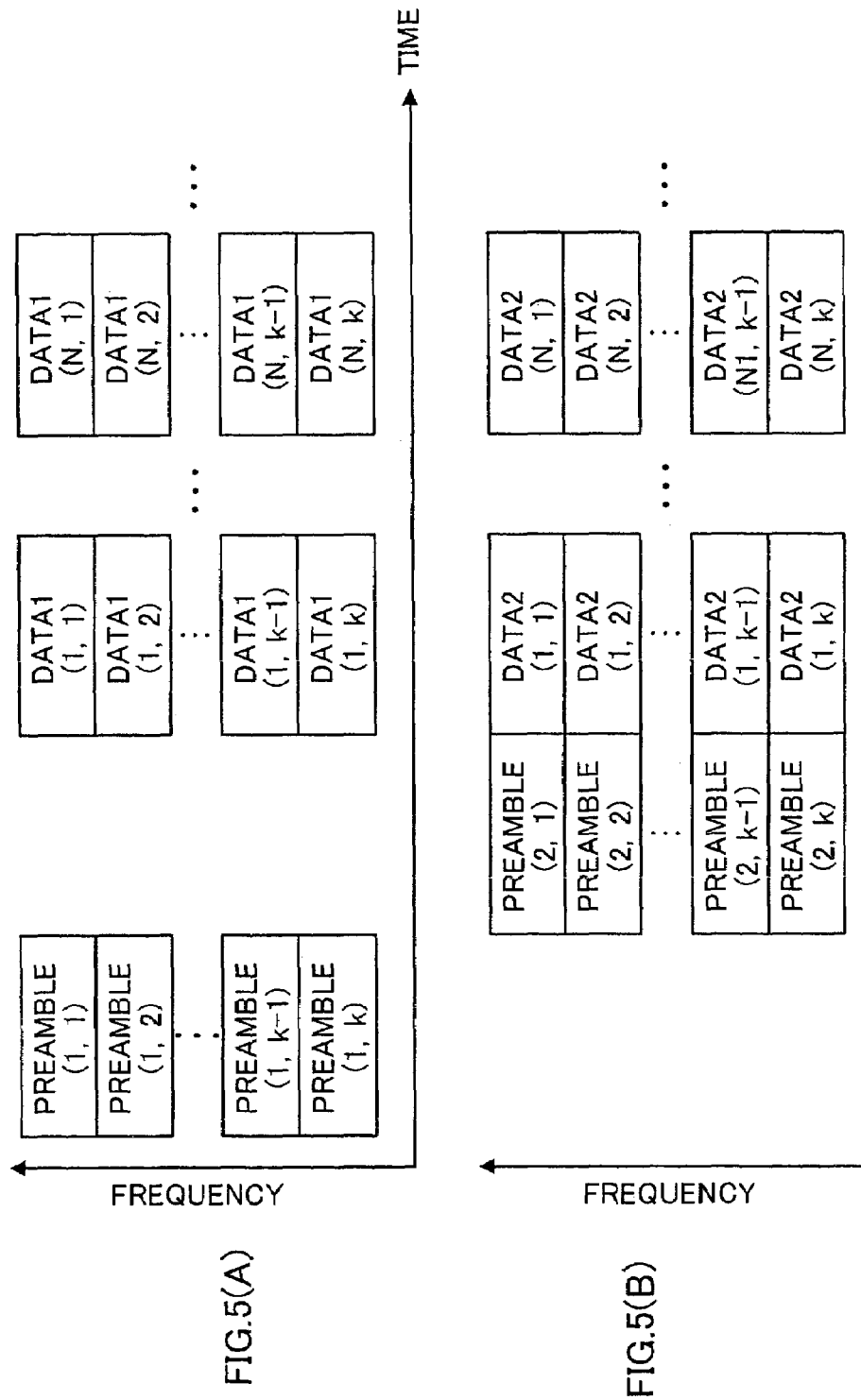

OFDM COMMUNICATION METHOD AND OFDM COMMUNICATION DEVICE

TECHNICAL FIELD

The present invention relates to a technology for transmitting a plurality of OFDM signals with different data respectively superimposed thereupon using a plurality of antennas.

BACKGROUND ART

Recently, multi-antenna communication such as MIMO (Multi Input Multi Output) has attracted attention as a technology that enables large volumes of data to be transmitted at high speed. It has consequently been considered possible to achieve extremely high-speed data transmission by combining OFDM (Orthogonal Frequency Division Multiplexing) and multi-antenna communication. However, data error rate characteristics degrade unless highly precise propagation path compensation and interference compensation are carried out on the receiving side.

Thus, with this kind of OFDM communication method, a received signal with good error rate characteristics can be obtained by creating pilot carriers by superimposing known signals such as pilot symbols on predetermined subcarriers on the transmitting side, as shown in FIG. 1, and compensating for propagation path distortion such as frequency offset of each subcarrier on the receiving side based on these pilot carriers.

Also, with an OFDM communication method, an OFDM signal with a propagation path estimation preamble placed on each subcarrier is transmitted by the transmitting side, and compensation of phase rotation of each subcarrier is performed on the receiving side based on this propagation path estimation preamble.

Actually, a transmitting apparatus transmits a burst unit signal such as that shown in FIG. 2, for example. As shown in FIG. 2, a burst unit signal includes guard intervals (GI), a propagation path estimation preamble, and an information signal (DATA1, . . . ). In a burst unit signal, the propagation path estimation preamble is subjected to IFFT (inverse fast Fourier transform) processing, and the information signal is subjected to predetermined modulation processing and IFFT processing.

The receiving-side apparatus detects the FFT (fast Fourier transform) processing start timing by calculating a correlation value between the IFFT-processed propagation path estimation preamble and the propagation path estimation preamble in the received burst unit signal (received signal). The receiving-side apparatus then extracts the propagation path estimation preamble and information signal from the received signal by performing FFT processing on the received signal in accordance with the detected start timing. The receiving-side apparatus also performs propagation path estimation using the extracted propagation path estimation preamble, and performs information signal demodulation using the result of propagation path estimation. By this means, the receiving-side apparatus can extract a demodulated signal.

The principle of transmission/reception by an OFDM communication apparatus using MIMO technology will now be explained using FIG. 3. FIG. 3 illustrates a case where OFDM signals are transmitted from an OFDM communication apparatus (TX) 1 that has two antennas AN1 and AN2 to an OFDM communication apparatus (RX) 2 that has two antennas AN3 and AN4. Signals transmitted from antennas AN1 and AN2 of OFDM communication apparatus 1 are here designated TX1 and TX2 respectively, and signals received by antennas AN3 and AN4 of OFDM communication apparatus 2 are designated RX1 and RX2 respectively. Received signals RX1 and RX2 can then be expressed by the following equations.

$$RX1 = ATX1 + BTX2 \quad (1)$$

$$RX2 = CTX1 + DTX2 \quad (2)$$

In Equation (1) and Equation (2), A denotes the propagation path characteristic between transmitting antenna AN1 and receiving antenna AN3, B denotes the propagation path characteristic between transmitting antenna AN2 and receiving antenna AN3, C denotes the propagation path characteristic between transmitting antenna AN1 and receiving antenna AN4, and D denotes the propagation path characteristic between transmitting antenna AN2 and receiving antenna AN4.

FIGS. 4(A) and (B) and FIGS. 5(A) and (B) show the frame formats of OFDM transmit signals transmitted from OFDM communication apparatus 1. FIGS. 4(A) and (B) show frame formats focusing on pilot carriers, and FIGS. 5(A) and (B) show frame formats focusing on propagation path estimation preambles. That is to say, the OFDM signal shown in FIG. 4(A) is transmitted from antenna AN1, and the OFDM signal shown in FIG. 4(B) is transmitted from antenna AN2. In FIGS. 4(A) and (B), DATA1(N,K), for example, indicates that the N'th symbol relating to data 1 is transmitted by the K'th subcarrier at the time and frequency indicated by DATA1. In FIGS. 5(A) and (B), propagation path estimation preamble (1, k) indicates that the 1st symbol of the propagation path estimation preamble is transmitted by the k'th subcarrier at the time and frequency indicated by propagation path estimation preamble (1, k).

In order to demodulate above transmit signals TX1 and TX2 from the received signals, it is necessary to estimate the four propagation path characteristics A, B, C, and D. For this purpose, OFDM communication apparatus 1 inserts propagation path estimation preambles in the transmit signals or transmits OFDM signals with specific subcarriers as pilot carriers. On receiving these OFDM signals, OFDM communication apparatus 2 obtains propagation path characteristics based on these propagation path estimation preambles or pilot carriers.

The four propagation path characteristics A through D can be estimated by OFDM communication apparatus 2 (FIG. 3) as follows. For propagation path characteristic A, a propagation path estimation preamble transmitted from antenna AN1 is received at antenna AN3, and propagation path characteristic A is found by a signal processing section corresponding to antenna AN3. For characteristic B, a propagation path estimation preamble transmitted from antenna AN2 is received at antenna AN3, and characteristic B is found by the signal processing section corresponding to antenna AN3. For characteristic C, a propagation path estimation preamble transmitted from antenna AN1 is received at antenna AN4, and propagation path characteristic C is found by a signal processing section corresponding to antenna AN4. For characteristic D, a propagation path estimation preamble transmitted from antenna AN2 is received at antenna AN4, and characteristic D is found by the signal processing section corresponding to antenna AN4.

OFDM communication apparatus 2 can perform demodulation of signals TX1 and TX2 transmitted from antennas AN1 and AN2 by performing the processing shown in the following equations, using the four estimated propagation path characteristics A through D.

$$DRX1(AD-BC) - BRX2/(AD-BC) = \qquad(3)$$
$$D(ATX1+BTX2)/(AD-BC) - B(DTX1+DTX2)/(AD-BC) =$$
$$(ADTX1+BDTX2-BCTX1-BDTX2)/(AD-BC) = TX1$$

$$-CRX1/(AD-BC) - ARX2/(AD-BC) = \qquad(4)$$
$$-C(ATX1+BTX2)/(AD-BC) + A(CTX1+DTX2)/(AD-BC) =$$
$$(-ACTX1-BCTX2+ACTX1-ADTX2)/(AD-BC) = TX2$$

Propagation path estimation preambles are actually transmitted as follows. A propagation path estimation preamble is not transmitted from antenna AN2 during the time when a propagation path estimation preamble is being transmitted from antenna AN1. Similarly, a propagation path estimation preamble is not transmitted from antenna AN1 during the time when a propagation path estimation preamble is being transmitted from antenna AN2.

In general, a pilot carrier is used to compensate for residual phase error due to frequency offset detection error, etc. That is to say, during reception, residual phase error is detected using a known signal (pilot signal) multiplexed in a pilot carrier, and compensated for. Actually, specific subcarriers are transmitted as pilot carriers, as shown in FIGS. 4(A) and (B). In the example shown in FIGS. 4(A) and (B), of 2k+1 subcarriers, four antenna AN1 subcarriers are transmitted as pilot carriers.

FIG. 6 shows the configuration of the transmitting system of OFDM communication apparatus 1. In transmitting system 10, a transmit signal is first coded by a coding section 11. The coded signal is subjected to preamble insertion by a preamble insertion section 12, and is then subjected to insertion of a known signal (pilot signal) by a pilot carrier insertion section 13 at positions at which specific subcarriers are pilot carriers.

After undergoing modulation processing by a modulation section 14, the signal is divided into two by being subjected to serial/parallel conversion by a serial/parallel conversion section (S/P) 15. The two divided signals undergo inverse fast Fourier transform processing by inverse fast Fourier transform sections (IFFTs) 16 and 17 respectively, thereby being orthogonal frequency division multiplexed by IFFTs 16 and 17, and OFDM signals are obtained. IFFT 16 output signal 1 is superimposed on a carrier of a predetermined frequency by a radio transmitting section (not shown), and then transmitted from antenna AN1 (FIG. 3). Similarly, IFFT 17 output signal 2 is superimposed on a carrier of a predetermined frequency by a radio transmitting section (not shown), and then transmitted from antenna AN2 (FIG. 3).

FIG. 7 shows the configuration of the receiving system of OFDM communication apparatus 2 (FIG. 3). In receiving system 20, a received signal received by antenna AN3 is input via a radio receiving section (not shown) to a fast Fourier transform section (FFT) 21 as input signal 1, and a received signal received by antenna AN4 is input via a radio receiving section (not shown) to a fast Fourier transform section (FFT) 22 as input signal 2.

FFT 21 obtains a received signal for each subcarrier by executing fast Fourier transform processing on input signal 1. The received signals of each subcarrier obtained by FFT 21 are sent to a propagation path estimation section 25, and propagation path compensation and interference compensation sections 24 and 26. Input signal 2 is converted to received signals for each subcarrier by FFT 22, and these signals are sent to propagation path estimation section 25, and propagation path compensation and interference compensation sections 26 and 24.

Propagation path estimation section 23 estimates propagation path characteristics A and B described above with regard to FIG. 3 based on the preambles inserted in the received signals. Similarly, propagation path estimation section 25 estimates propagation path characteristics C and D based on the preambles inserted in the received signals.

A coefficient calculation section 27 uses propagation path characteristics A through D obtained by propagation path estimation sections 23 and 25 to find coefficients A/(AD−BC), B/(AD−BC), C/(AD−BC), and D/(AD−BC). Coefficient calculation section 27 is configured as shown in FIG. 8. The four propagation path characteristics A to D obtained by propagation path estimation sections 23 and 25 are stored in memories 41 to 44 respectively. AD is obtained by a multiplication section 46, and BC is obtained by a multiplication section 45. AD−BC is obtained by a subtraction section 47. A/(AD−BC), B/(AD−BC), C/(AD−BC), and D/(AD−BC) are obtained by division sections 48, 49, 50, and 51, respectively.

We will now return to FIG. 7 to continue the explanation. Propagation path compensation and interference compensation section 24 forms a received signal TX1 that has undergone propagation path compensation and interference compensation by performing the computation shown in Equation (3) on the received signals using the coefficients found by coefficient calculation section 27. Similarly, propagation path compensation and interference compensation section 26 forms a received signal TX2 that has undergone propagation path compensation and interference compensation by performing the computation shown in Equation (4) on the received signals using the coefficients found by coefficient calculation section 27.

Received signal TX1 that has undergone propagation path compensation and interference compensation is sent to a residual phase error detection section 28 and phase compensation section 29, and received signal TX2 that has undergone propagation path compensation and interference compensation is similarly sent to residual phase error detection section 28 and phase compensation section 30. Residual phase error detection section 28 detects residual phase error in the two received signals TX1 and TX2 using a known signal transmitted by pilot carriers, and sends this to phase compensation sections 29 and 30.

Phase compensation sections 29 and 30 perform phase compensation processing by rotating the phase by the residual phase error amount for received signals TX1 and TX2 respectively. The two phase-compensated received signals are converted to a serial signal by a parallel/serial conversion section (P/S) 31, and a received signal corresponding to the transmit signal is obtained by decoding this serial signal in a decoding section 32.

However, with a conventional OFDM communication apparatus, as can be seen from FIGS. 4(A) and (B), data transmitted from one antenna is superimposed as interference on known signals (pilot carriers) transmitted from the other antenna. Therefore, the interference component superimposed on known signals must be eliminated in order to detect residual phase error.

However, when inter-code interference, timing error, and frequency offset detection error are present due to multipath propagation, interference elimination characteristics degrade. As a result, an interference component remains in known signals, causing a problem of major degradation of error rate characteristics.

Moreover, with a conventional OFDM communication apparatus, as shown in FIGS. 5(A) and (B), the time at which a propagation path estimation preamble is transmitted differs for transmitting antenna AN1 and transmitting antenna AN2.

Consequently, if there is residual phase error in received signals RX1 and RX2 obtained by the two receiving antennas AN3 and AN4, there will be residual phase error in the propagation path estimation results estimated with the propagation path estimation preambles. When residual phase error is present, that residual phase error becomes propagation path estimation error, resulting in major degradation of error rate characteristics on the receiving side. Thus, a defect of this kind of conventional OFDM communication apparatus is that error rate characteristics degrade significantly when residual phase error is present.

DISCLOSURE OF INVENTION

It is an object of the present invention to provide an OFDM communication method and OFDM communication apparatus in which error rate characteristics are improved by preventing degradation of the precision of detection of residual phase error due to reception of interference by a known signal (pilot carrier), and also to suppress deviation of residual phase error of propagation path estimation results due to propagation path estimation preamble time differences, when OFDM communication and multi-antenna communication are combined.

This object is achieved by inserting null signals as appropriate in OFDM signals when OFDM signals in which different data are superimposed are transmitted from a plurality of antennas and a known signal is transmitted by means of specific subcarriers of those OFDM signals.

As the relationship between a known signal and null signal, firstly, a pilot carrier is transmitted from only one of the plurality of antennas, and a null signal is transmitted by a subcarrier of the frequency band in which a pilot carrier is transmitted from an antenna other than that antenna. By this means, it is possible to prevent degradation of the precision of detection of residual phase error due to known signal (pilot carrier) interference.

Secondly, with regard to subcarriers of the same frequency of the same time among a plurality of OFDM signals, a propagation path estimation preamble is placed on one subcarrier and a null signal is placed on other subcarriers, and a propagation path estimation preamble is placed on at least one subcarrier in each OFDM signal. By this means, it is possible to suppress deviation of residual phase error of propagation path estimation results due to propagation path estimation preamble time differences.

BRIEF DESCRIPTION OF DRAWINGS

FIG. 5(A) is a drawing showing the relationship between propagation path estimation preambles and data signals in a conventional OFDM signal;

FIG. 5(B) is a drawing showing the relationship between propagation path estimation preambles and data signals in a conventional OFDM signal;

BEST MODE FOR CARRYING OUT THE INVENTION

With reference now to the accompanying drawings, embodiments of the present invention will be explained in detail below.

In Embodiments 1 through 22, the relationship between pilot carriers, null signals, and data signals according to the present invention is explained, and in Embodiments 23 through 26, the relationship between propagation path estimation preambles, null signals, and data signals according to the present invention is explained.

Embodiment 1

Figure 9B:
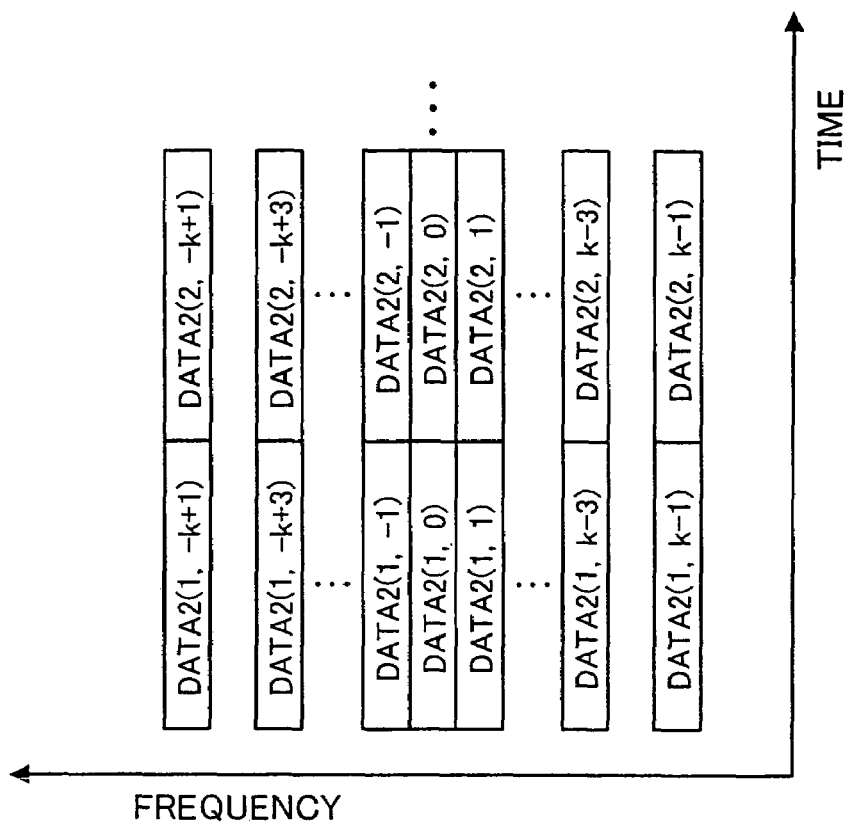
FIG. 9(B) is a drawing showing the relationship between null signals and data signals in an OFDM signal of Embodiment 1.
Figure 9A:
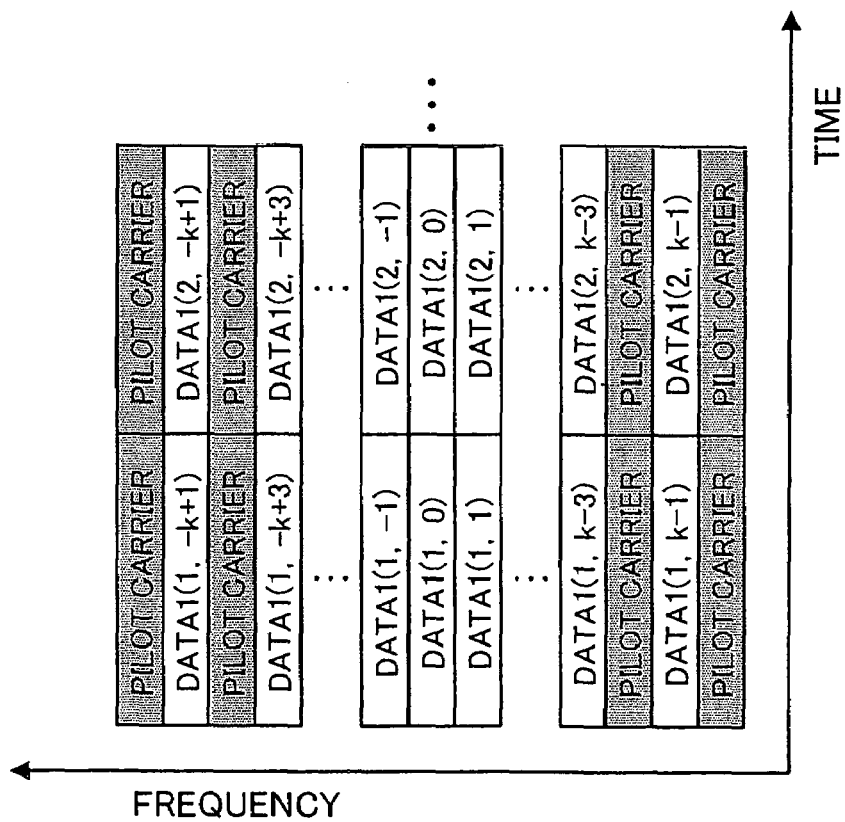
FIG. 9(A) is a drawing showing the relationship between pilot carriers and data signals in an OFDM signal of Embodiment 1.

FIGS. 9(A) and (B) show schematic diagrams of OFDM signals transmitted from an OFDM communication apparatus of Embodiment 1 of the present invention. In this embodiment, a case is described in which two OFDM signals are formed from two different transmit data, and these are transmitted from different antennas. The OFDM signal shown in FIG. 9(A) is an OFDM signal on which first transmit data (DATA1) is superimposed, and is transmitted from a first antenna. The OFDM signal shown in FIG. 9(B) is an OFDM signal on which second transmit data (DATA2) is superimposed, and is transmitted from a second antenna.

In this embodiment, as shown in FIGS. 9(A) and (B), specific subcarriers of one antenna are used as pilot carriers on which a known signal is superimposed, while pilot carriers are not output from the other antenna, and in the case of this other antenna subcarriers of the same frequency as the pilot carriers are used as subcarriers on which a null signal is superimposed (that is to say, subcarriers comprising only a carrier, with no signal whatever superimposed). By this means, an interference-free known signal can be received on the receiving side due to the fact that pilot carriers do not receive interference on the propagation path.

In FIGS. 9(A) and (B), DATA1(N,K), for example, indicates that the N'th symbol relating to data 1 is transmitted by the K'th subcarrier at the time and frequency indicated by DATA1. Therefore, in this embodiment, of 2k+1 subcarriers, four antenna AN1 subcarriers are transmitted as pilot carriers.

Figure 10:
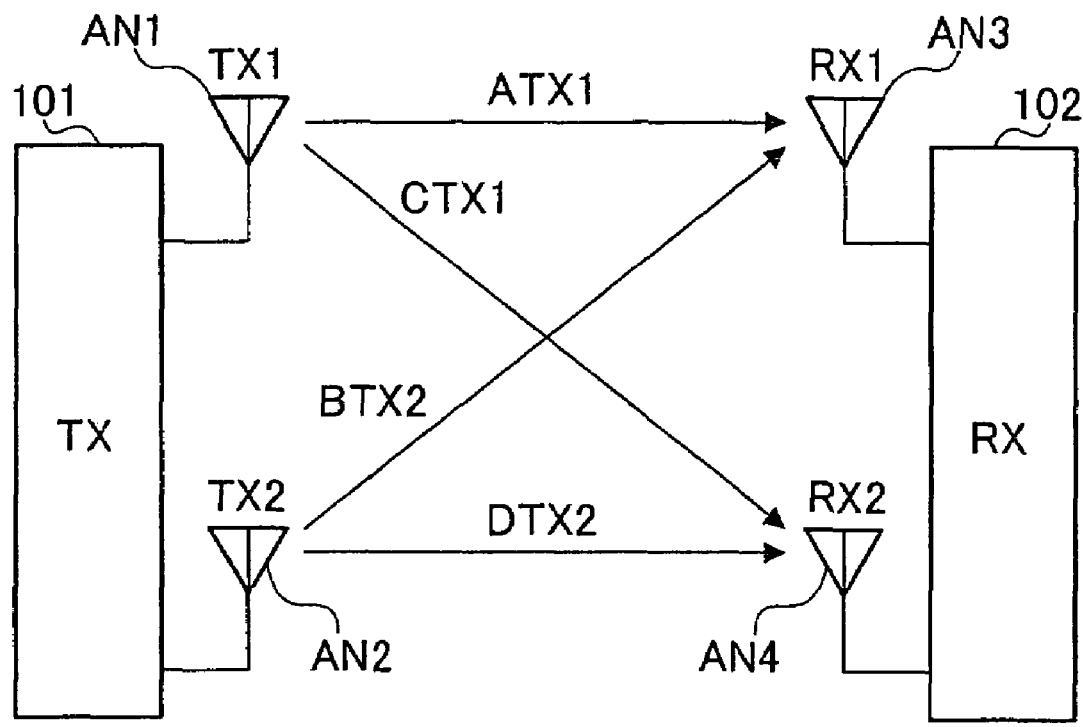
FIG. 10 is a drawing showing the overall configuration of an OFDM communication system according to Embodiment 1.

FIG. 10 shows the configuration of an OFDM communication system that uses OFDM communication apparatuses of Embodiment 1. FIG. 10 illustrates a case where OFDM signals are transmitted from an OFDM communication apparatus (TX) 101 that has two antennas AN1 and AN2 to an OFDM communication apparatus (RX) 102 that has two antennas AN3 and AN4. If signals transmitted from antennas AN1 and AN2 are here designated TX1 and TX2 respectively, and signals received by antennas AN3 and AN4 are designated RX1 and RX2 respectively, then received signals RX1 and RX2 can be expressed by the following equations.

$$RX1 = ATX1 + BTX2 \quad (5)$$

$$RX2 = CTX1 + DTX2 \quad (6)$$

In Equation (5) and Equation (6), A denotes the propagation path characteristic between transmitting antenna AN1 and receiving antenna AN3, B denotes the propagation path characteristic between transmitting antenna AN2 and receiving antenna AN3, C denotes the propagation path characteristic between transmitting antenna AN1 and receiving antenna AN4, and D denotes the propagation path characteristic between transmitting antenna AN2 and receiving antenna AN4.

In order to demodulate transmit signals TX1 and TX2 from the received signals, it is necessary to estimate the four propagation path characteristics A, B, C, and D. Thus, OFDM communication apparatus 101 transmits propagation path estimation preambles from antennas AN1 and AN2. Propagation path estimation preambles are actually transmitted as follows. A propagation path estimation preamble is not transmitted from antenna AN2 during the time when a propagation path estimation preamble is being transmitted from antenna AN1. Similarly, a propagation path estimation preamble is not transmitted from antenna AN1 during the time when a propagation path estimation preamble is being transmitted from antenna AN2.

The four propagation path characteristics A through D can be estimated by OFDM communication apparatus 102 as follows, using the propagation path estimation preambles. For propagation path characteristic A, a propagation path estimation preamble transmitted from antenna AN1 is received at antenna AN3, and propagation path characteristic A is found by a signal processing section corresponding to antenna AN3. For characteristic B, a propagation path estimation preamble transmitted from antenna AN2 is received at antenna AN3, and characteristic B is found by the signal processing section corresponding to antenna AN3. For characteristic C, a propagation path estimation preamble transmitted from antenna AN1 is received at antenna AN4, and propagation path characteristic C is found by a signal processing section corresponding to antenna AN4. For characteristic D, a propagation path estimation preamble transmitted from antenna AN2 is received at antenna AN4, and characteristic D is found by the signal processing section corresponding to antenna AN4.

OFDM communication apparatus 102 can perform receive demodulation of signals TX1 and TX2 transmitted from antennas AN1 and AN2 by performing the processing shown in the following equations, using the four estimated propagation path characteristics A through D.

$$DRX1(AD - BC) - BRX2/(AD - BC) = \quad (7)$$
$$D(ATX1 + BTX2)/(AD - BC) - B(DTX1 + DTX2)/(AD - BC) =$$
$$(ADTX1 + BDTX2 - BCTX1 - BDTX2)/(AD - BC) = TX1$$

$$-CRX1/(AD - BC) - ARX2/(AD - BC) = \quad (8)$$
$$-C(ATX1 + BTX2)/(AD - BC) + A(CTX1 + DTX2)/(AD - BC) =$$
$$(-ACTX1 - BCTX2 + ACTX1 - ADTX2)/(AD - BC) = TX2$$

The pilot carriers are used to compensate for residual phase error due to frequency offset detection error, etc. That is to say, during reception, residual phase error is detected using a known signal (pilot signal) multiplexed in a pilot carrier, and residual phase error due to frequency offset detection error, etc., is compensated for.

Figure 11:
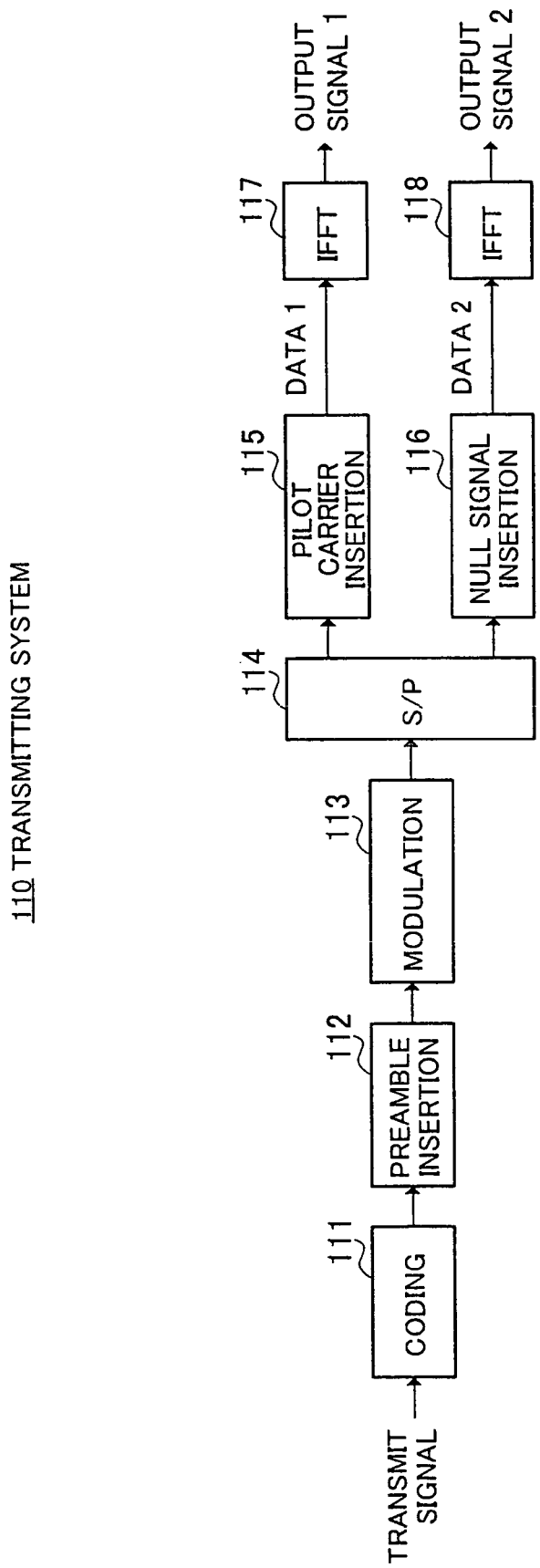
FIG. 11 is a block diagram showing the configuration of the transmitting system of an OFDM communication apparatus according to Embodiment 1.

FIG. 11 is a block diagram showing the configuration of the transmitting system of OFDM communication apparatus 101. In FIG. 11, reference numeral 110 indicates the overall configuration of the transmitting system of OFDM communication apparatus 101 according to Embodiment 1 of the present invention. A transmit signal is input to a coding section 111 and undergoes coding processing by that coding section 111, and the signal that has undergone coding processing is sent to a preamble insertion section 112.

In this embodiment, the transmit signal is a signal in which two data, data 1 and data 2, are alternately time division multiplexed on a frame-by-frame basis. For example, a signal comprising N symbols of data 1 is input to coding section 111 during a period T, and then N symbols of data 2 are input to coding section 111 during the next period T.

Preamble insertion section 112 inserts propagation path estimation preambles at predetermined positions so that a propagation path estimation preamble is not transmitted from antenna AN2 during the time when a propagation path estimation preamble is being transmitted from antenna AN1, and a propagation path estimation preamble is not transmitted from antenna AN1 during the time when a propagation path estimation preamble is being transmitted from antenna AN2, as described above.

A modulation section 113 executes digital modulation processing such as BPSK (Binary Phase Shift Keying), QPSK (Quadrature Phase Shift Keying), or 16-value QAM (Quadrature Amplitude Modulation), for example, on the input data. The modulated signal is divided into data 1 and data 2 by a serial/parallel conversion section (S/P) 114, and data 1 is sent to a pilot carrier insertion section 115 while data 2 is sent to a null signal insertion section 116.

Pilot carrier insertion section 115 inserts a known signal at predetermined positions in data 1. Null signal insertion section 116 inserts a null signal (that is, a signal with a signal level of 0) in data 2 at positions corresponding to the positions at which a known signal is inserted by pilot carrier insertion section 115.

IFFTs 117 and 118 perform frequency division multiplexing by executing inverse fast Fourier transform processing on input data 1 and data 2 respectively, and form OFDM signals as shown in FIGS. 9(A) and (B). Output signals 1 and 2 resulting from inverse fast Fourier transform processing are superimposed on carriers of predetermined frequency by multipliers (not shown), band-limited to a predetermined frequency band by band-pass filters, and then transmitted from antennas AN1 and AN2 respectively.

Figure 12:
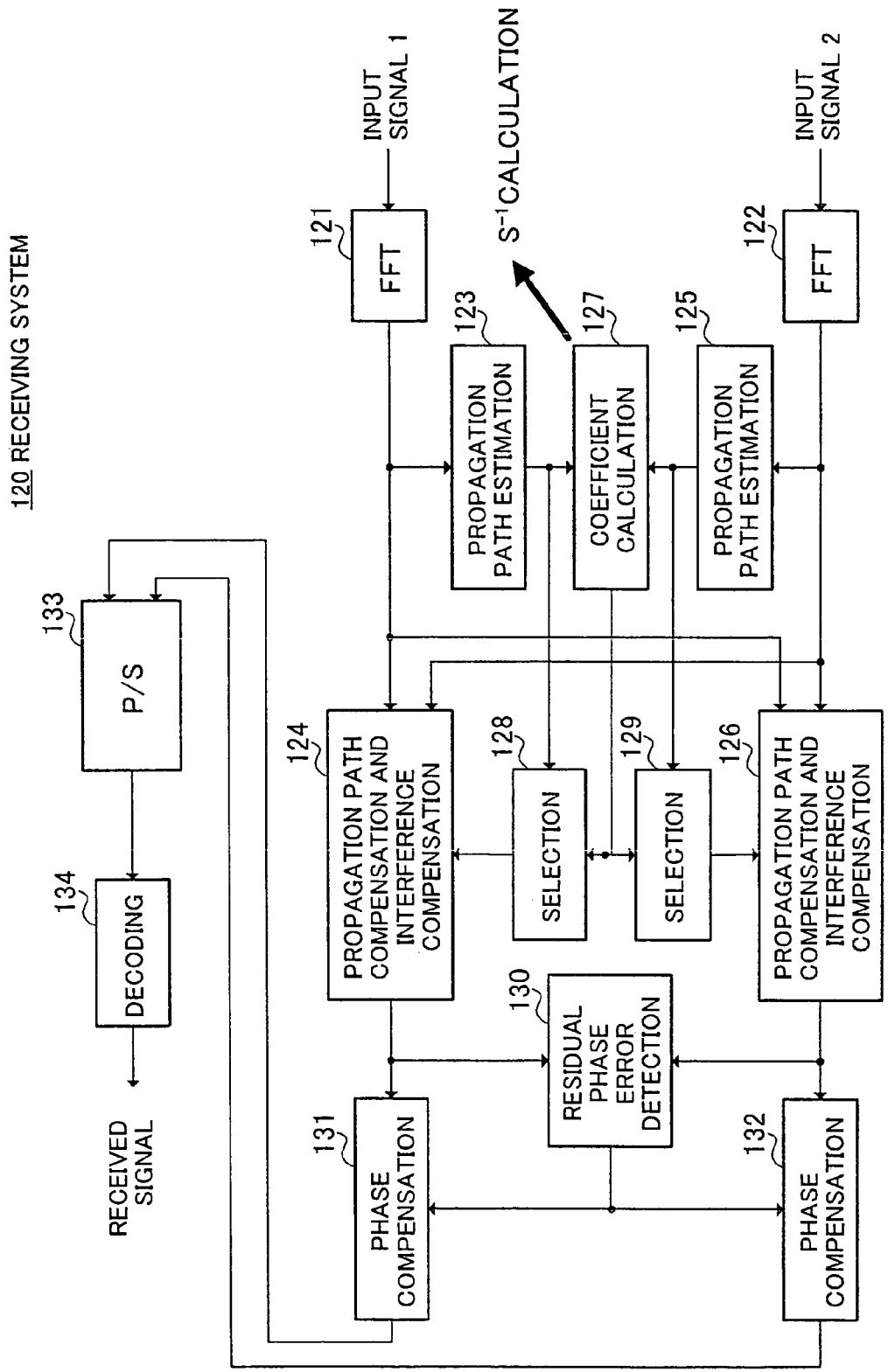
FIG. 12 is a block diagram showing the configuration of the receiving system of an OFDM communication apparatus according to Embodiment 1.

FIG. 12 shows the configuration of the receiving system of OFDM communication apparatus 102 that receives OFDM signals transmitted from OFDM communication apparatus 101 that has transmitting system 110 shown in FIG. 11. In receiving system 120, a received signal received by antenna AN3 is input via a radio receiving section (not shown) to a fast Fourier transform section (FFT) 121 as input signal 1, and a received signal received by antenna AN4 is input via a radio receiving section (not shown) to a fast Fourier transform section (FFT) 122 as input signal 2.

FFT 121 obtains a received signal for each subcarrier by executing fast Fourier transform processing on input signal 1. The received signals of each subcarrier obtained by FFT 121 are sent to a propagation path estimation section 123, and propagation path compensation and interference compensation sections 124 and 126. Input signal 2 is converted to received signals for each subcarrier by FFT 122, and these signals are sent to propagation path estimation section 125, and propagation path compensation and interference compensation sections 126 and 124.

Propagation path estimation section 123 estimates propagation path characteristics A and B described above with regard to FIG. 10 based on the preambles inserted in the received signals. Similarly, propagation path estimation section 125 estimates propagation path characteristics C and D based on the preambles inserted in the received signals.

A coefficient calculation section 127 uses propagation path characteristics A, B, C, and D obtained by propagation path estimation sections 123 and 125 to find coefficients A/ (AD–BC), B/ (AD–BC), C/ (AD–BC), and D/(AD–BC). Coefficient calculation section 127 has the same configuration as coefficient calculation section 27 described above with regard to FIG. 8, and therefore a detailed description thereof is omitted here.

Propagation path compensation and interference compensation section 124 forms a received signal TX1 that has undergone propagation path compensation and interference compensation by performing the computation shown in Equation (7) on the received signals using the coefficients found by coefficient calculation section 127. Similarly, propagation path compensation and interference compensation section 126 forms a received signal TX2 that has undergone propagation path compensation and interference compensation by performing the computation shown in Equation (8) on the received signals using the coefficients found by coefficient calculation section 127.

The coefficients found by coefficient calculation section 127 are subjected to selection by selection: sections 128 and 129, and the selected coefficients are input to propagation path compensation and interference compensation sections 124 and 126. Specifically, selection sections 128 and 129 select propagation path estimation results in the case of a known signal and in the case of data, and output these to propagation path compensation and interference compensation sections 124 and 126.

Received signal TX1 that has undergone propagation path compensation and interference compensation is sent to a residual phase error detection section 130 and phase compensation section 131, and received signal TX2 that has undergone propagation path compensation and interference compensation is similarly sent to residual phase error detection section 130 and phase compensation section 132. Residual phase error detection section 130 detects residual phase error in the two received signals TX1 and TX2 using a known signal transmitted by pilot carriers, and sends this to phase compensation sections 131 and 132.

Phase compensation sections 131 and 132 perform phase compensation processing by rotating the phase by the residual phase error amount for received signals TX1 and TX2 respectively. The two phase-compensated received signals are converted to a serial signal by a parallel/serial conversion section (P/S) 133, and a received signal corresponding to the transmit signal is obtained by decoding this serial signal in a decoding section 134.

In the above configuration, OFDM communication apparatus 101 transmits an OFDM signal with predetermined subcarriers as pilot carriers from one antenna, AN1, (FIG. 9(A)), and transmits an OFDM signal with predetermined subcarriers corresponding to the pilot carriers as null signals from the other antenna, AN2, (FIG. 9(B)).

As a result, a known signal does not receive interference due to data signals on the propagation path, and therefore OFDM communication apparatus 102 that receives and demodulates OFDM signals no longer needs to perform interference compensation for the known signal. Specifically, to give an explanation with reference to receiving system 120, for subcarriers that transmit a known signal, propagation path compensation and interference compensation sections 124 and 126 perform only propagation path compensation using the propagation path estimation results obtained by propagation path estimation sections 123 and 125 and coefficient calculation section 127, and do not need to perform interference compensation.

Residual phase error detection section 130 can detect residual phase error in the two received signals TX1 and TX2 based on a known signal virtually unaffected by interference, enabling highly precise residual phase error to be obtained. As a result, phase compensation sections 131 and 132 that perform residual phase error phase compensation can perform phase compensation using highly precise residual phase error detection results, ultimately enabling a received signal with improved error rate characteristics to be obtained.

According to the above configuration, when OFDM signals are transmitted from a plurality of antennas AN1 and AN2, by using specific subcarriers of one antenna, AN1, as pilot carriers on which a known signal is superimposed, and not outputting pilot carriers from the other antenna, AN2, and using subcarriers from this antenna of the same frequency as the pilot carriers as subcarriers on which a null signal is superimposed, it is possible to prevent interference on the pilot carrier propagation path, enabling highly precise residual phase error to be detected. As a result, a received signal with improved error rate characteristics can be obtained.

In this embodiment, a case has been described in which two OFDM signals are transmitted from two antennas AN1 and AN2, and are received by two antennas AN3 and AN4, but the present invention is not limited to this, and can be applied to cases where any number of OFDM signals are transmitted using any number of antennas. This also applies to embodiments described hereinafter.

Embodiment 2

Figure 13B:
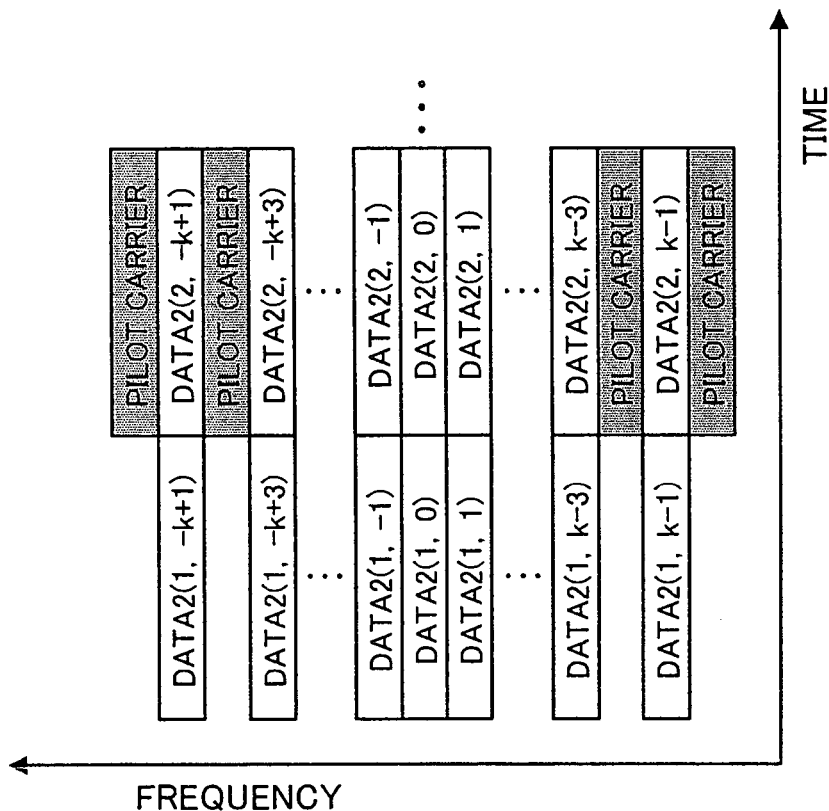
FIG. 13(B) is a drawing showing the relationship between pilot carriers, null signals, and data signals in an OFDM signal of Embodiment 2.
Figure 13A:
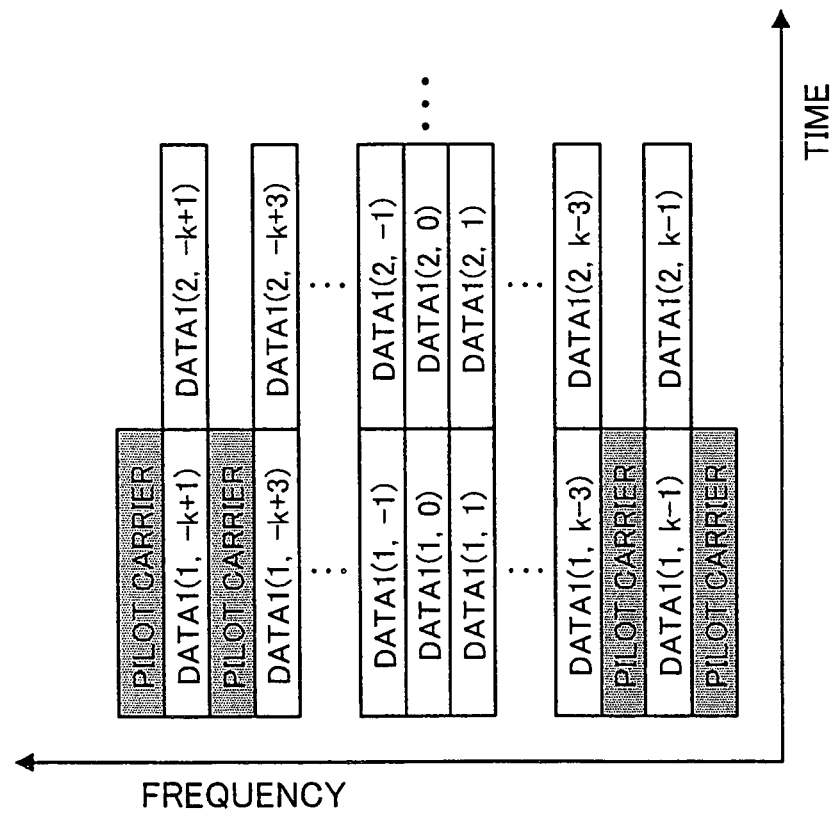
FIG. 13(A) is a drawing showing the relationship between pilot carriers, null signals, and data signals in an OFDM signal of Embodiment 2.

A special feature of an OFDM communication apparatus of this embodiment is that the antenna that transmits pilot carriers is made variable, as shown in FIGS. 13(A) and (B). By this means it is possible to detect residual phase error with much greater precision than in Embodiment 1.

When one OFDM communication apparatus is installed in a mobile station and the speed of movement of that mobile station is slow, or when both OFDM communication apparatuses are installed in radio base stations, for example, channel fluctuation is very slow. If the pilot carrier level falls markedly in such cases, that state is likely to continue for a long period. As a result, the reception level of a known signal superimposed on a pilot carrier also continues to be low, and therefore the precision of detection of residual phase error found based on a known signal may also fall for a long period.

Taking this into consideration, in this embodiment OFDM signals with the frame formats shown in FIGS. 13(A) and (B) are transmitted from antenna AN1 and antenna AN2. As can be seen from FIGS. 13(A) and (B), pilot carriers are not transmitted from only one antenna, but instead the antenna that transmits pilot carriers is switched alternately. Also, while pilot carriers are being transmitted from one antenna, the other antenna transmits null signals as subcarriers corresponding thereto.

By this means, known signals are transmitted alternately from two antennas with different propagation paths, preventing the known signal reception level from becoming low for a long period. As a result, it is possible to prevent degradation of residual phase error detection precision over a long period.

Figure 14:
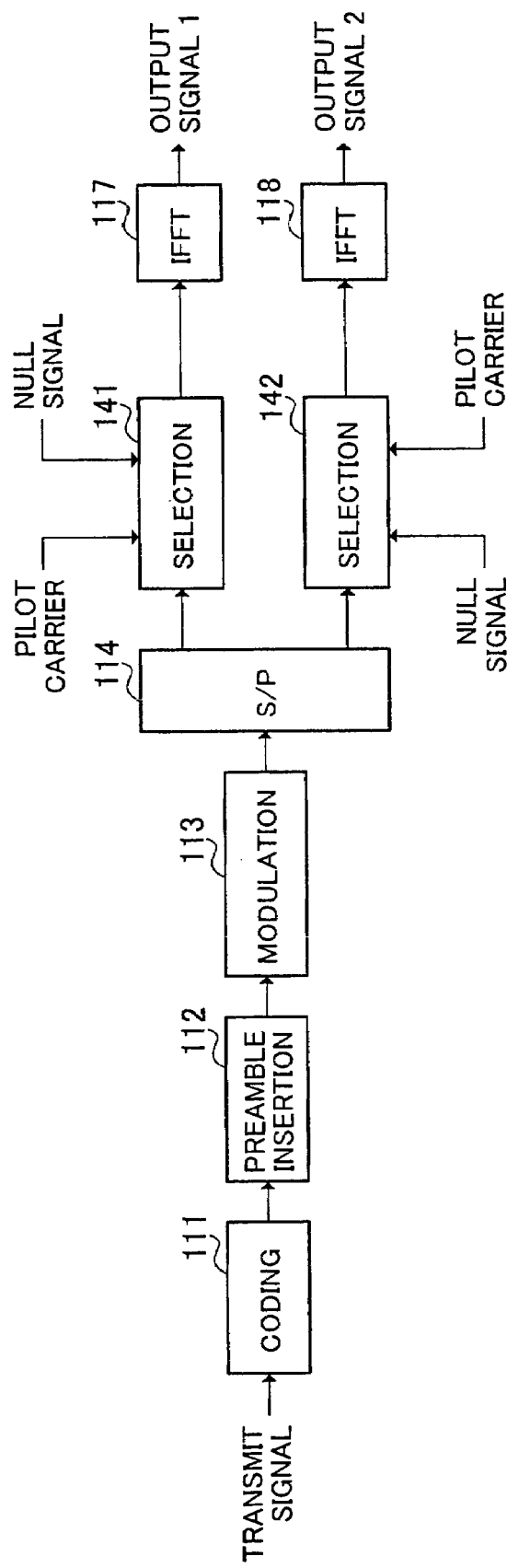
FIG. 14 is a block diagram showing the configuration of the transmitting system of an OFDM communication apparatus according to Embodiment 2.

The configuration of the transmitting system of an OFDM communication apparatus for achieving this will now be described using FIG. 14. In FIG. 14, in which parts corresponding to those in FIG. 11 are assigned the same codes as in FIG. 11, transmitting system 140 has a similar configuration to that of transmitting system 110 in FIG. 11, but differs in having selection sections 141 and 142 that select whether a pilot carrier (known signal) or a null signal is to be inserted in data 1 and data 2 respectively.

With selection sections 141 and 142, when one selection section inserts a known signal, the other selection section inserts a null signal. By this means, transmitting system 140 can form the kind of OFDM signals shown in FIGS. 13(A) and (B).

According to the above configuration, by alternately switching the antenna that transmits pilot carriers and having one antenna transmit pilot carriers while the other antenna is transmitting null signals as subcarriers corresponding thereto, in addition to achieving the effect of Embodiment 1 it is possible to prevent a drop in residual phase error detection precision over a long period when channel fluctuation is slow.

Embodiment 3

Figure 15B:
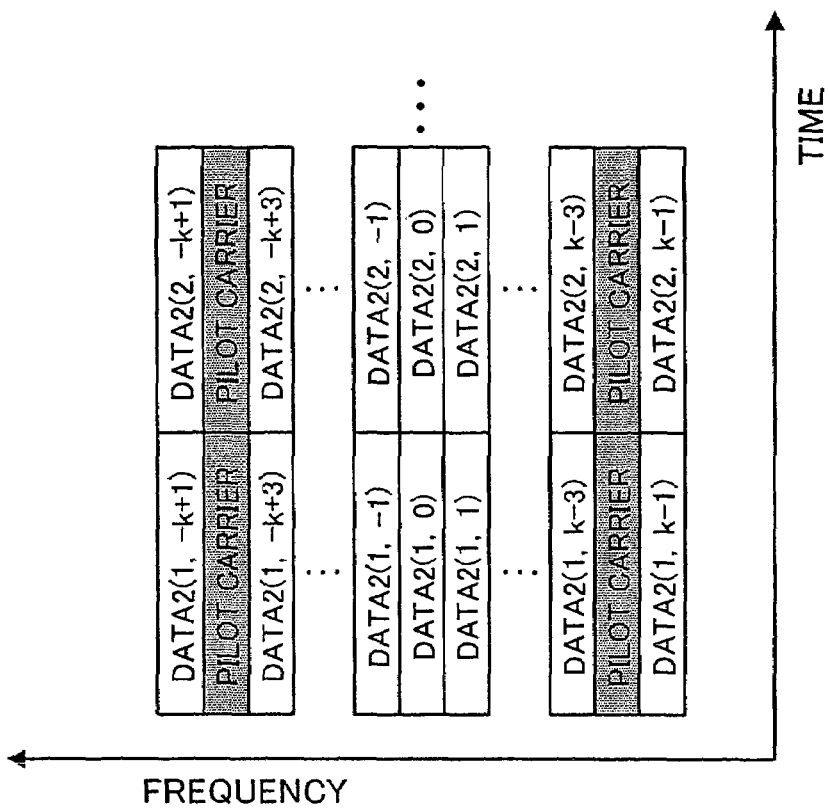
FIG. 15(B) is a drawing showing the relationship between pilot carriers, null signals, and data signals in an OFDM signal of Embodiment 3.
Figure 15A:
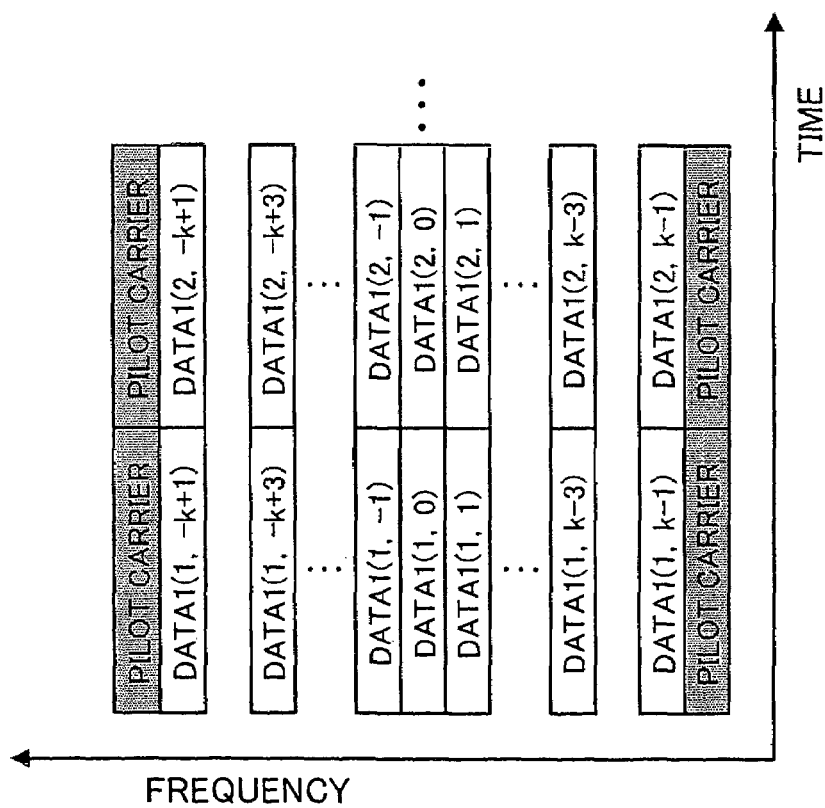
FIG. 15(A) is a drawing showing the relationship between pilot carriers, null signals, and data signals in an OFDM signal of Embodiment 3.

A special feature of an OFDM communication apparatus of this embodiment is that, as shown in FIGS. 15(A) and (B), specific subcarriers of the OFDM signal transmitted from each antenna are used as pilot carriers, and a subcarrier of one antenna corresponding to a subcarrier whereby a pilot carrier is transmitted from the other antenna is made a null signal. By this means, in addition to achieving the effects of Embodiment 1 and Embodiment 2, it is possible to obtain an effect of enabling OFDM signal peak power to be suppressed.

In the example in FIGS. 15(A) and (B), the number of pilot carriers is four, two pilot carriers are transmitted from each antenna, and two null signals are transmitted from each antenna, corresponding to these two pilot carriers. As the transmission power of a null signal is 0, the peak power when transmitting each OFDM signal can be decreased to the extent that two subcarriers are made null signals.

Figure 16:
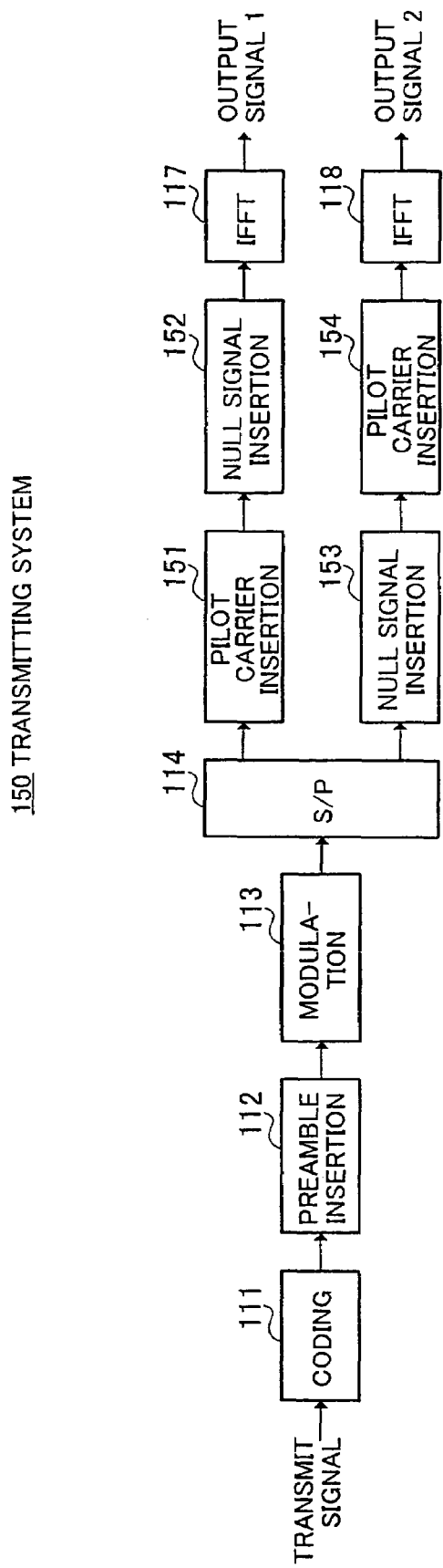
FIG. 16 is a block diagram showing the configuration of the transmitting system of an OFDM communication apparatus according to Embodiment 3.

The configuration of the transmitting system of an OFDM communication apparatus for achieving this will now be described using FIG. 16. In FIG. 16, in which parts corresponding to those in FIG. 11 are assigned the same codes as in FIG. 11, transmitting system 150 has a pilot carrier insertion section 151 that inserts pilot carriers (known signals) in data 1 and a null signal insertion section 152. Transmitting system 150 also has a pilot carrier insertion section 154 that inserts pilot carriers (known signals) in data 2 and a null signal insertion section 153. Null signal insertion section 153 inserts a null signal at a position at which pilot carrier insertion section 151 inserts a known signal. Null signal insertion section 152 inserts a null signal at a position at which pilot carrier insertion section 154 inserts a known signal.

According to the above configuration, by using specific subcarriers of the OFDM signal transmitted from each antenna as pilot carriers, and making a subcarrier of one antenna corresponding to a subcarrier whereby a pilot carrier is transmitted from the other antenna a null signal, in addition to achieving the effect of Embodiment 2 it is possible to reduce the peak power of the OFDM signal transmitted from each antenna.

Embodiment 4

Figure 17B:
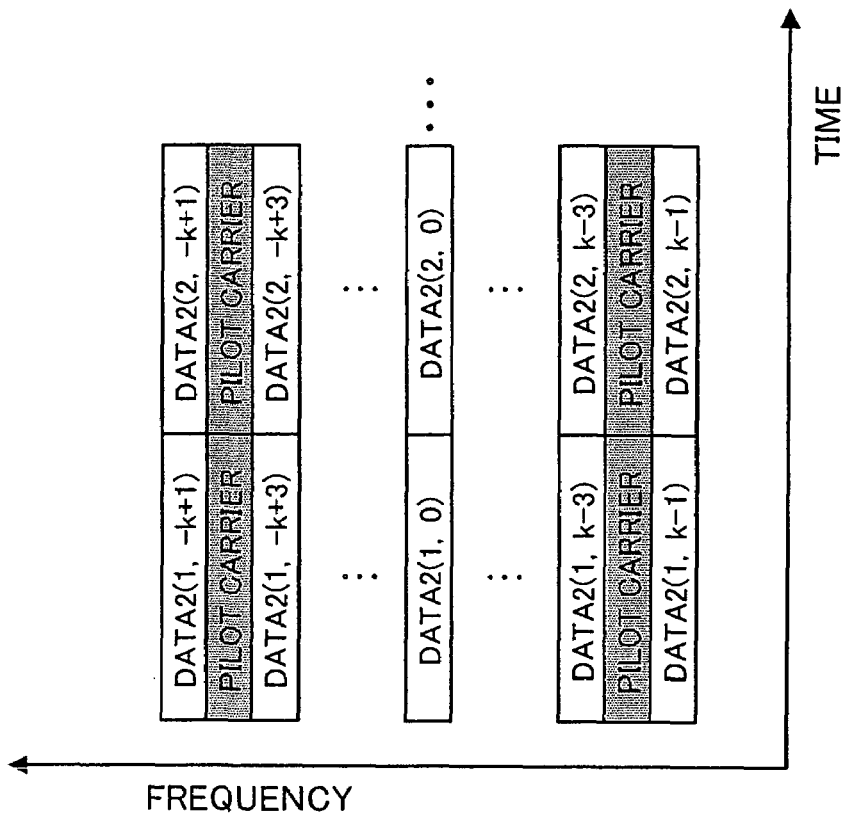
FIG. 17(B) is a drawing showing the relationship between pilot carriers, null signals, and data signals in an OFDM signal of Embodiment 4.
Figure 17A:
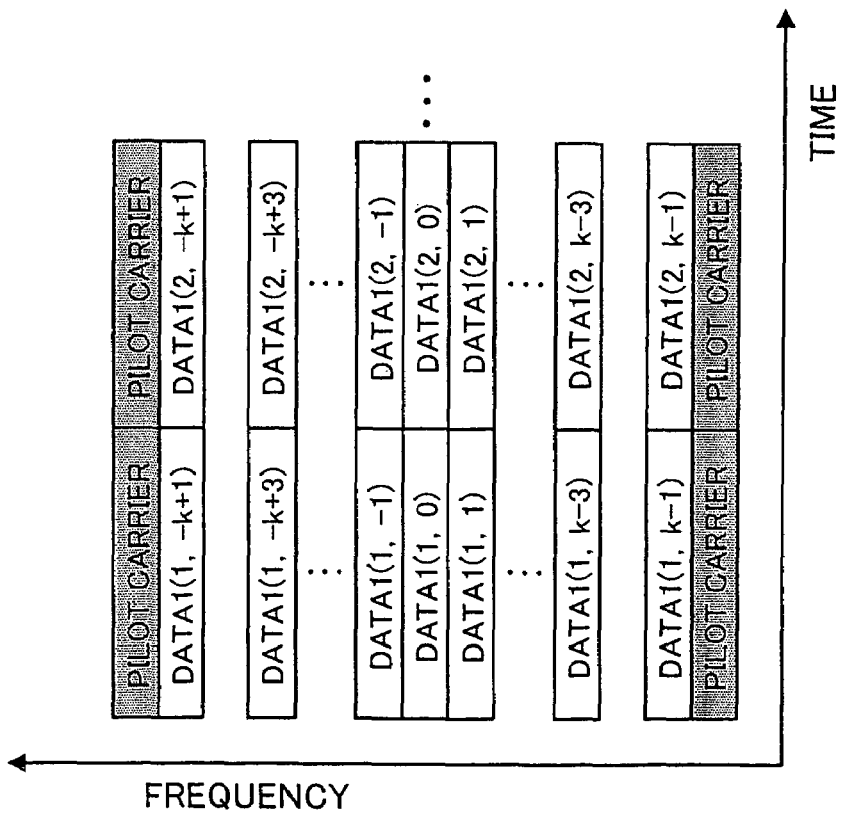
FIG. 17(A) is a drawing showing the relationship between pilot carriers, null signals, and data signals in an OFDM signal of Embodiment 4.

A special feature of an OFDM communication apparatus of this embodiment is that, as shown in FIGS. 17(A) and (B), in addition to the provision of the special feature of Embodiment 3, for specific subcarriers of the subcarriers that transmit data, data is transmitted from only one antenna and a null signal is transmitted from the other antenna. By this means, in addition to achieving the effect of Embodiment 3, it is possible to improve the error rate characteristics of data for which good error rate characteristics are required more than for other data, with almost no decrease in transmission efficiency.

In the example in FIGS. 17(A) and (B), a null signal is transmitted from one antenna for two subcarriers on either side of the direct current (DC) point. Subcarriers that transmit a null signal are not limited to the example in FIGS. 17(A) and (B), and can be set arbitrarily.

As with pilot carriers, subcarriers that transmit a null signal from one antenna do not require interference compensation to be performed. Therefore, for subcarriers that transmit a null signal from one antenna, it is possible to prevent interference from other data remaining even if inter-code interference, timing error, and frequency offset detection error are present due to multipath propagation. As a result, the error rate characteristics of data superimposed on these subcarriers improves. In this embodiment, data for which good error rate characteristics are required, such as retransmission information or control information, is transmitted superimposed on the aforementioned specific subcarriers.

Figure 18:
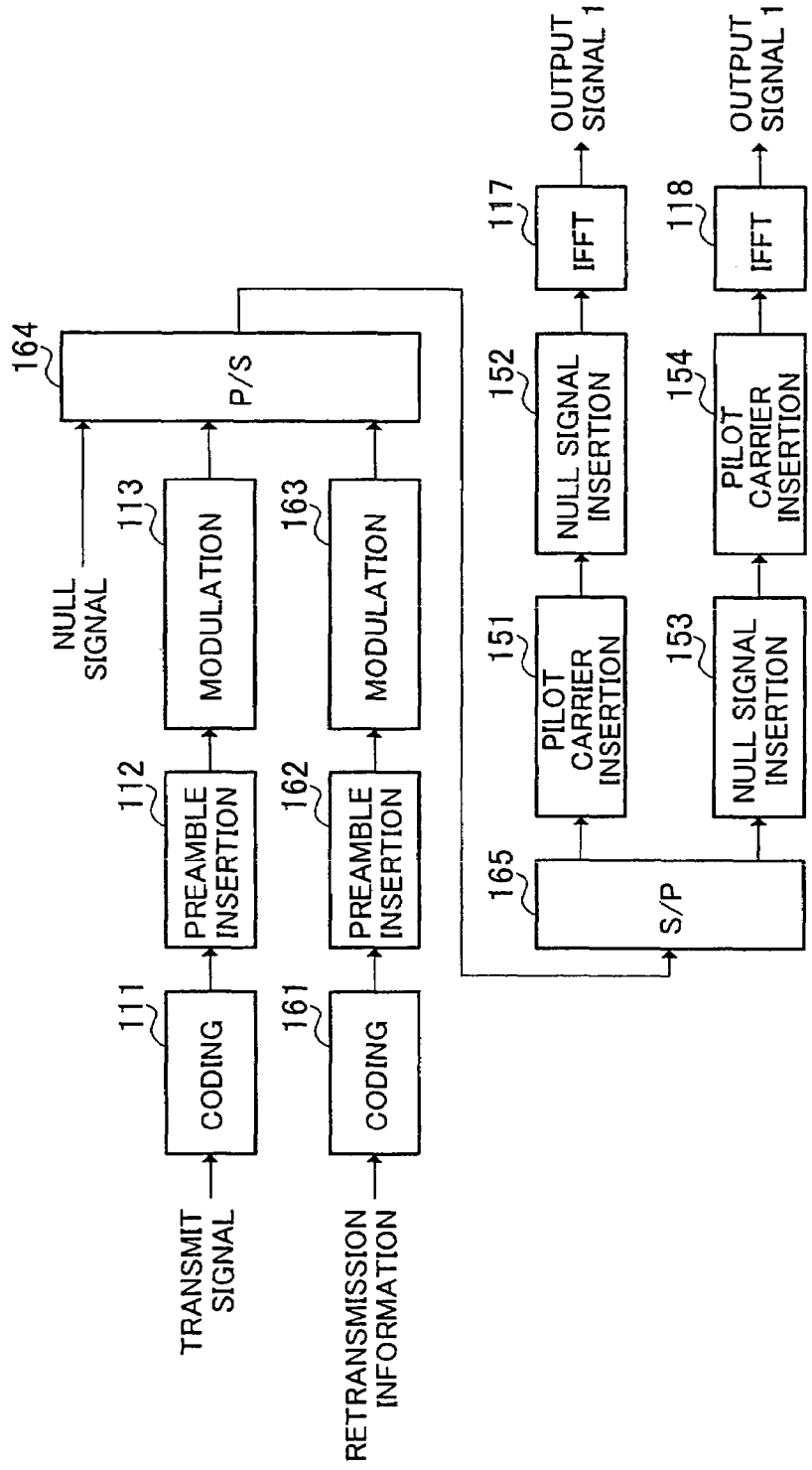
FIG. 18 is a block diagram showing the configuration of the transmitting system of an OFDM communication apparatus according to Embodiment 4.

The configuration of the transmitting system of an OFDM communication apparatus for achieving this will now be described using FIG. 18. In FIG. 18, in which parts corresponding to those in FIG. 16 are assigned the same codes as in FIG. 16, transmitting system 160 inputs retransmission information to a parallel/serial conversion section (P/S) 164 via, sequentially, a coding section 161, preamble insertion section 162, and modulation section 163. A null signal is also input to parallel/serial conversion section 164.

Data converted to serial form by parallel/serial conversion is split into two, data 1 and data 2, by a serial/parallel conversion section (S/P) 165. Data 1 and 2 undergo the same kind of processing as described above to become two OFDM signals as shown in FIGS. 17(A) and (B).

Antenna AN2 subcarriers (FIG. 17(B)) corresponding to antenna AN1 "−1" and "1" subcarriers (DATA1(1, −1), DATA1 (2, −1), DATA1 (1, 1), DATA1 (2, 1)) shown in FIG. 17(A) can be made null signals by having parallel/serial conversion section 164 of transmitting system 160 output a null signal at predetermined timing.

In this embodiment, a case has been described in which, in addition to the provision of the special feature of Embodiment 3, for specific subcarriers of the subcarriers that transmit data, data is transmitted from only one antenna and a null signal is transmitted from the other antenna, but the present invention is not limited to this, and this embodiment can also be combined with Embodiment 1 or Embodiment 2.

According to the above configuration, by providing that, for specific subcarriers of the subcarriers that transmit data, data is transmitted from only one antenna and a null signal is transmitted from the other antenna, in addition to achieving the effect of Embodiments 1 through 3, it is possible to improve the error rate characteristics of data for which good error rate characteristics are required more than for other data, with almost no decrease in transmission efficiency.

Embodiment 5

Figure 19B:
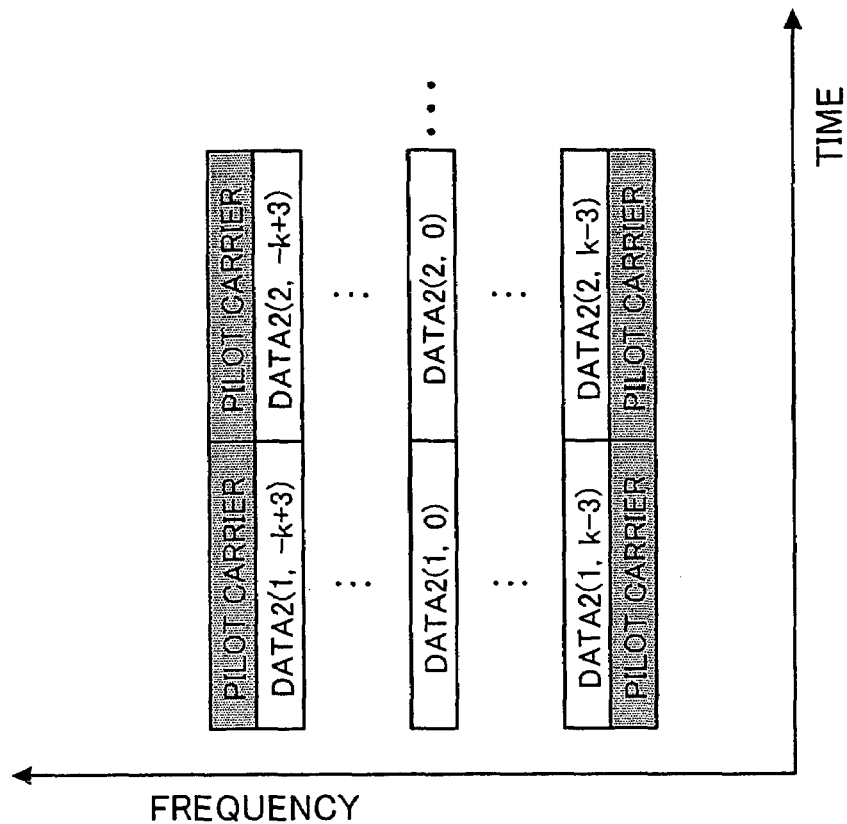
FIG. 19(B) is a drawing showing the relationship between pilot carriers, null signals, and data signals in an OFDM signal of Embodiment 5.
Figure 19A:
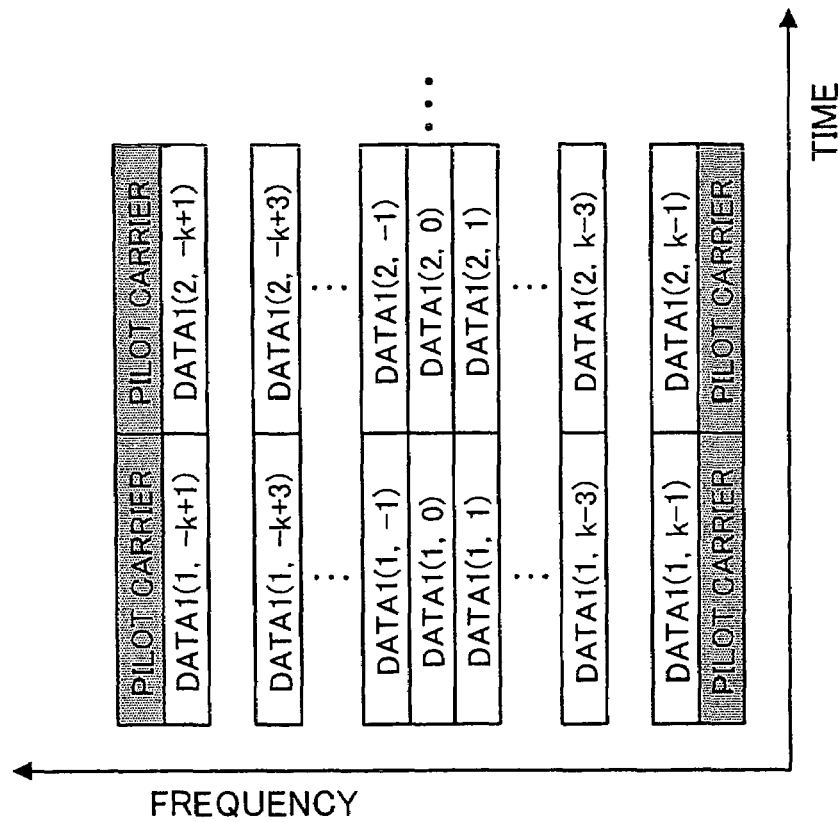
FIG. 19(A) is a drawing showing the relationship between pilot carriers, null signals, and data signals in an OFDM signal of Embodiment 5.

A special feature of an OFDM communication apparatus of this embodiment is that, as shown in FIGS. 19(A) and (B), as compared with Embodiment 4, for a subcarrier at a distance from the center frequency, data is transmitted from only one antenna and a null signal is transmitted from the other antenna. By this means, the error rate characteristics of data transmitted by a subcarrier at a distance from the center frequency can be improved, so that, in addition to achieving the effect of Embodiment 4, it is possible to greatly improve data error rate characteristics with almost no decrease in transmission efficiency.

In the example in FIGS. 19(A) and (B), the antenna AN2 subcarrier (FIG. 19(B)) corresponding to the antenna AN1 "k+1" subcarrier (DATA1(1, −k+1), DATA1(2, −k+1)) shown in FIG. 19(A) is made a null signal.

With an OFDM signal, the further a subcarrier is from the center frequency, the more susceptible it is to adjacent channel interference waves, and analog filter amplitude deviation and group delay deviation. Considering this point, in this embodiment in order to minimize degradation of data transmitted by a subcarrier at a distance from the center frequency, the corresponding other subcarrier is made a null signal.

Figure 20:
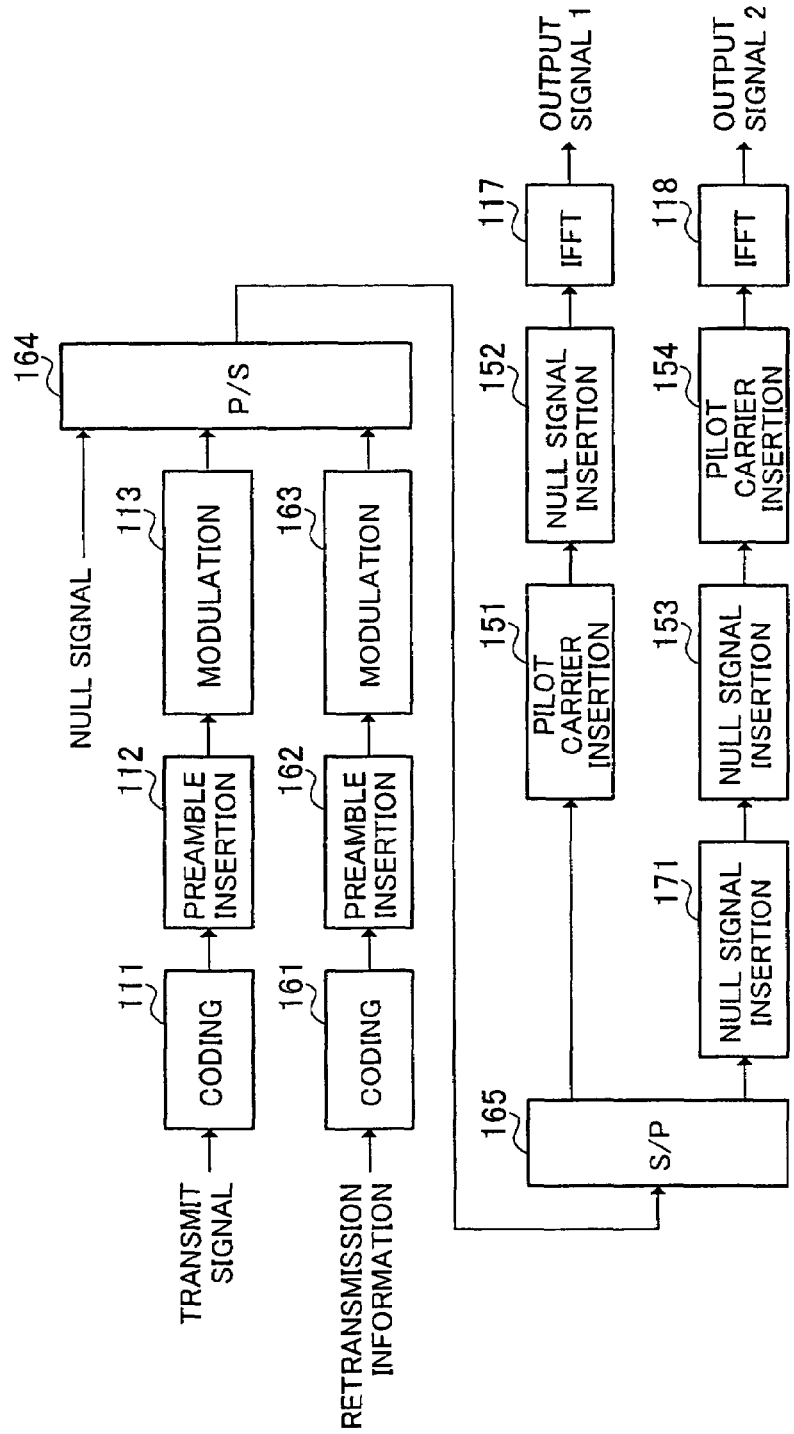
FIG. 20 is a block diagram showing the configuration of the transmitting system of an OFDM communication apparatus according to Embodiment 5.

The configuration of the transmitting system of an OFDM communication apparatus for achieving this will now be described using FIG. 20. In FIG. 20, in which parts corresponding to those in FIG. 18 are assigned the same codes as in FIG. 18, transmitting system 170 has a similar configuration to that of transmitting system 160 in FIG. 18, but differs in having null signal insertion section 171.

By inserting a null signal at a predetermined position in data 2, null signal insertion section 171 makes a subcarrier at a distance from the center frequency a null signal, as shown in FIG. 19(B). By this means, it is possible to suppress interference components in DATA1(1, −k+1) and DATA1(2, −k+1) transmitted by a subcarrier at a distance from the center frequency, enabling degradation of the error rate characteristics of this data to be suppressed.

Embodiment 6

Figure 21B:
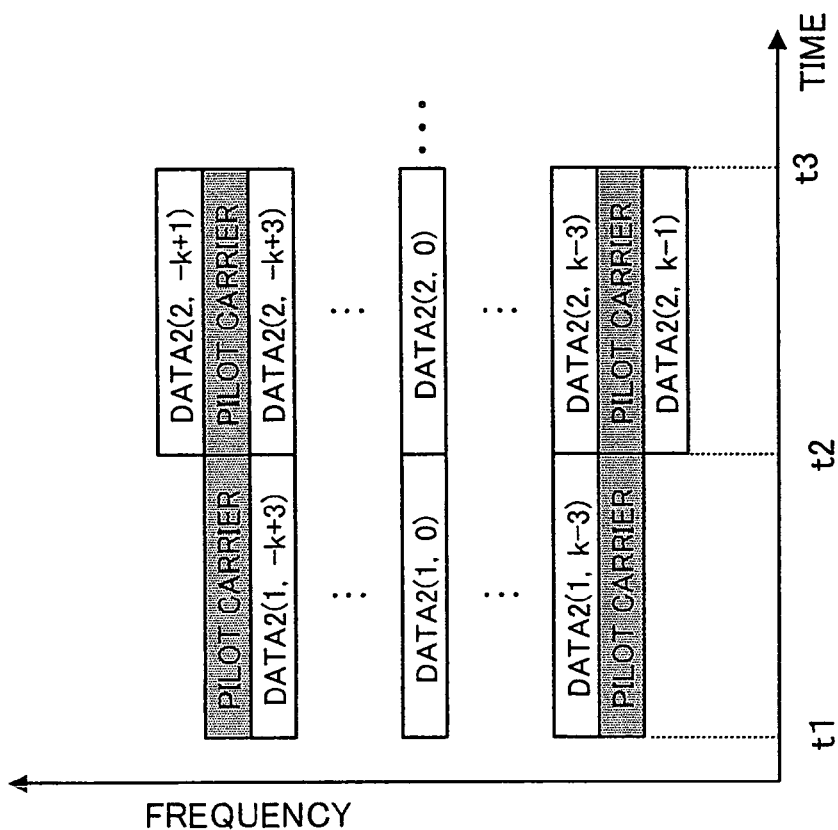
FIG. 21(B) is a drawing showing the relationship between pilot carriers, null signals, and data signals in an OFDM signal of Embodiment 6.
Figure 21A:
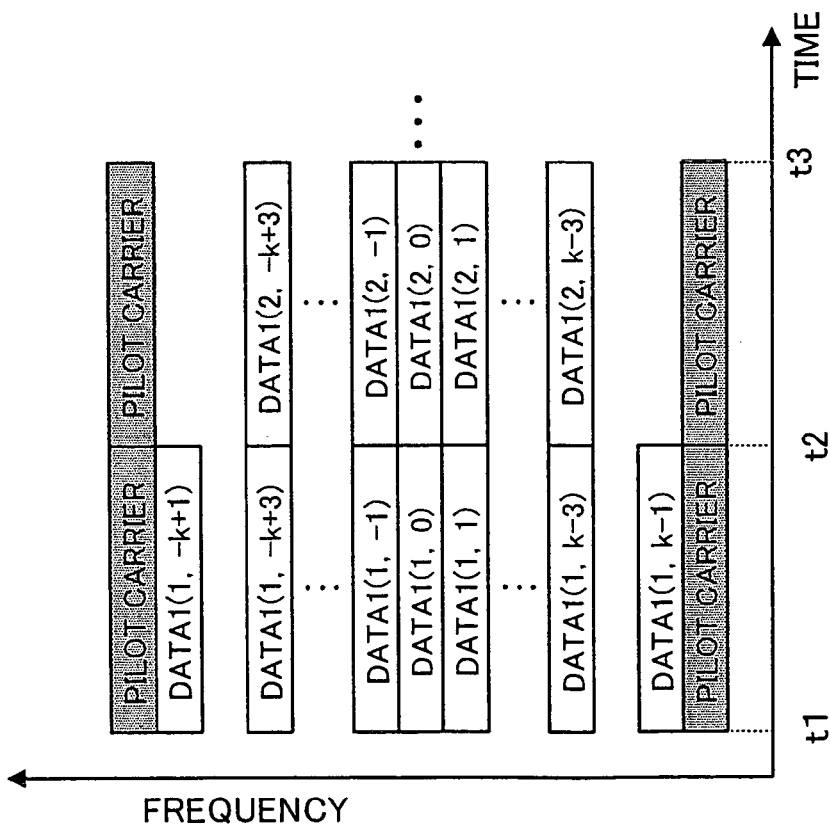
FIG. 21(A) is a drawing showing the relationship between pilot carriers, null signals, and data signals in an OFDM signal of Embodiment 6.

A special feature of an OFDM communication apparatus of this embodiment is that, as shown in FIGS. 21(A) and (B), as compared with Embodiment 5, the antenna that transmits a null signal among one or a plurality of subcarriers is made variable. By this means peak power can be decreased in addition to achieving the effect of Embodiment 5. It is also possible to prevent the reception level of the aforementioned subcarrier remaining low when channel fluctuation is very slow.

In the example in FIGS. 21(A) and (B), antenna AN2 subcarriers (FIG. 21(B)) corresponding to the antenna AN1 "−k+1" and "k−1" subcarriers (DATA1(1, −k+1), DATA1(1, k−1)) shown in FIG. 21(A) are made null signals in the period between points t1 and t2.

Then, in the following period between points t2 and t3, antenna AN1 subcarriers (FIG. 21(A)) corresponding to the antenna AN2 "−k+1" and "k−1" subcarriers (DATA2(2, −k+1), DATA2(2, k−1)) shown in FIG. 21(B) are made null signals.

Figure 22:
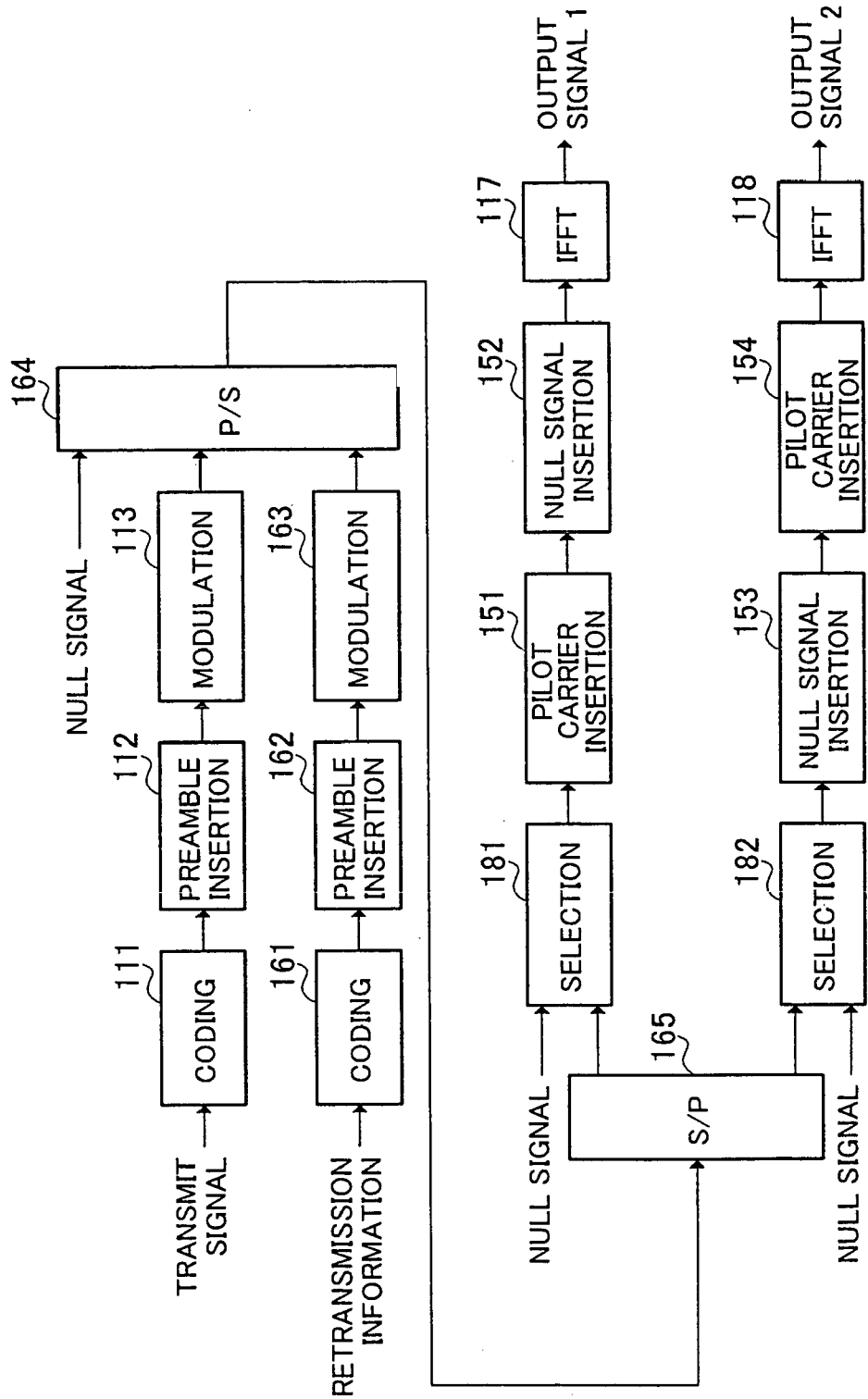
FIG. 22 is a block diagram showing the configuration of the transmitting system of an OFDM communication apparatus according to Embodiment 6.

The configuration of the transmitting system of an OFDM communication apparatus for achieving this will now be described using FIG. 22. In FIG. 22, in which parts corresponding to those in FIG. 18 are assigned the same codes as in FIG. 18, transmitting system 180 has a similar configuration to that of transmitting system 160 in FIG. 18, but differs in having selection sections 181 and 182 to which are input data obtained by splitting by serial/parallel conversion section (S/P) 165.

Split data and a null signal are input to each of selection sections 181 and 182. Selection section 181 selects and outputs a null signal at the timing at which a subcarrier on which data is superimposed from among subcarriers at a distance from the center frequency is transmitted from one antenna and a null signal is transmitted from the other antenna, as described above, and these antennas become variable.

Embodiment 7

Figure 23B:
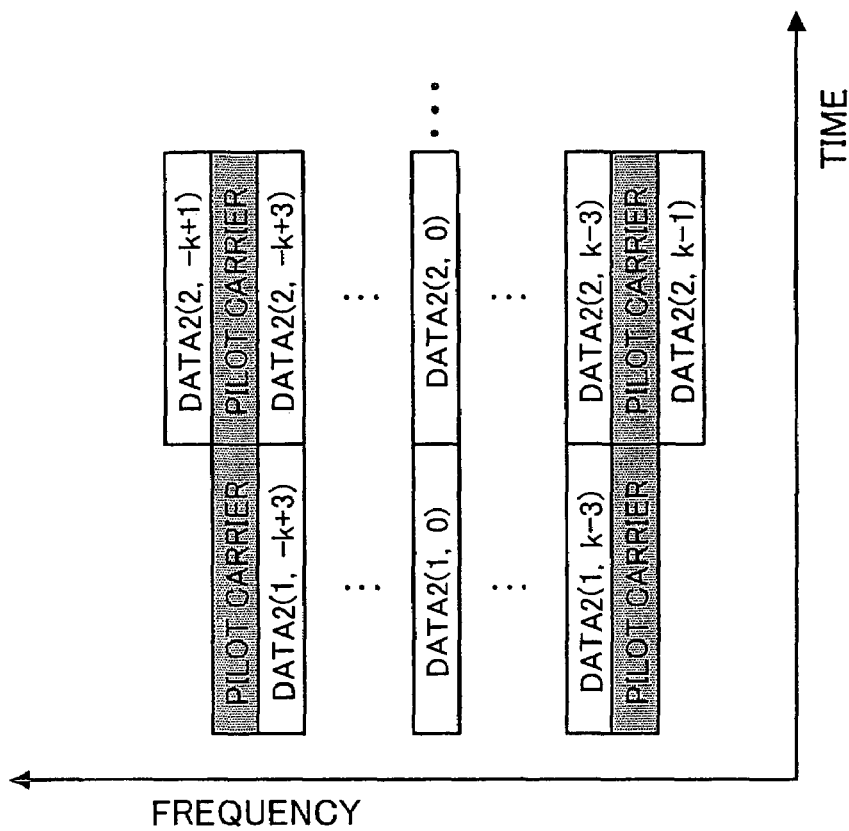
FIG. 23(B) is a drawing showing the relationship between pilot carriers, null signals, and data signals in an OFDM signal of Embodiment 7.
Figure 23A:
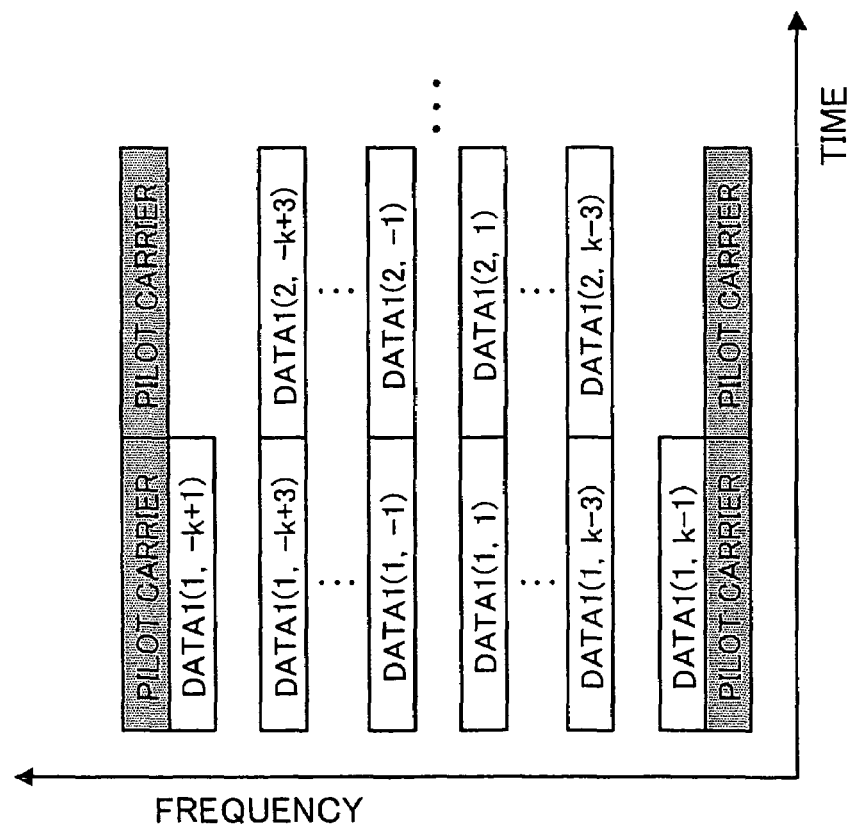
FIG. 23(A) is a drawing showing the relationship between pilot carriers, null signals, and data signals in an OFDM signal of Embodiment 7.

A special feature of an OFDM communication apparatus of this embodiment is that, as shown in FIGS. 23(A) and (B), as compared with Embodiment 6, for the DC point subcarrier, data is transmitted from only one antenna and a null signal is transmitted from the other antenna. By this means, the error rate characteristics of data transmitted by the DC point subcarrier can be improved, so that, in addition to achieving the effect of Embodiment 6, it is possible to greatly improve data error rate characteristics with almost no decrease in transmission efficiency.

In the example in FIGS. 23(A) and (B), the antenna AN1 subcarrier (FIG. 23(A)) corresponding to the antenna AN2 "0" subcarrier (DATA2(1, 0), DATA2(2, 0)) shown in FIG. 23(B) is made a null signal.

With an OFDM signal, the error rate characteristics of the DC point subcarrier degrade much more than those of other subcarriers due to DC offset of the analog circuitry. Considering this point, in this embodiment in order to minimize degradation of data transmitted by the DC point subcarrier, the corresponding other subcarrier is made a null signal.

Figure 24:
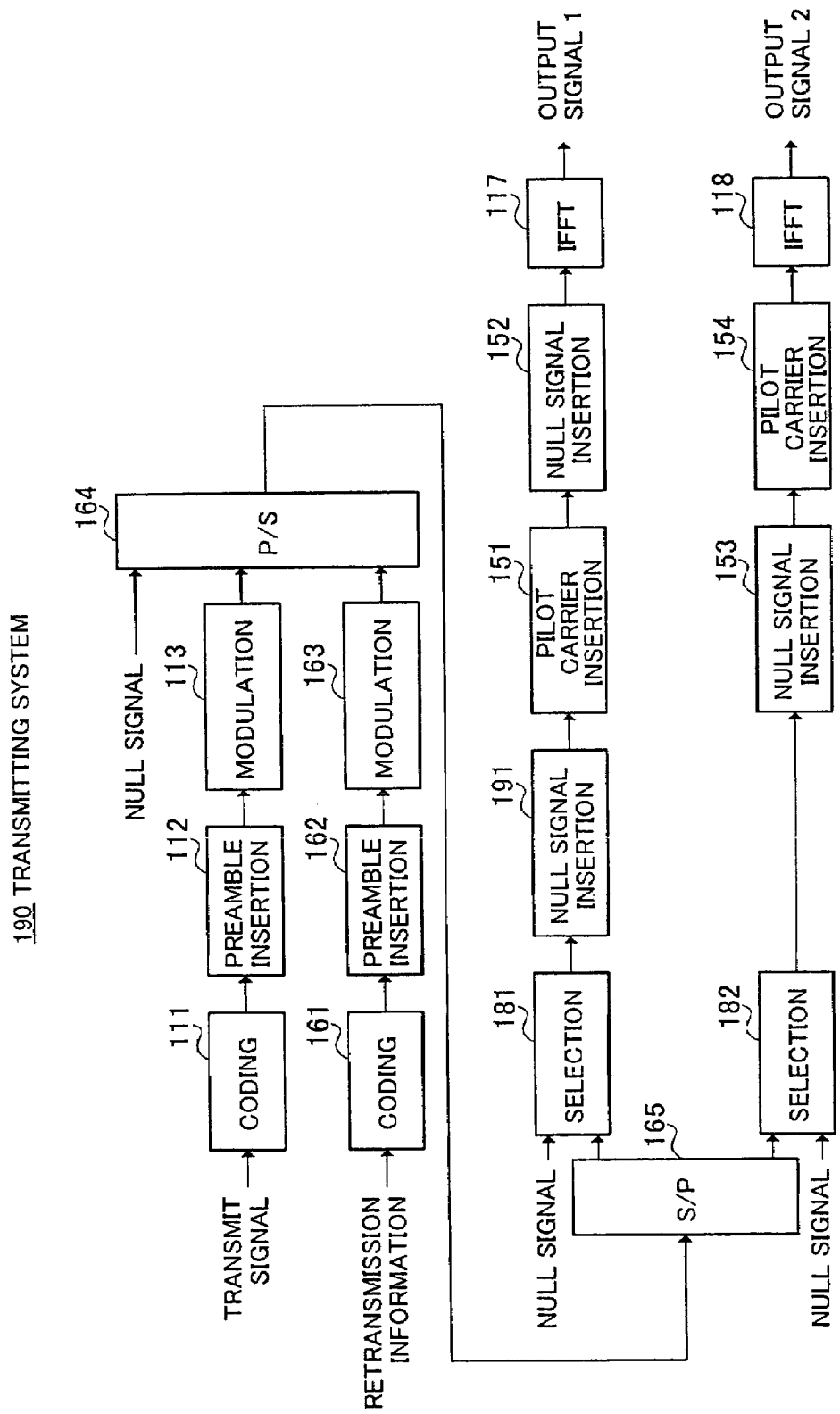
FIG. 24 is a block diagram showing the configuration of the transmitting system of an OFDM communication apparatus according to Embodiment 7.

The configuration of the transmitting system of an OFDM communication apparatus for achieving this will now be described using FIG. 24. In FIG. 24, in which parts corresponding to those in FIG. 22 are assigned the same codes as in FIG. 22, transmitting system 190 has a similar configuration to that of transmitting system 180 in FIG. 22, but differs in being provided with a null signal insertion section 191 between selection section 181 and pilot carrier insertion section 151. Null signal insertion section 191 inserts a null signal at the data position located at the DC point within the input data.

Embodiment 8

A special feature of an OFDM communication apparatus of this embodiment is that offset elimination circuits are provided in the OFDM signal receiving system. By this means, data error rate characteristics can be greatly improved by application to an OFDM communication apparatus that receives OFDM signals obtained by means of the method of Embodiment 7, for example.

Figure 25:
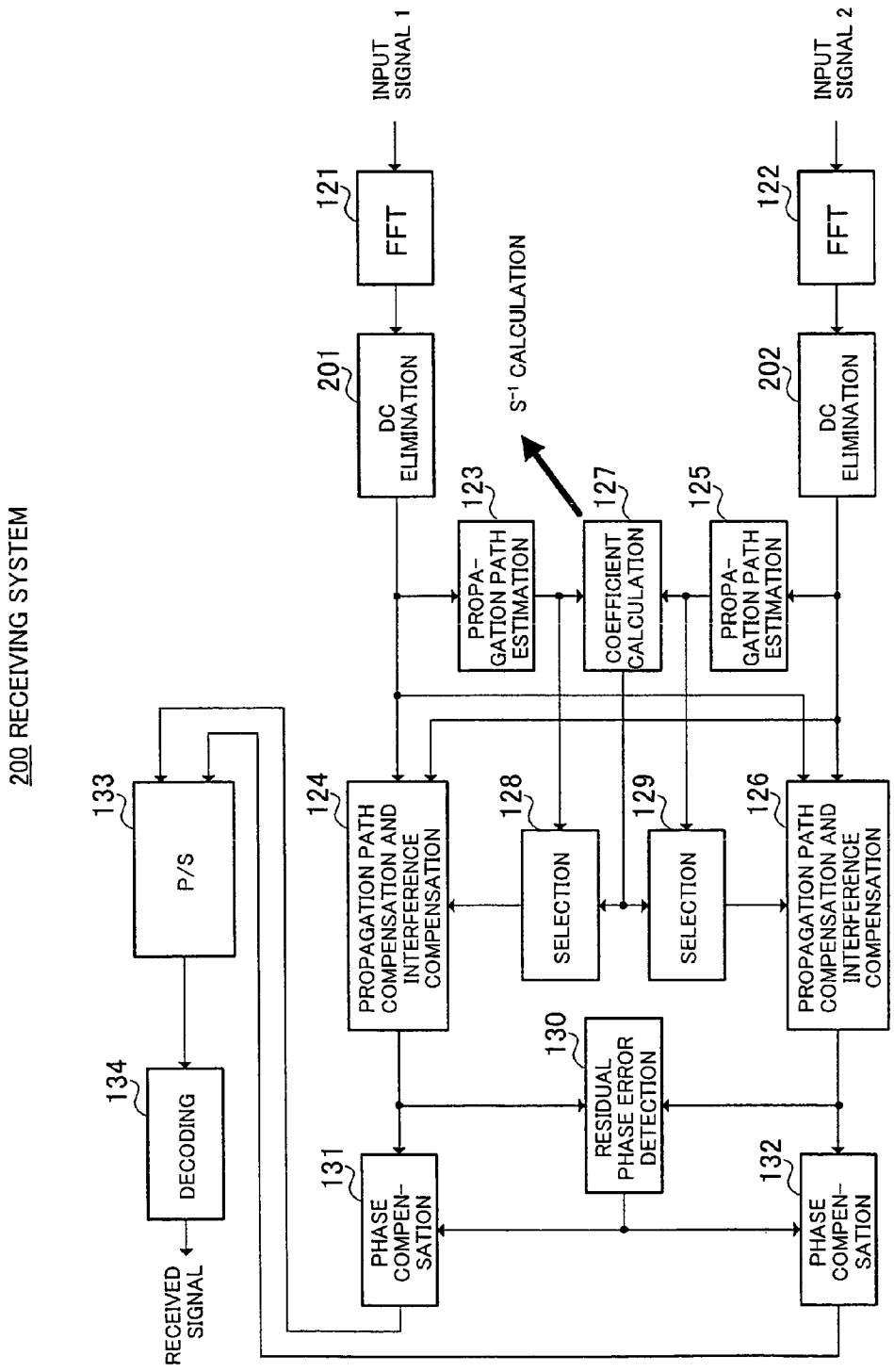
FIG. 25 is a block diagram showing the configuration of the receiving system of an OFDM communication apparatus according to Embodiment 8.

FIG. 25 shows the configuration of a receiving system of this embodiment. In FIG. 25, in which parts corresponding to those in FIG. 12 are assigned the same codes as in FIG. 12, receiving system 200 has a similar configuration to that of receiving system 120 in FIG. 12, but differs in having offset elimination circuits ("DC ELIMINATION") 201 and 202 after FFTs 121 and 122 respectively.

Figure 26:
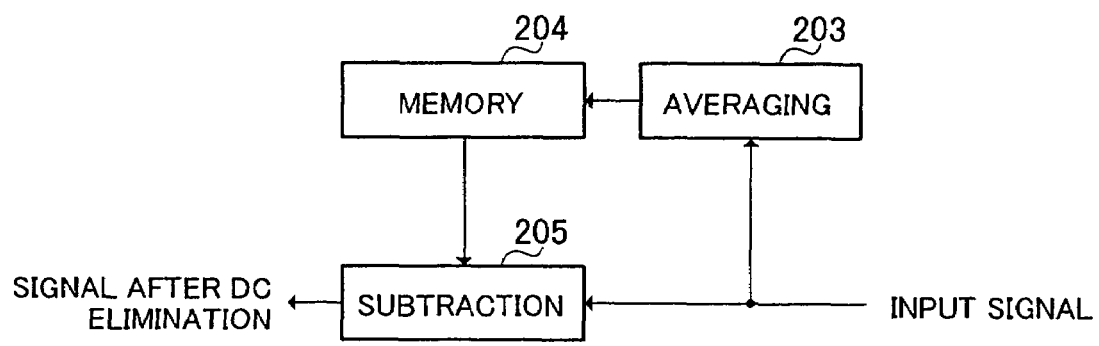
FIG. 26 is a block diagram showing the configuration of a direct current offset elimination circuit.

The actual configuration of offset elimination circuits ("DC ELIMINATION") 201 and 202 is shown in FIG. 26. Offset elimination circuit 201 (202) has an input signal from FFT section 121 (122) as input to an averaging circuit 203 and subtraction circuit 205. Averaging circuit 203 detects DC offset by averaging signal components located in the vicinity of the DC point within the output of FFT section 121 (122), and stores this DC offset information in memory 204. Subtraction circuit 205 subtracts the DC offset amount stored in memory 204 from signals located in the vicinity of the DC point among the FFT output signals. By this means, the DC offset component can be eliminated from the FFT output.

According to the above configuration, by performing propagation path compensation, propagation path interference and residual phase error compensation, etc., after eliminating DC offset from received OFDM signals on the receiving side, it is possible to greatly improve the error rate characteristics of data transmitted from an OFDM communication apparatus of above-described Embodiment 1 through Embodiment 7.

Embodiment 9

A special feature of an OFDM communication apparatus of this embodiment is that specific burst signals are transmitted from only one antenna, and while these burst signals are being transmitted, a null signal is transmitted from the other antenna. By this means, error rate characteristics can be improved to a much greater degree than in Embodiment 1 through Embodiment 7 without much decrease in transmission efficiency.

Among the burst signals transmitted here, there are some that require better error rate characteristics than others. These include a control burst signal or retransmission burst signal, for example. In this embodiment, when such a burst signal that requires better error rate characteristics than others is transmitted, that burst signal is transmitted from only one antenna, and a null signal is output (that is to say, no signal is output) from the other antenna.

By this means, an above-described burst signal receives no interference whatever from a transmit signal from the other antenna on the propagation path, and therefore the error rate characteristics on the receiving side improve. Also, since burst signals that require better error rate characteristics than others, such as control burst signals or retransmission burst signals, constitute a small proportion of all burst signals, there is almost no decrease in transmission efficiency. As a result, the error rate characteristics of important burst signals can be greatly improved without much decrease in transmission efficiency.

Figure 27:
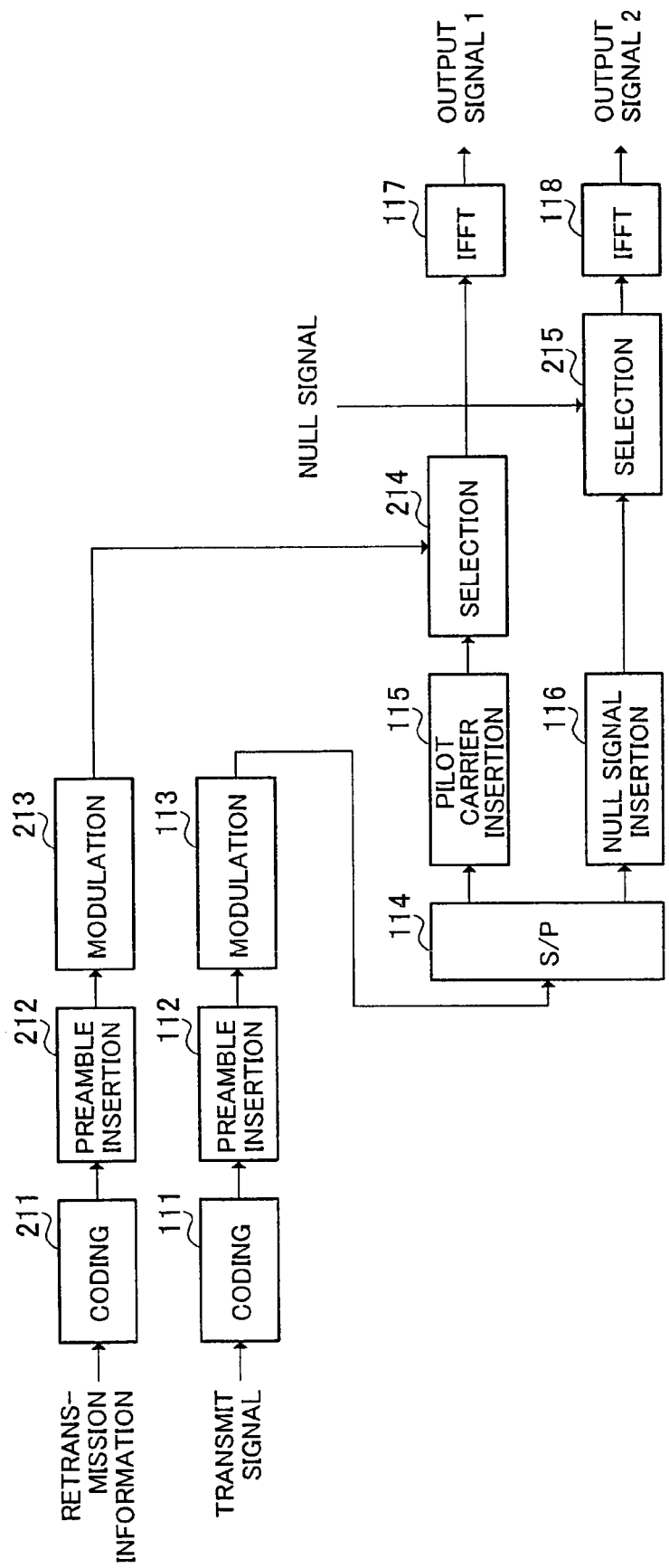
FIG. 27 is a block diagram showing the configuration of the transmitting system of an OFDM communication apparatus according to Embodiment 9.

FIG. 27 shows the configuration of a transmitting system of this embodiment. In FIG. 27, in which parts corresponding to those in FIG. 11 are assigned the same codes as in FIG. 11, transmitting system 210 is provided with a selection section 214 in the processing system for output signal 1 transmitted from antenna AN1, and a selection section 215 in the processing system for output signal 2 transmitted from antenna AN2.

Selection section 214 has as input the output from pilot carrier insertion section 115, and also retransmission information input via a coding section 211, preamble insertion section 212, and modulation section 213. Selection section 215 has as input transmit data after null signal insertion by null signal insertion section 116, and a null signal.

Selection section 215 selects and outputs the null signal while modulated retransmission information (that is to say, a specific burst signal) is being selected and output by selection section 214. Conversely, selection section 215 selects and outputs the output from null signal insertion section 116 while the output from pilot carrier insertion section 115 (that is to say, a burst signal other than a specific burst signal) is being selected and output by selection section 214.

As a result, while a specific burst signal is being transmitted, transmitting system 210 outputs a signal as shown in FIG. 9(A) from antenna AN1, and outputs only a null signal from antenna AN2. On the other hand, when a specific burst signal is not transmitted, the signals shown in FIGS. 9(A) and (B) are output from antenna AN1 and antenna AN2.

In the invention according to this embodiment, there is no restriction as to whether transmitting system 210 is provided in a base station or is provided in a terminal station as in other embodiments described above and hereinafter, but when transmitting system 210 is provided only in a terminal station (that is, when applied only to an uplink), the following additional effect can be obtained.

In this embodiment, transmission efficiency falls to the extent that while a specific burst signal is being transmitted, a null signal is transmitted from the other antenna. Taking this into consideration, ordinary communication is performed on a downlink with a large volume of transmit data, and transmitting system 210 is provided in the terminal station. By this means, a fall in overall system throughput is suppressed, and the error rate characteristics of a specific burst signal transmitted by means of an uplink can be improved without increasing the hardware scale of a terminal station.

Embodiment 10

A special feature of an OFDM communication apparatus of this embodiment is that, as compared with Embodiment 9, in addition to the fact that burst signals are transmitted from only one antenna, and while these burst signals are being transmitted, a null signal is transmitted from the other antenna, burst signals are divided and transmitted alternately from each antenna. By this means, it is possible to further decrease peak power in addition to achieving the effect of Embodiment 9.

That is to say, by dividing a specific burst signal transmitted from only one antenna in Embodiment 9 and transmitting that signal from a plurality of antennas, the number of transmit subcarriers of one antenna can be reduced, enabling peak power to be reduced proportionally.

Specifically, to give an explanation using FIGS. 9 (A) and (B), the information of half of specific burst signals is first transmitted for a certain period from antenna AN1 using half the subcarriers in FIG. 9(A), and during this period null signals are transmitted from antenna AN2. Then, in the next period, the information of the remaining half of the specific burst signals is transmitted from antenna AN2 using half the subcarriers in FIG. 9(B), and during this period null signals are transmitted from antenna AN1.

Figure 28:
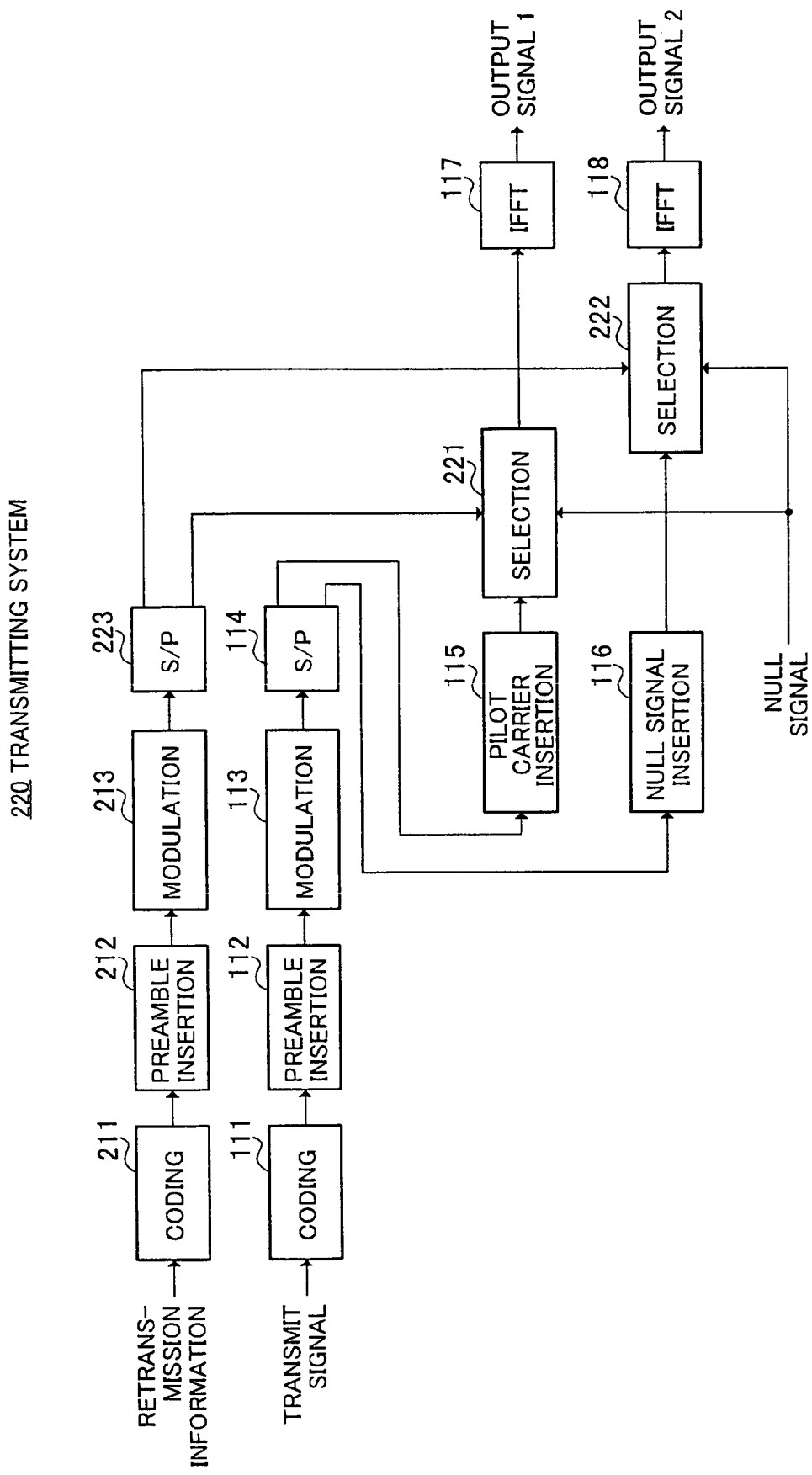
FIG. 28 is a block diagram showing the configuration of the transmitting system of an OFDM communication apparatus according to Embodiment 10.

FIG. 28 shows the configuration of a transmitting system of this embodiment. In FIG. 28, in which parts corresponding to those in FIG. 27 are assigned the same codes as in FIG. 27, transmitting system 220 divides modulated retransmission information by means of serial/parallel conversion section (S/P) 223, and sends the divided signals to selection sections 221 and 222. A null signal is also input to selection sections 221 and 222.

Selection section 221 selectively outputs one from among the output signal from pilot carrier insertion section 115, the divided retransmission information, and the null signal. Selection section 222 selectively outputs one from among the output signal from null signal insertion section 116, the divided retransmission information, and the null signal.

Specifically, when data other than a specific burst signal (retransmission information in the case of FIG. 28) is transmitted, selection section 221 selects and outputs the output from pilot carrier insertion section 115 and selection section 222 selects and outputs the output from null signal insertion section 116. As a result, OFDM signals as shown in FIGS. 9(A) and (B) are transmitted from the two antennas AN1 and AN2.

Conversely, when a specific burst signal (retransmission information in the case of FIG. 28) is transmitted, in the first period selection section 221 selects and outputs divided retransmission information and selection section 222 selects and outputs the null signal. As a result, retransmission information is transmitted from antenna AN1 in half the subcarriers in FIG. 9(A), and null signals are transmitted from antenna AN2. Then, in the next period, retransmission information is transmitted from antenna AN2 in half the subcarriers in FIG. 9(B), and null signals are transmitted from antenna AN1.

Embodiment 11

A special feature of this embodiment is that a communication terminal is equipped with only one antenna, and transmission of different data from a plurality of antennas is performed only from a base station (only on a downlink). By this means, it is possible to greatly reduce the hardware scale and power consumption of a terminal, with almost no decrease in overall system transmission efficiency.

When the method of transmitting different data from a plurality of antennas is also applied to an uplink, the circuit scale and power consumption of a terminal are greatly increased, since a terminal's transmitting system signal processing system circuit and radio processing section (transmitting RF) are required for each antenna. However, overall system transmission efficiency is generally decided by the downlinks. Taking note of this point, the present inventors considered that equipping a terminal with only one antenna would be effective in reducing terminal hardware scale and power consumption while achieving overall system transmission efficiency.

Figure 29:
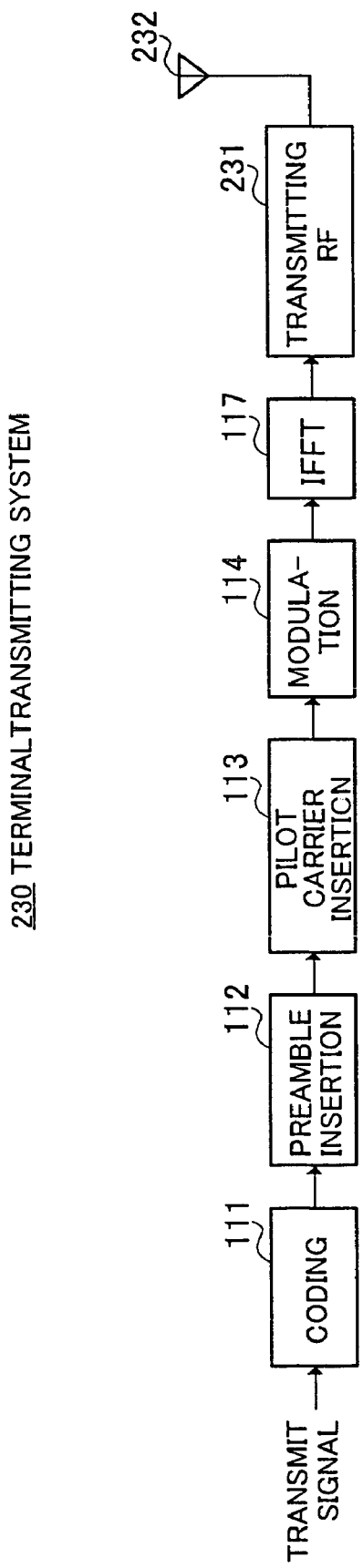
FIG. 29 is a block diagram showing the configuration of the transmitting system of a terminal of an OFDM communication apparatus according to Embodiment 11.

FIG. 29 shows the configuration of the transmitting system of a communication terminal according to this embodiment. In FIG. 29, in which parts corresponding to those in FIG. 11 are assigned the same codes as in FIG. 11, transmitting system 230 executes radio processing such as signal amplification by means of a signal RF section 231 on a signal that has undergone inverse Fourier transform processing, and transmits the resulting signal from a single antenna 232. The transmit signal shown in FIG. 29 comprises single data, as opposed to the plurality of different data of the transmit data shown in FIG. 11.

Figure 30:
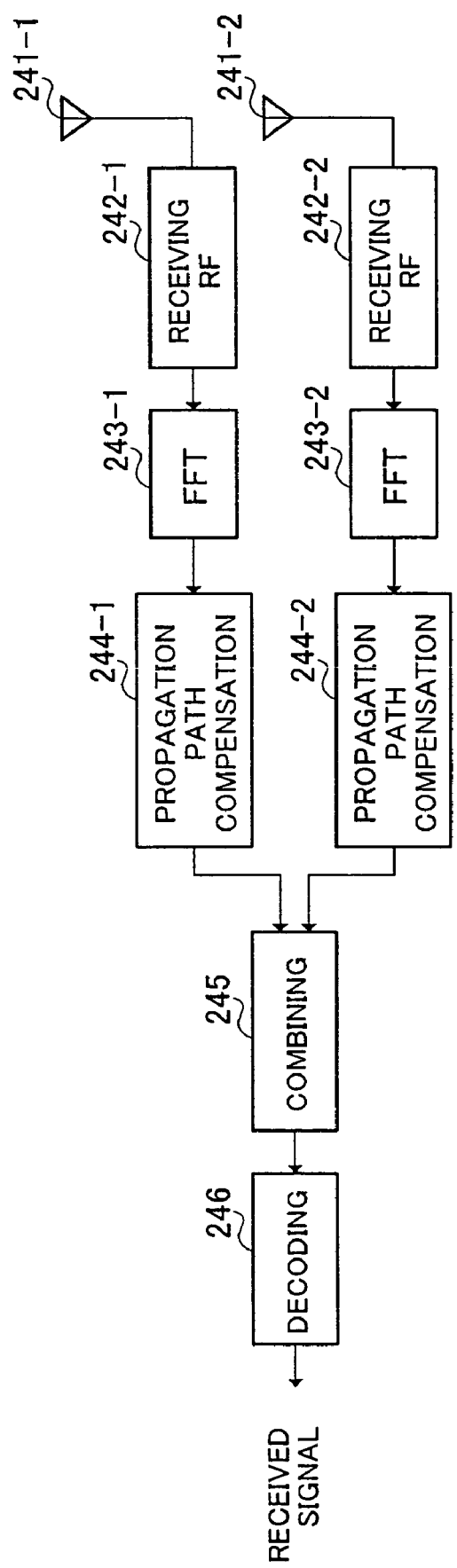
FIG. 30 is a block diagram showing the configuration of the receiving system of an OFDM communication apparatus according to Embodiment 11.

FIG. 30 shows the configuration of the receiving system of a radio base station that receives and demodulates OFDM signals transmitted from terminal transmitting system 230. In base station receiving system 240, OFDM signals received by plurality of antennas 241-1 and 241-2 are input to a combining section 245 via receiving RF sections 242-1 and 242-2, FFTs 243-1 and 243-2, and propagation path compensation sections 244-1 and 244-2. In combining section 245, the signals that have undergone propagation path compensation are combined, or one thereof is selected. The signal resulting from combining or selection is decoded by a decoding section 246, and becomes a received signal.

Embodiment 12

A special feature of an OFDM communication apparatus of this embodiment is that an OFDM signal is transmitted from only one antenna in the case of a propagation environment in which the absolute value of a determinant of an inverse matrix used by an interference compensation section is small. By this means, it is possible to improve error rate characteristics in the case of a propagation environment in which the absolute value of a determinant of an inverse matrix used by an interference compensation section is small.

When absolute value |AD−BC| of a determinant of an inverse matrix used by an interference compensation section is small, the actual value of the number of operation bits is small, and therefore the inverse matrix estimation precision degrades. As a result, error rate characteristics degrade. Taking this point into consideration, in this embodiment the absolute value of a determinant of an interference compensation section inverse matrix is monitored, and if this value is small, transmission is performed from only one antenna.

Figure 31:
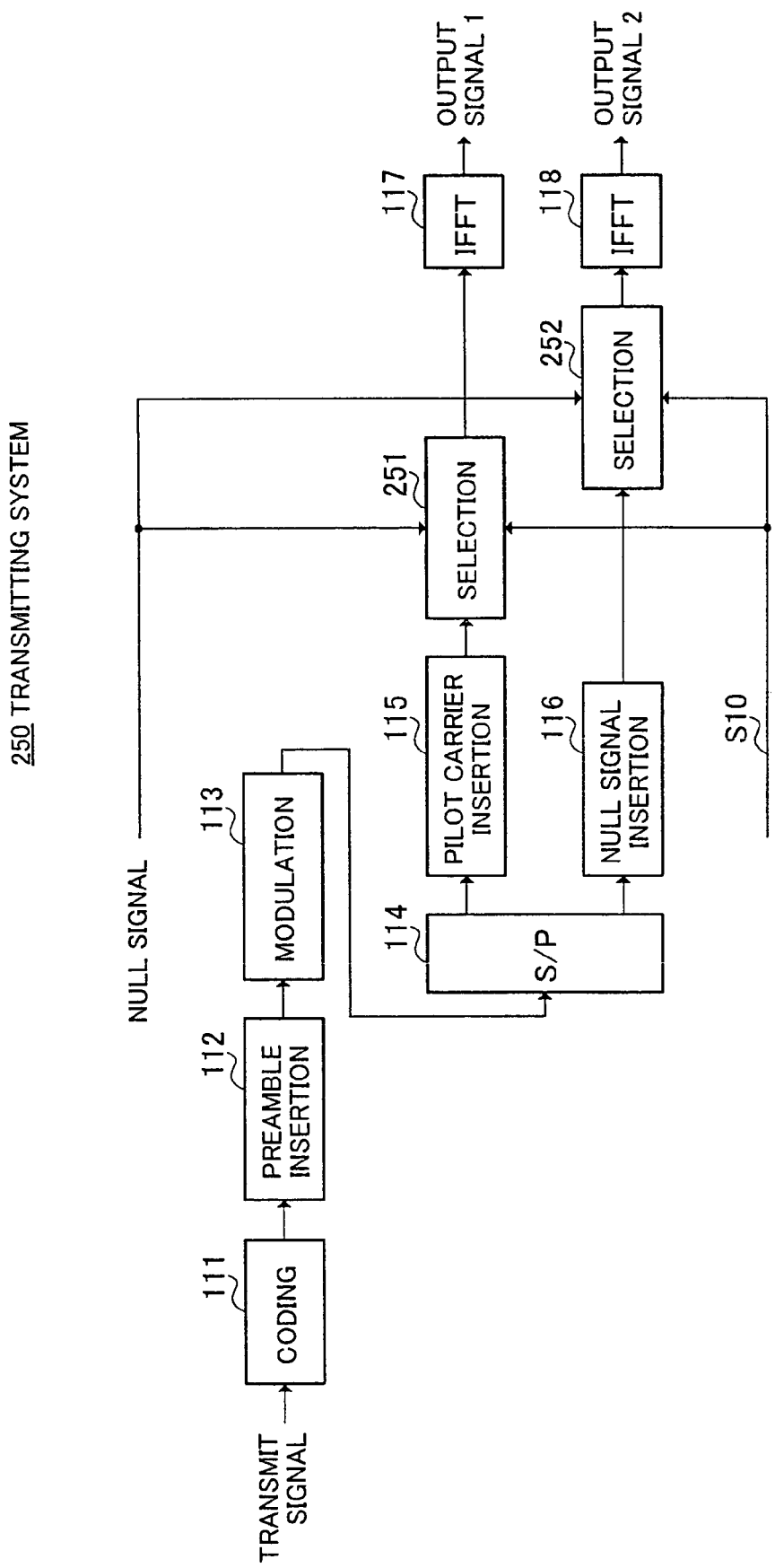
FIG. 31 is a block diagram showing the configuration of the transmitting system of an OFDM communication apparatus according to Embodiment 12.

FIG. 31 shows the configuration of the transmitting system of an OFDM communication apparatus according to this embodiment. In FIG. 31, in which parts corresponding to those in FIG. 11 are assigned the same codes as in FIG. 11, transmitting system 250 is provided with a selection section 251 in the processing system of output signal 1 transmitted from antenna AN1, and a selection section 252 in the processing system for output signal 2 transmitted from antenna AN2.

Selection section 251 has as input the output from pilot carrier insertion section 115, and also a null signal. Selection section 252 has as input transmit data after null signal insertion by null signal insertion section 116, and also a null signal. Each of selection sections 251 and 252 selectively outputs transmit data or a null signal based on a decision signal S10 formed by the receiving system of the station being transmitted to, described later herein. That is to say, in an OFDM communication apparatus that has transmitting system 250, decision signal S10 is received from the communicating-party station by a reception section (not shown), and is sent to selection sections 251 and 252.

Figure 32:
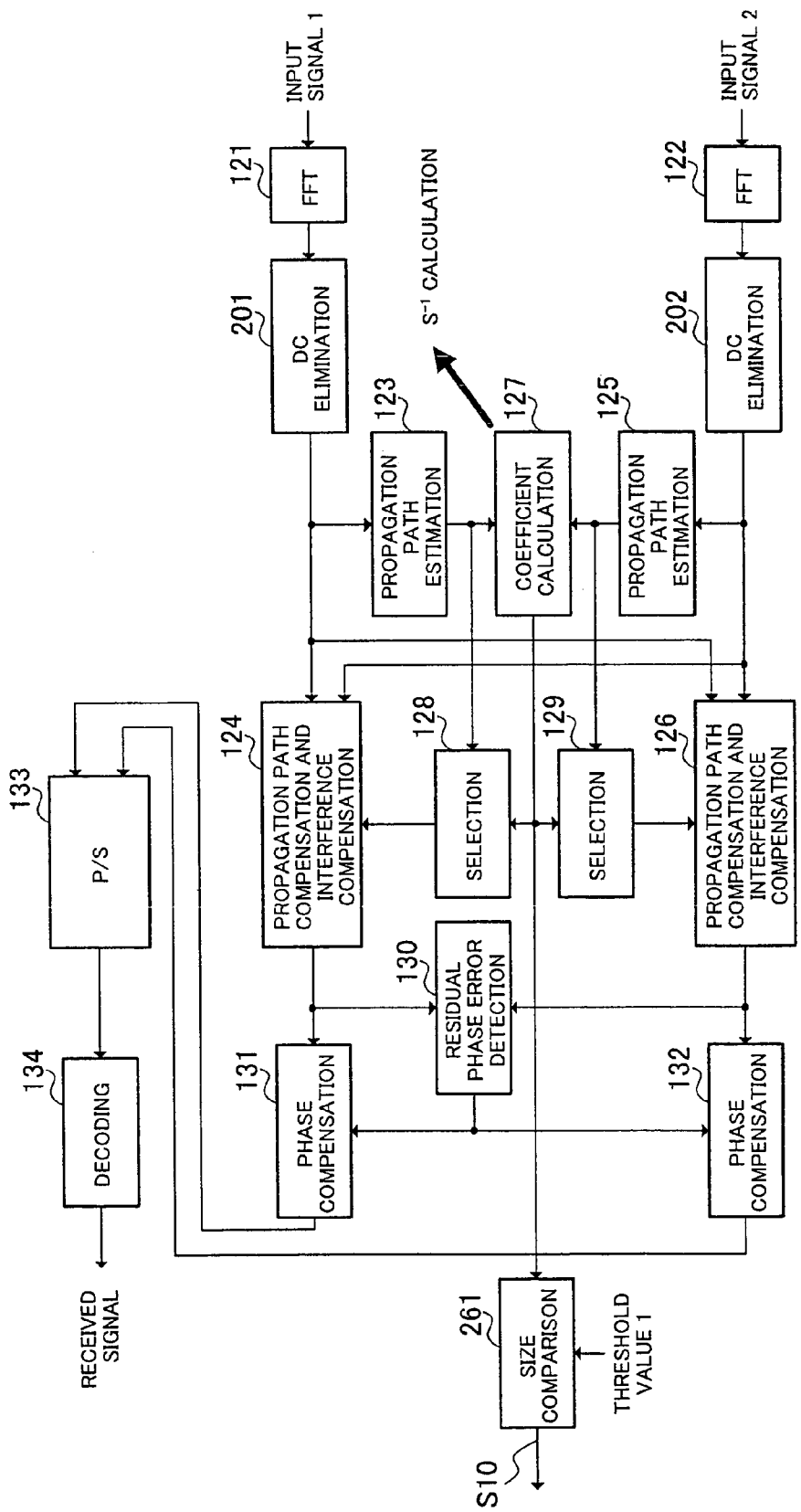
FIG. 32 is a block diagram showing the configuration of the receiving system of an OFDM communication apparatus according to Embodiment 12.

FIG. 32 shows the configuration of the receiving system of an OFDM communication apparatus being transmitted to by an OFDM communication apparatus that has transmitting system 250. In receiving system 260 in FIG. 32, in which parts corresponding to those of receiving system 120 in FIG.

12 are assigned the same codes as in FIG. 12, inverse matrix determinant absolute value |AD−BC| obtained by coefficient calculation section 127 is input to a size comparison section 261. Size comparison section 261 compares absolute value |AD−BC| with threshold value 1, and reports the comparison result as decision signal S10 to selection sections 251 and 252 of transmitting system 250 of the OFDM communication apparatus shown in FIG. 31 via a transmitting system (not shown).

In the above configuration, an OFDM signal formed by an OFDM communication apparatus that has transmitting system 250 is first transmitted from transmitting system 250. This OFDM signal is received and demodulated by receiving system 260 of the OFDM communication apparatus being communicated with.

Receiving system 260 finds coefficients A/(AD−BC) B/(AD−BC), C/(AD−BC), and D/(AD−BC) by means of coefficient calculation section 127 using propagation path characteristics A, B, C, and D obtained by propagation path estimation sections 123 and 125. Size comparison section 261 compares inverse matrix determinant absolute value |AD−BC| with threshold value 1, and transmits the comparison result as decision signal S10 to the OFDM communication apparatus that has transmitting system 250.

Then, the OFDM communication apparatus that receives this decision signal S10 inputs the decision signal S10 to selection sections 251 and 252. If absolute value |AD−BC| is greater than or equal to threshold value 1, selection sections 251 and 252 select the pilot carrier insertion section 115 and null signal insertion section 116 signals. If, on the other hand, absolute value |AD−BC| is less than threshold value 1, either selection section 251 or selection section 252 selects a null signal. For example, when selection section 215 selects and outputs the signal from pilot carrier insertion section 115, selection section 252 outputs a null signal.

Thus, when absolute value |AD−BC| is large and the precision of propagation path compensation and interference compensation can be maintained on the communicating party side, OFDM signals with different transmit data superimposed are transmitted from a plurality of antennas. On the other hand, when absolute value |AD−BC| is small and the precision of propagation path compensation and interference compensation degrades on the communicating party side, an OFDM signal is transmitted from only one antenna. As a result, interference on the propagation path is gradually reduced even when compensation precision is poor, enabling a received signal with good error rate characteristics to be obtained by the communicating party.

According to the above configuration, by transmitting an OFDM signal from only one antenna when an inverse matrix coefficient (AD−BC) for propagation path compensation and interference compensation is small, it is possible to suppress degradation of error rate characteristics in a propagation environment in which the precision of propagation path compensation and interference compensation is poor.

This embodiment is particularly effective when communicating OFDM communication apparatuses perform communication using an FDD (Frequency Division Duplex) method as an access method. That is to say, in this embodiment, the propagation path characteristics of OFDM signals transmitted in a particular frequency band by transmitting system 250 are estimated on the receiving side, the estimation result (decision signal S10) is reported to the OFDM communication apparatus that has transmitting system 250, and transmitting system 250 forms an OFDM signal that reflects that decision signal S10. By this means, in an FDD system in which propagation characteristics differ on the downlink and uplink, transmitting system 250 can form an OFDM signal in accordance with the above-mentioned propagation environment based on an accurate decision signal S10.

An effective configuration for a case in which a TDD (Time Division Duplex) method is used as the access method is described in following Embodiment 13.

Embodiment 13

A special feature of an OFDM communication apparatus of this embodiment is that, as compared with above-described Embodiment 12, the decision result for inverse matrix determinant absolute value |AD−BC| when receiving is reflected when transmitting. By this means, in a TDD system in which uplink and downlink propagation characteristics are the same, transmission efficiency is improved to the extent that transmission of control information (decision result signals) can be reduced, enabling the same kind of effective to be obtained as with Embodiment 12.

Figure 33:
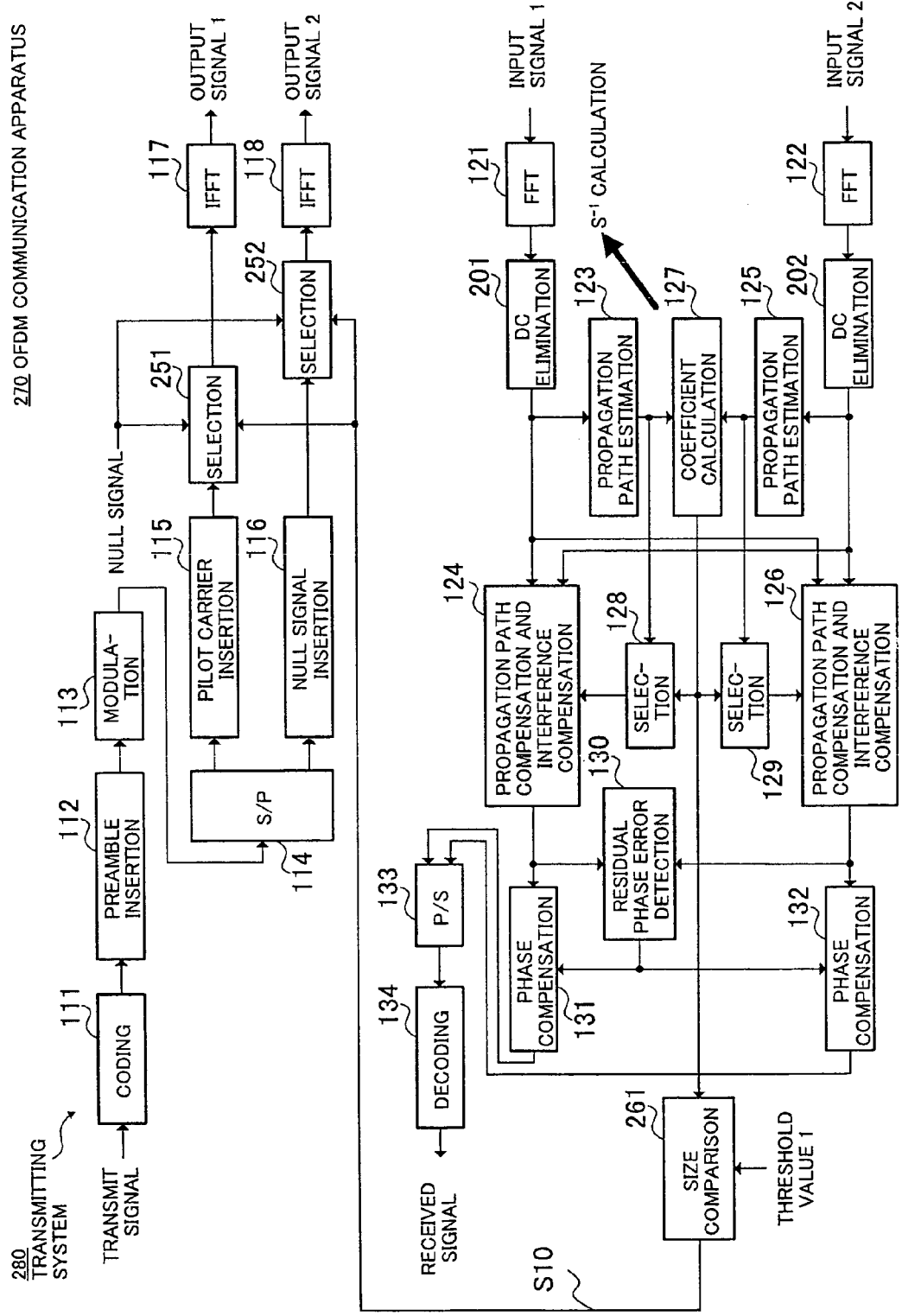
FIG. 33 is a block diagram showing the configuration of an OFDM communication apparatus according to Embodiment 13.

In FIG. 33, in which parts-corresponding to those in FIG. 31 and FIG. 32 are assigned the same codes as in FIG. 31 and FIG. 32, an OFDM communication apparatus 270 of this embodiment has a transmitting system 280 and a receiving system 290. By this means, in OFDM communication apparatus 270, decision result S10 obtained by receiving system 290 can be reflected in transmitting system 280.

According to the above configuration, by making a threshold value decision for inverse matrix coefficient (AD−BC) for propagation path compensation and interference compensation obtained by receiving system 290, reflecting this decision result in OFDM communication apparatus 270 of the same OFDM communication apparatus, and transmitting an OFDM signal from only one antenna when inverse matrix determinant absolute value |AD−BC| is less than the threshold value, it is possible to suppress degradation of error rate characteristics in a propagation environment in which the precision of propagation path compensation and interference compensation is poor, without transmitting control information (decision result S10) to the communicating party.

Embodiment 14

A special feature of this embodiment is that, as compared with Embodiment 12 and Embodiment 13, the threshold value used for an interference compensation section inverse matrix determinant absolute value size decision is made variable. By this means, it is possible to greatly suppress degradation of error rate characteristics in a propagation environment in which an inverse matrix determinant absolute value used by the interference compensation section is small.

The present inventors noted that the optimal value of the threshold value of a comparison section that compares the size of an inverse matrix determinant absolute value used by the interference compensation section differs according to the channel quality of a received OFDM signal. That is to say, when channel quality is poor, the detection error of inverse matrix determinant absolute value |AD−BC| increases, and therefore when channel quality is poor, the threshold value used by the comparison section is made a large value.

Figure 34:
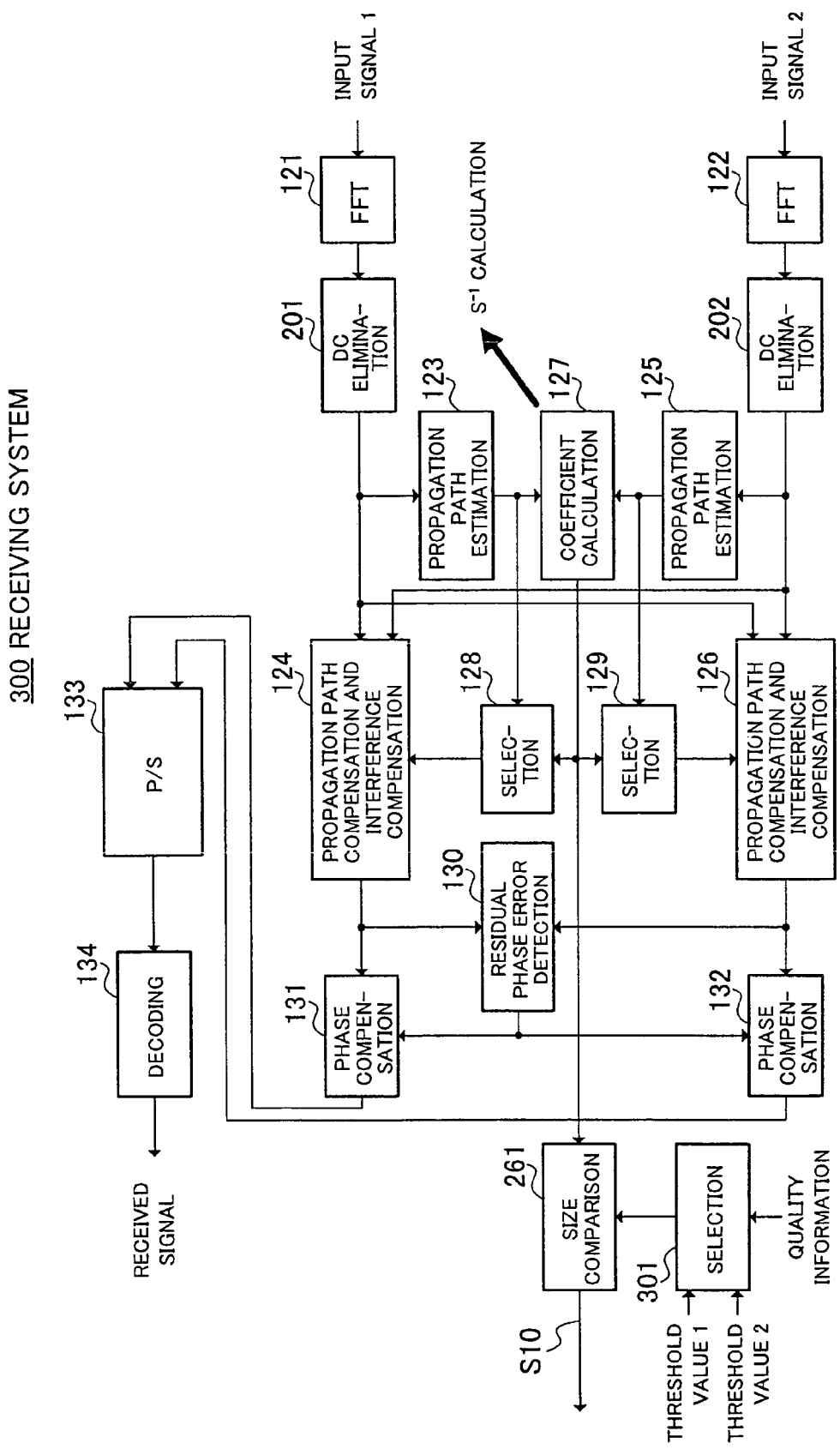
FIG. 34 is a block diagram showing the configuration of the receiving system of an OFDM communication apparatus according to Embodiment 14.

In FIG. 34, in which parts corresponding to those in FIG. 32 are assigned the same codes as in FIG. 32, receiving system 300 of this embodiment has a similar configuration to that of receiving system 260 in FIG. 32, but differs in having a selection section 301 that selects the threshold value used in a threshold value decision by size comparison section 261.

Selection section 301 selects and outputs either threshold value 1 or threshold value 2, which are different values (it being here assumed that threshold value 1<threshold value 2), based on reception quality information such as a CRC (Cyclic Redundancy Check) or RSSI (Received Signal Strength Indicator) signal, for example. Actually, threshold value 1 is selected and output when reception quality information indicates that reception quality is good, and threshold value 2, which is greater than threshold value 1, is selected and output when reception quality information indicates that reception quality is poor.

Size comparison section 261 makes a threshold value decision on the size of inverse matrix determinant absolute value |AD−BC| used by propagation path compensation and interference compensation sections 124 and 126, using a threshold value that is changed according to reception quality in this way.

As a result, when reception quality is poor, size comparison section 261 of receiving system 300 outputs to transmitting systems 250 and 280 described in Embodiment 12 and Embodiment 13 a decision signal S20 that controls transmitting systems 250 and 280 in the direction of transmitting an OFDM signal from only one antenna to a greater extent than in Embodiment 12 or Embodiment 13.

According to the above configuration, by varying the threshold value for comparing the size of an inverse matrix determinant absolute value for propagation path compensation and interference compensation according to reception quality, in addition to transmitting an OFDM signal from only one antenna, when that inverse matrix determinant absolute value is small, it is possible to improve error rate characteristics in a propagation environment in which the aforementioned inverse matrix determinant absolute value is small to a greater extent than in Embodiment 12 or Embodiment 13.

Embodiment 15

A special feature of this embodiment is that, as compared with Embodiment 12 and Embodiment 13, an OFDM signal is transmitted from only one antenna in a propagation environment in which there are many subcarriers for which an inverse matrix determinant absolute value used by an interference compensation section is small. By this means, it is possible to improve error rate characteristics to a much greater extent while suppressing a decrease in transmission efficiency than in the case of Embodiment 12 or Embodiment 13.

The present inventors considered that, when there are few subcarriers for which an inverse matrix determinant absolute value used by an interference compensation section is small (for example, when only three subcarriers are below the threshold value out of a total of 48 subcarriers), there is no problem in transmitting OFDM signals from a plurality of antennas since error rate characteristics can be improved by an error rate correction effect by the decoding section. In contrast to this, when there are many subcarriers for which an inverse matrix determinant absolute value used by an interference compensation section is small, error rate characteristics should be improved by transmitting an OFDM signal from only one antenna, since there can be no great expectation of an error rate correction effect by the decoding section.

Figure 35:
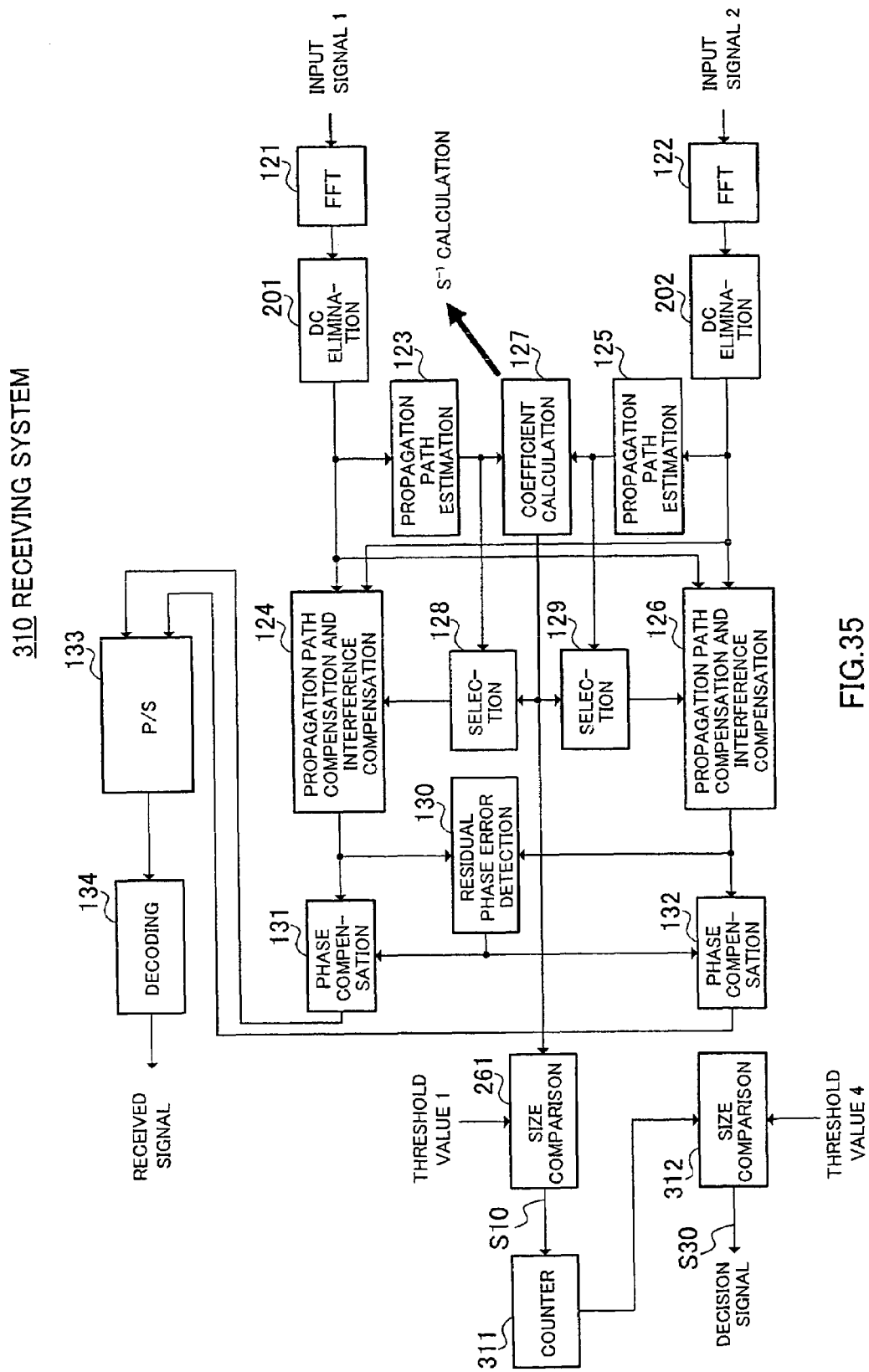
FIG. 35 is a block diagram showing the configuration of the receiving system of an OFDM communication apparatus according to Embodiment 15.

In FIG. 35, in which parts corresponding to those in FIG. 32 are assigned the same codes as in FIG. 32, receiving system 310 of this embodiment has a similar configuration to that of receiving system 260 in FIG. 32, but differs in having a counter 311 that counts size comparison section 261 comparison results, and a size comparison section 312 that makes a threshold value decision on the counter 311 count value.

Counter 311 counts the number of subcarriers for which absolute value |AD−BC| is below threshold value 1, based on decision signal S10 from size comparison section 261. Size comparison section 312 compares the count value with threshold value 3, and if the count value exceeds threshold value 3, outputs to transmitting systems 250 and 280 described in Embodiment 12 and Embodiment 13 a decision signal S30 indicating that an OFDM signal is to be transmitted from only one antenna.

According to the above configuration, by considering the number of subcarriers for which an inverse matrix determinant absolute value used by an interference compensation section is small, and selecting accordingly whether or not an OFDM signal is to be transmitted from only one antenna, it is possible to improve error rate characteristics while achieving transmission efficiency to a greater extent than in Embodiment 12 or Embodiment 13.

Embodiment 16

A special feature of this embodiment is that, as compared with Embodiment 15, an OFDM signal is transmitted from only one antenna in a propagation environment in which there are consecutive subcarriers for which an inverse matrix determinant absolute value used by an interference compensation section is small. By this means, it is possible to improve error rate characteristics to a much greater extent while suppressing a decrease in transmission efficiency than in the case of Embodiment 15.

The present inventors noted that, when data of poor quality is concentrated, the error correction effect decreases, and error rate characteristics degrade. Taking this into consideration, in this embodiment error rate characteristics are improved by transmitting an OFDM signal from only one antenna in the case of a propagation environment in which there are consecutive subcarriers for which an inverse matrix determinant absolute value used by an interference compensation section is small —that is to say, when data of poor quality is concentrated.

Figure 36:
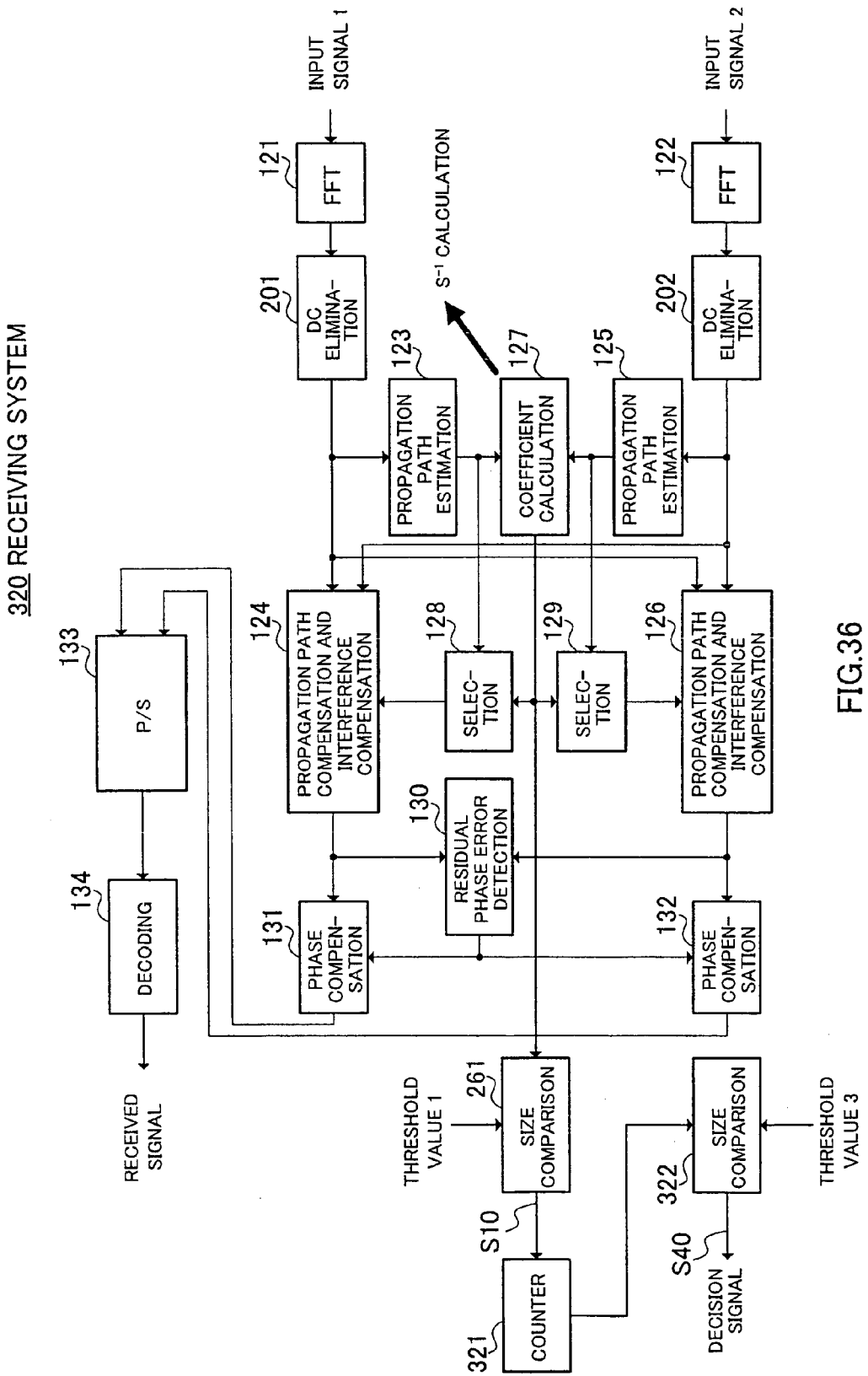
FIG. 36 is a block diagram showing the configuration of the receiving system of an OFDM communication apparatus according to Embodiment 16.

In FIG. 36, in which parts corresponding to those in FIG. 35 are assigned the same codes as in FIG. 35, receiving system 320 of this embodiment has a similar configuration to that of receiving system 310 in FIG. 35, but differs in being provided with a counter 321 that performs both incrementing and decrementing of the count value and a size comparison section 322 that compares the sizes of the count value and threshold value 4, instead of counter 311 and size comparison section 312 in FIG. 35.

Counter 321 counts the degree of concentration of subcarriers for which inverse matrix determinant absolute value |AD−BC| is below threshold value 1, based on decision signal S10 from size comparison section 261. That is to say, the count value is incremented when the absolute value is below threshold value 1, and is decremented when the absolute value is greater than or equal to threshold value 1.

Size comparison section 322 compares the count value with threshold value 4, and if the count value exceeds threshold value 4—that is to say, if the degree of concentration of subcarriers for which absolute value |AD−BC| is below threshold value 1 exceeds a given value—sends to transmitting systems 250 and 280 described in Embodiment 12 and Embodiment 13 a decision signal S40 indicating that an OFDM signal is to be transmitted from only one antenna.

According to the above configuration, by considering the degree of concentration of subcarriers for which inverse matrix determinant absolute value |AD−BC| is below a predetermined threshold value, and selecting accordingly whether or not an OFDM signal is to be transmitted from only one antenna, it is possible to improve error rate characteristics while achieving transmission efficiency to a greater extent than in Embodiment 15.

Embodiment 17

A special feature of this embodiment is that, as compared with Embodiment 16, the threshold value used for deciding the degree of concentration of subcarriers for which inverse matrix determinant absolute value |AD−BC| is below a predetermined threshold value is made variable according to reception quality. By this means, it is possible to improve error rate characteristics to a much greater extent while suppressing a decrease in transmission efficiency than in the case of Embodiment 16.

Figure 37:
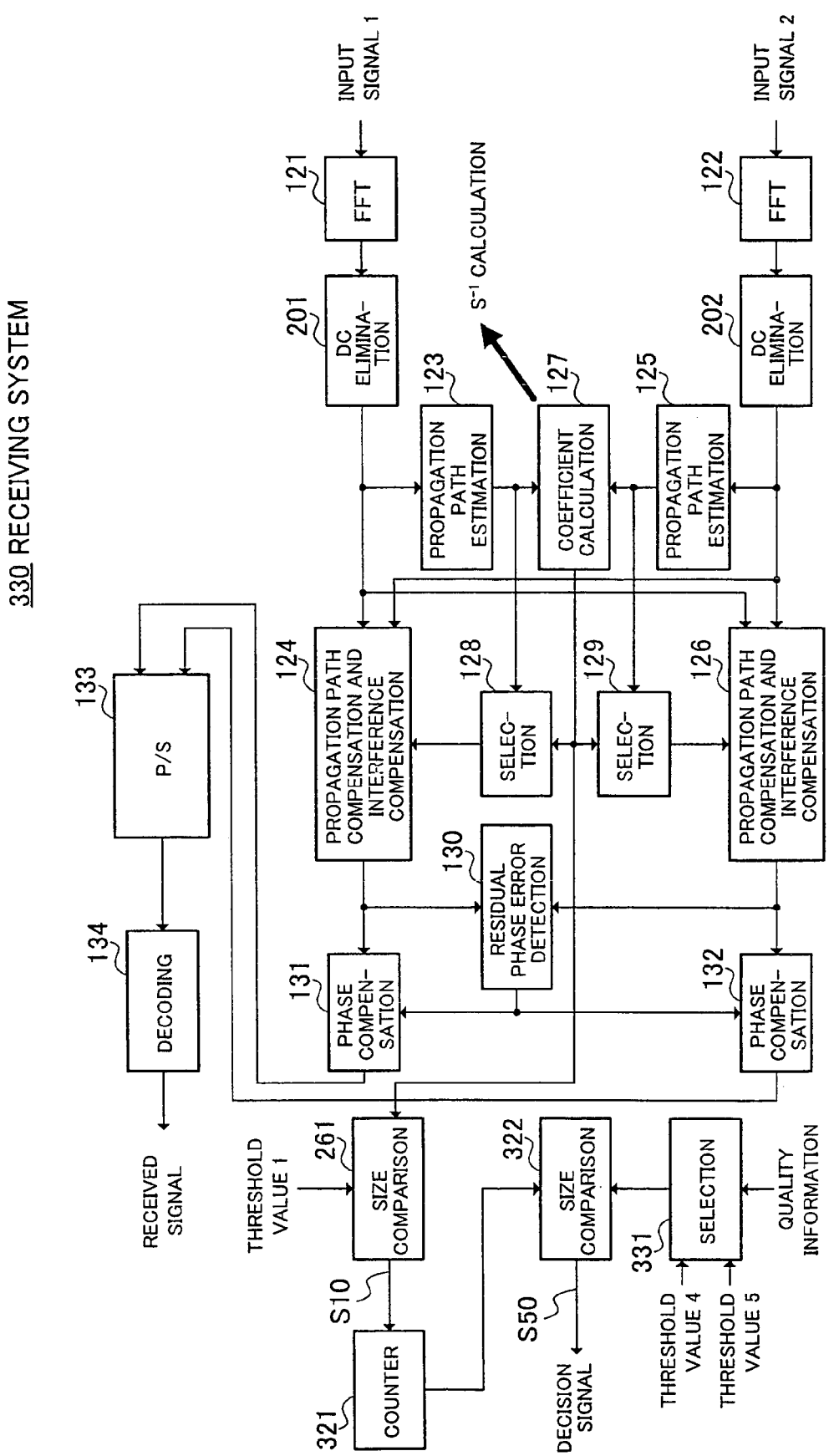
FIG. 37 is a block diagram showing the configuration of the receiving system of an OFDM communication apparatus according to Embodiment 17.

In FIG. 37, in which parts corresponding to those in FIG. 36 are assigned the same codes as in FIG. 36, receiving system 330 of this embodiment has a similar configuration to that of receiving system 320 in FIG. 36, but differs in having a selection section 331 that selects the threshold value used in a threshold value decision by size comparison section 322.

Selection section 331 selects and outputs either threshold value 4 or threshold value 5, which are different values (it being here assumed that threshold value 4<threshold value 5), based on reception quality information such as a CRC (Cyclic Redundancy Check) or RSSI (Received Signal Strength Indicator) signal, for example. Actually, threshold value 5 is selected and output when reception quality information indicates that reception quality is good, and threshold value 4, which is smaller than threshold value 5, is selected and output when reception quality information indicates that reception quality is poor.

Size comparison section 322 makes a threshold value decision on the degree of concentration of subcarriers for which inverse matrix determinant absolute value |AD−BC| is below a predetermined threshold value, using a threshold value that is changed according to reception quality in this way.

Thus, when reception quality is poor, size comparison section 322 of receiving system 330 outputs to transmitting systems 250 and 280 described in Embodiment 12 and Embodiment 13 a decision signal S50 that controls transmitting systems 250 and 280 in the direction of transmitting an OFDM signal from only one antenna even if the degree of concentration of subcarriers for which absolute value |AD−BC| is below a predetermined threshold value is small.

According to the above configuration, by considering the degree of concentration of subcarriers for which inverse matrix determinant absolute value |AD−BC| is below a predetermined threshold value and reception quality, and selecting accordingly whether or not an OFDM signal is to be transmitted from only one antenna, it is possible to improve error rate characteristics while achieving transmission efficiency to a greater extent than in Embodiment 16.

Embodiment 18

A special feature of this embodiment is that the time from terminating reception to starting transmission can be shortened by transmitting an OFDM signal from only one antenna for the last data group.

There are cases where the time from the end of reception to the start of transmission is stipulated, as in an MMAC (Multimedia Mobile Access Communication) HiSWAN (High Speed Wireless Access Network). There are also cases where such a stipulated time from the end of reception to the start of transmission can not be satisfied because the processing delay of a receiving system interference compensation circuit is longer than that of an ordinary coherent detection circuit.

Taking this into consideration, in this embodiment the processing delay of the last data group is shortened by transmitting the last data group as an OFDM signal from only one antenna, and by this means, the time from terminating reception to starting transmission is shortened.

Figure 38:
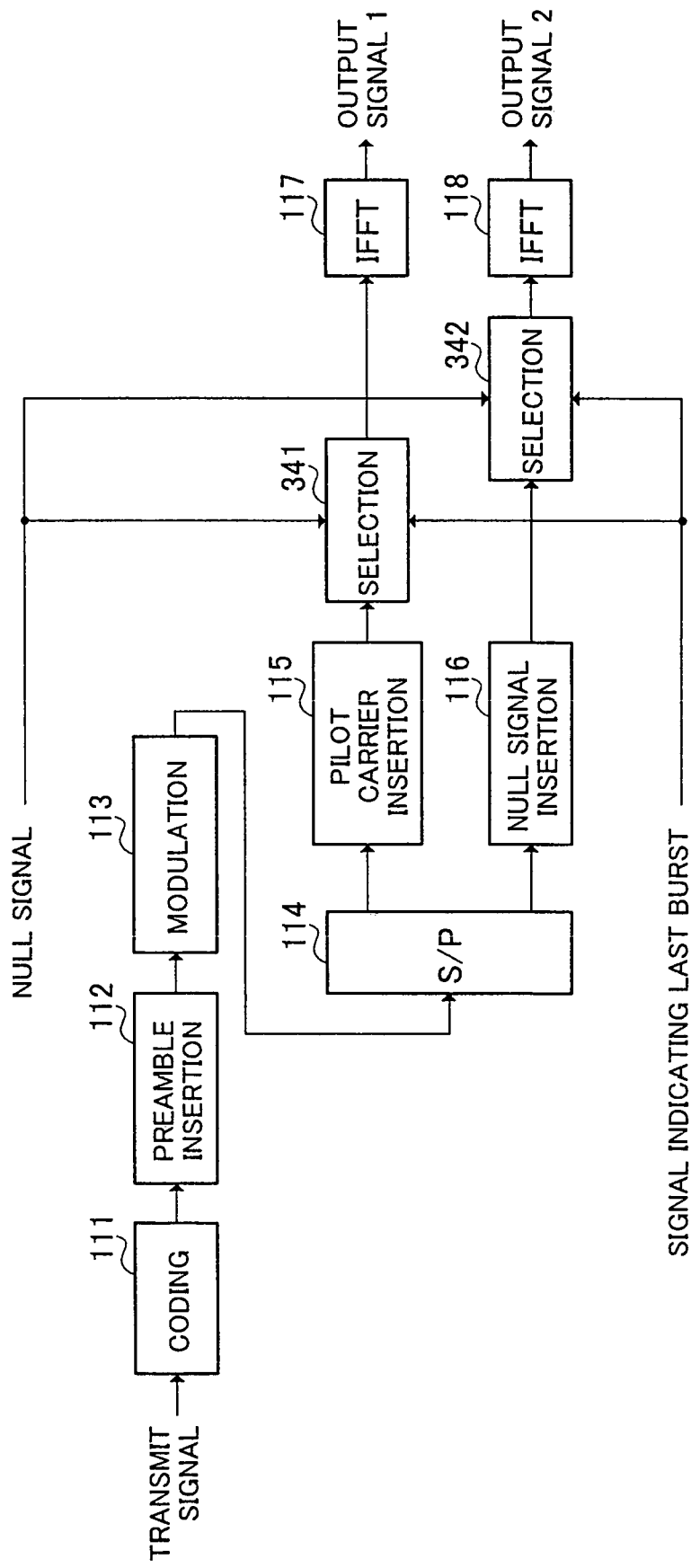
FIG. 38 is a block diagram showing the configuration of the transmitting system of an OFDM communication apparatus according to Embodiment 18.

FIG. 38 shows the configuration of a transmitting system 340 of this embodiment. In FIG. 38, in which parts corresponding to those in FIG. 11 are assigned the same codes as in FIG. 11, transmitting system 340 is provided with a selection section 341 in the processing system of output signal 1 transmitted from antenna AN1, and a selection section 342 in the processing system for output signal 2 transmitted from antenna AN2.

Selection section 341 has as input the output from pilot carrier insertion section 115, and also a null signal. Selection section 342 has as input transmit data after null signal insertion by null signal insertion section 116, and also a null signal. Each of selection sections 341 and 342 selectively outputs transmit data or a null signal based on a signal that indicates the last burst.

Specifically, when a signal indicating the last burst is not input, selection section 341 outputs the signal from pilot carrier insertion section 115 and selection section 342 outputs the signal from null signal insertion section 116. On the other hand, when a signal indicating the last burst is input, either selection section 341 or selection section 342 selects and outputs a null signal. By this means, the last data group can be transmitted as an OFDM signal from only one antenna.

Embodiment 19

A special feature of this embodiment is that during a time period when terminals are communicating, an OFDM signal is transmitted from only one antenna from the base station to the communication terminals.

Figure 39:
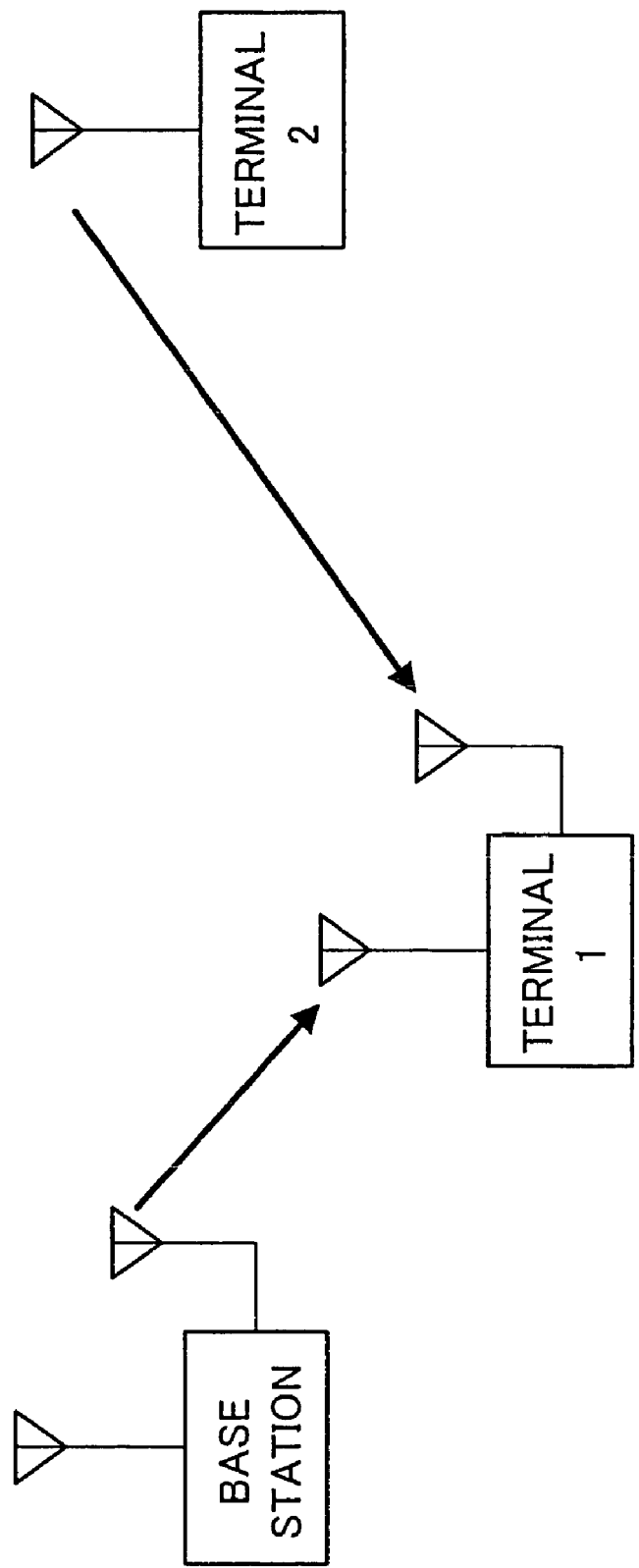
FIG. 39 is a block diagram showing the overall configuration of an OFDM communication apparatus according to Embodiment 19.

Depending on the system, terminals may also communicate as in OFDM communication system 350 shown in FIG. 39. In this case, it is necessary to secure time periods in which the terminals communicate, and control is complicated. Taking this into consideration, in this embodiment OFDM signals are transmitted from the base station to terminal 1 from only one antenna. By this means, terminal 1 can receive both data transmitted from the base station and data transmitted from terminal 2, making it unnecessary to secure a time period in which the terminals communicate by means of complex control.

Figure 40:
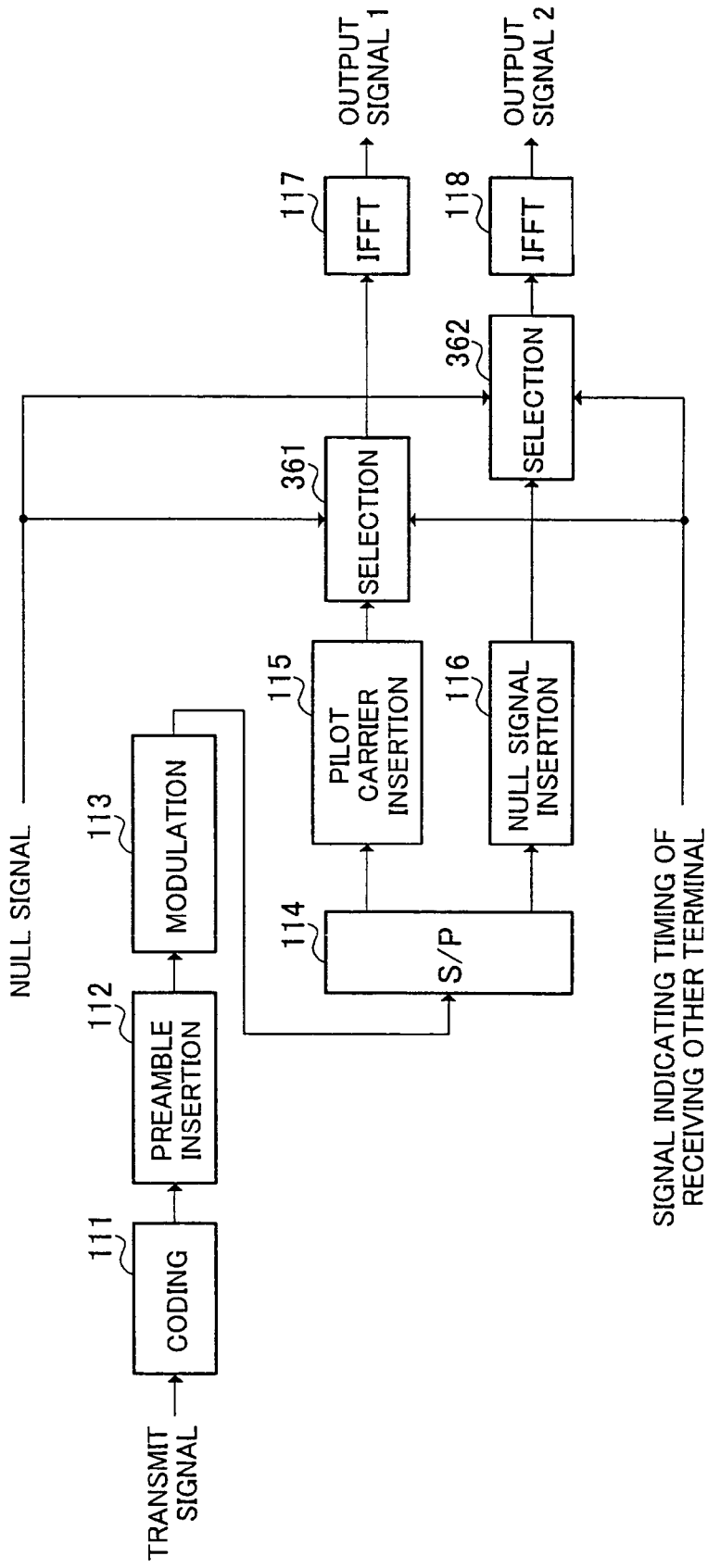
FIG. 40 is a block diagram showing the configuration of the transmitting system of an OFDM communication apparatus according to Embodiment 19.

FIG. 40 shows the configuration of a transmitting system of this embodiment. Such a transmitting system 360 is provided in the radio base station in FIG. 39. In FIG. 40, in which parts corresponding to those in FIG. 38 are assigned the same codes as in FIG. 38, receiving system 360 of this embodiment has a similar configuration to that of receiving system 340 in FIG. 38, but differs in that information indicating the timing at which terminal 1 (FIG. 39) receives a signal from terminal 2 is input to selection sections 361 and 362.

In transmitting system 360, at times other than the timing at which terminal 1 receives a signal from terminal 2, selection section 361 outputs the signal from pilot carrier insertion section 115 and selection section 362 outputs the signal from null signal insertion section 116. On the other hand, at the timing at which terminal 1 receives a signal from terminal 2, either selection section 361 or selection section 362 selects and outputs a null signal.

By this means, it is possible to transmit an OFDM signal from only one antenna at the timing at which terminal 1 receives a signal from terminal 2. As a result, a terminal can receive OFDM signals from a base station while securing communication with another terminal.

Embodiment 20

A special feature of this embodiment is that by periodically performing processing where by an OFDM signal is transmitted from only one antenna it is possible for periodical updating of propagation path estimation results (hereinafter referred to as "propagation path tracking") to be performed on the receiving side. By this means, it is possible to suppress degradation of error rate characteristics when propagation path fluctuation is fast relative to the propagation path estimation preamble interval.

When propagation path fluctuation is fast relative to the propagation path estimation preamble interval, error rate characteristic degradation increases. Propagation path tracking is a well-known technology used in such cases, but it is difficult to perform propagation path tracking with the frame formats used to send different OFDM signals from a plurality of antennas, as in these embodiments.

Taking this into consideration, in this embodiment processing whereby an OFDM signal is transmitted from only one antenna is performed periodically, and propagation path tracking is carried out on the receiving side using this OFDM signal transmitted from only one antenna. As a result, it is possible to suppress degradation of error rate characteristics when propagation path fluctuation is fast relative to the propagation path estimation preamble interval.

Figure 41:
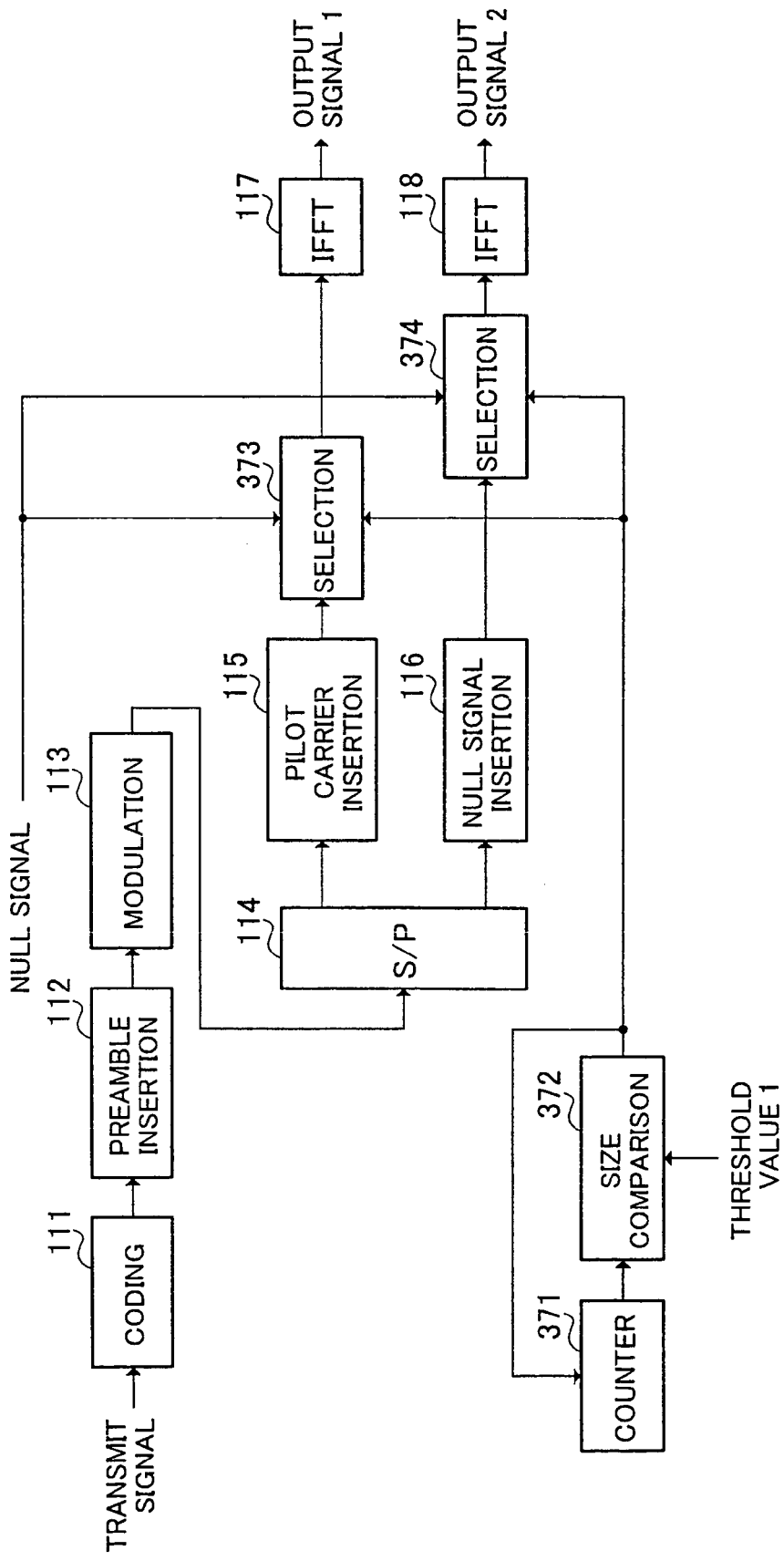
FIG. 41 is a block diagram showing the configuration of the transmitting system of an OFDM communication apparatus according to Embodiment 20.

FIG. 41 shows the configuration of a transmitting system of this embodiment. In FIG. 41, in which parts corresponding to those in FIG. 40 are assigned the same codes as in FIG. 40, in receiving system 370 the count value from a free-running counter 371 is input to a size comparison section 372. Size comparison section 372 compares the count value with threshold value 1, and when the count value becomes greater than the threshold value, sends a decision signal indicating this fact to selection sections 373 and 374 and counter 371.

When a decision signal indicating that the count value has become greater than the threshold value is input to selection sections 373 and 374, either selection section 373 or selection section 374 selectively outputs a null signal, as a result of which an OFDM signal is transmitted from only one antenna. When a decision signal indicating that the count value has become greater than the threshold value is input to counter 371, the count value is reset and count value incrementing is performed again on a free-running basis.

By this means, a decision signal indicating that the count value has become greater than the threshold value is obtained periodically, and processing whereby an OFDM signal is transmitted from only one antenna can be performed periodically.

Figure 42:
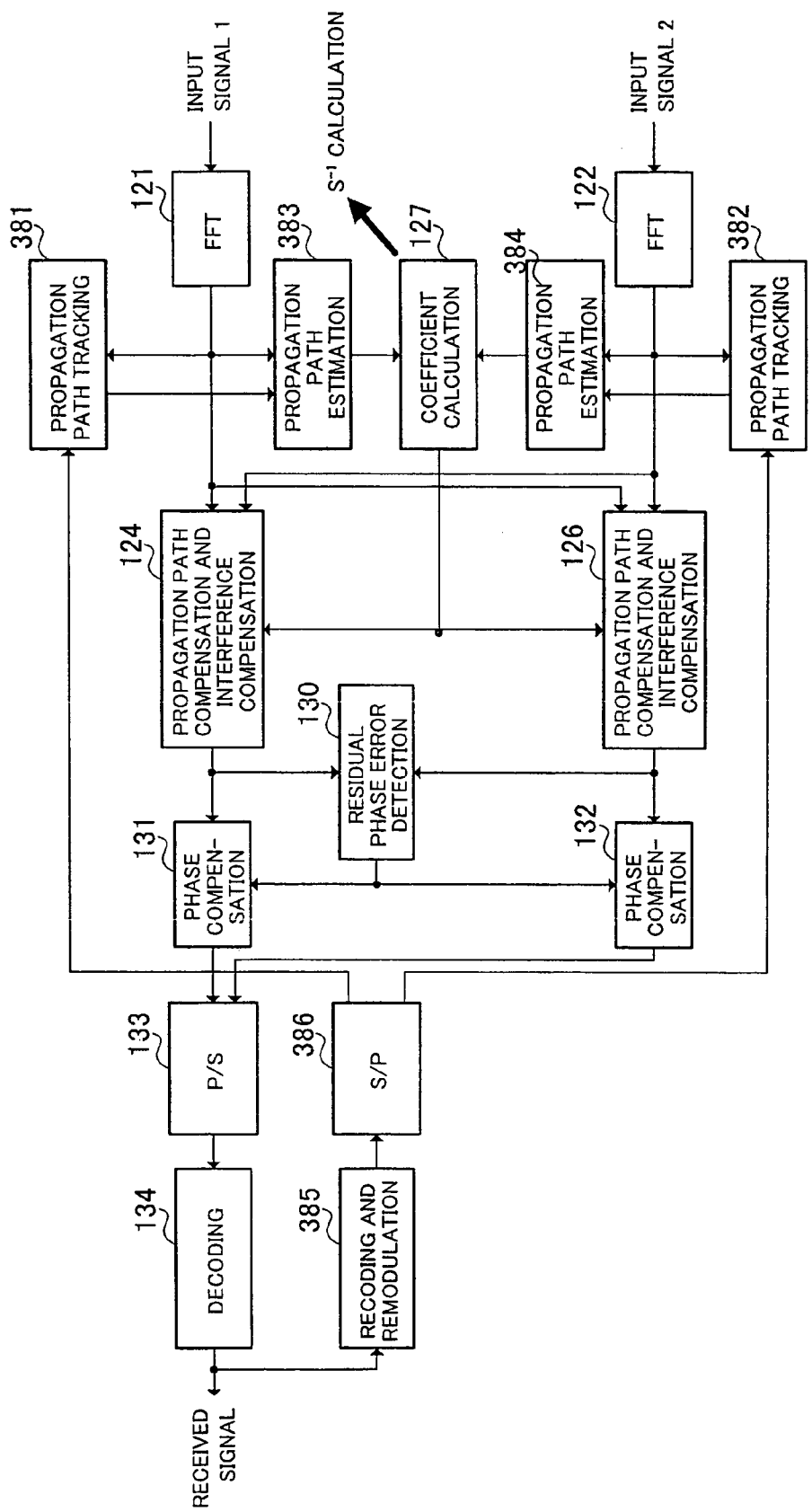
FIG. 42 is a block diagram showing the configuration of the receiving system of an OFDM communication apparatus according to Embodiment 20.

FIG. 42 shows the configuration of a receiving system that receives and demodulates OFDM signals transmitted from receiving system 370. In FIG. 42, in which parts corresponding to those in FIG. 12 are assigned the same codes as in FIG. 12, receiving system 380 has a similar configuration to that of receiving system 120 in FIG. 12, but differs in having propagation path tracking sections 381 and 382 that perform propagation path tracking processing on OFDM signals (input signal 1 and input signal 2) received by the antennas, and also having a recoding and remodulation section 385 and serial/parallel conversion section (S/P) 386 that supply local-encoded signals to propagation path tracking sections 381 and 382.

Recoding and remodulation section 385 executes local-encoding of a received signal by performing the same coding and modulation processing as on the transmitting side on a decoded received signal, and S/P 386 splits the resulting signal into transmit data 1 and transmit data 2 which are sent to corresponding propagation path tracking sections 381 and 382.

Figure 43:
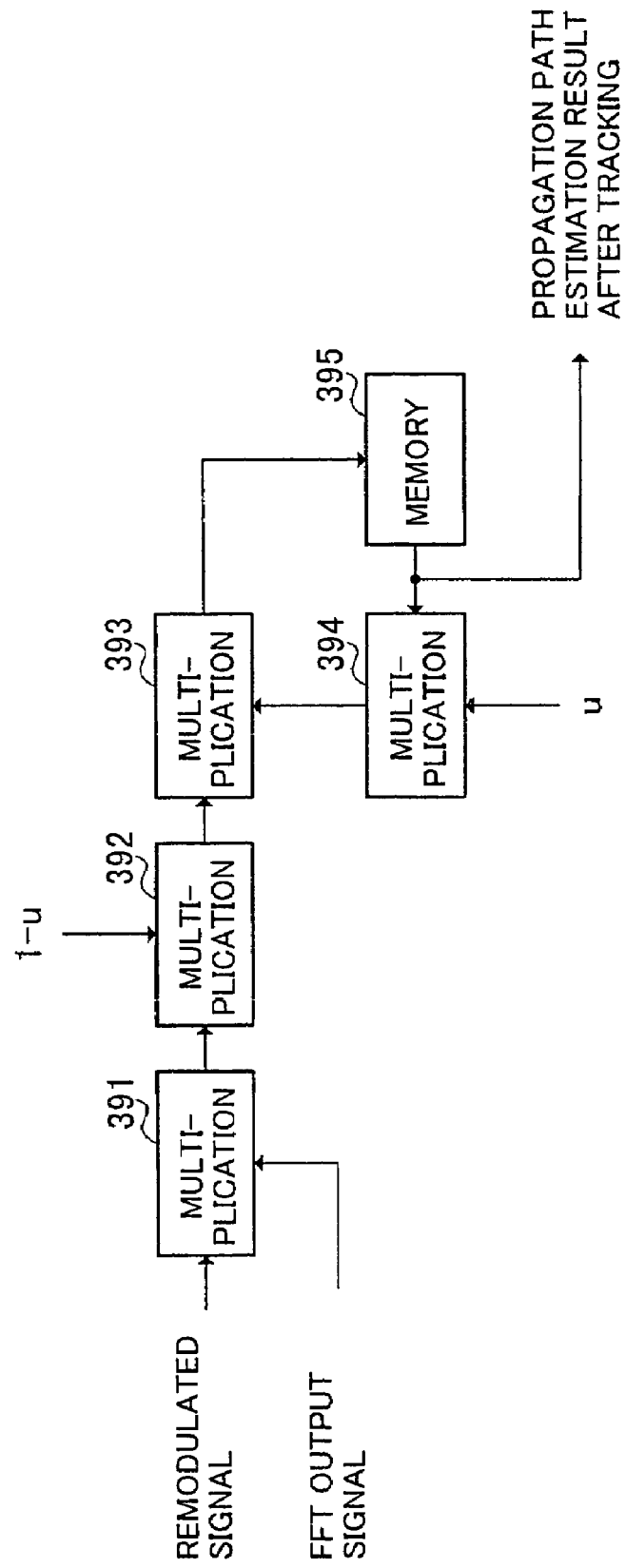
FIG. 43 is a block diagram showing the configuration of a propagation path tracking section.

FIG. 43 shows the configuration of propagation path tracking sections 381 and 382. The propagation path tracking processing used here is a well-known technology, and will therefore be described briefly. Propagation path tracking section 381 (382) multiplies the remodulated signal by the FTT output signal by means of a multiplier 391. The signal resulting from this multiplication is multiplied by a value of 1-u by means of a multiplier 392, and the resulting signal is sent to an adder 393. Adder 393 adds together the result of multiplying the addition result stored in memory 395 by value u by means of a multiplier 394, and the multiplier 392 multiplication result. The result of this addition is then stored in memory 395. The addition value stored in memory 395 is then taken as the post-tracking propagation path estimation result, and is sent to propagation path estimation sections 383 and 384 in FIG. 42.

According to the above configuration, by periodically performing processing whereby an OFDM signal is transmitted from only one antenna, it is possible to suppress degradation of error rate characteristics when propagation path fluctuation is fast.

Embodiment 21

A special feature of this embodiment is that, as compared with Embodiment 20, processing whereby an OFDM signal is transmitted from only one antenna is performed periodically, and also this period is made variable. By this means, it is possible to suppress degradation of error rate characteristics while effectively suppressing a decrease in transmission efficiency in comparison with Embodiment 20.

Making the period for transmitting from only one antenna variable enables transmission efficiency and error rate characteristics to be made compatible. For example, if it is wished to transmit as much information as possible, it is preferable to make the period for transmitting from only one antenna long. However, if it is wished to obtain satisfactory error rate characteristics, it is preferable to make the period for transmitting from only one antenna short. For example, if it is wished to send more data than in another burst, the period for transmitting from only one antenna should be made long.

Figure 44:
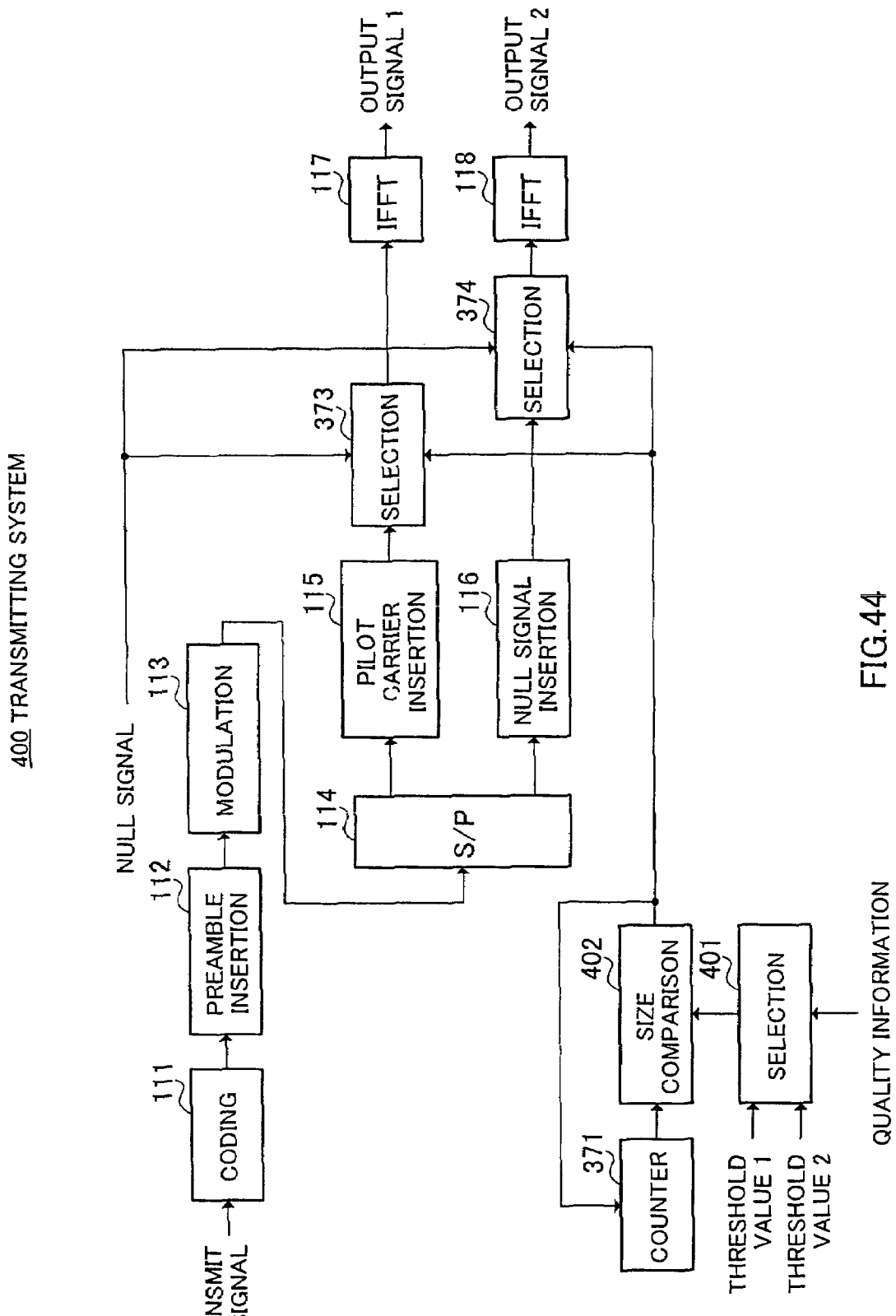
FIG. 44 is a block diagram showing the configuration of the transmitting system of an OFDM communication apparatus according to Embodiment 21.

FIG. 44 shows the configuration of a transmitting system of this embodiment. In FIG. 44, in which parts corresponding to those in FIG. 41 are assigned the same codes as in FIG. 41, transmitting system 400 of this embodiment has a similar configuration to that of transmitting system 390 in FIG. 44, but differs in having a selection section 401 that selects the threshold value used by a size comparison section 402.

Selection section 401 selects and outputs either threshold value 1 or threshold value 2, which are different values (it being here assumed that threshold value 1<threshold value 2), based on reception quality information such as a CRC or RSSI signal. It is preferable for this reception quality information to be obtained by the far-end station when performing FDD communication, and by the local station when performing TDD communication.

Selection section 401 selects and outputs threshold value 2 when reception quality is good, and selects and outputs threshold value 1, which is smaller than threshold value 2, when reception quality is poor. As a result, in transmitting system 400, the poorer the reception quality, the shorter is the period set as the period for transmitting an OFDM signal from only one antenna. At this time, propagation path tracking processing can be performed with high precision on the receiving side, enabling reception quality to be improved.

According to the above configuration, by periodically performing processing where by an OFDM signal is transmitted from only one antenna, and also making this period variable, it is possible to achieve compatibility of transmission efficiency and error rate characteristics to a greater extent than in Embodiment 20.

In this embodiment, required transmit data volume and reception quality have been cited as conditions for varying the period, but the conditions are not limited to these. For example, there is a method whereby propagation path fluctuation speed is estimated (with propagation path fluctuation being considered fast if the difference in the propagation path estimation result compared with the previous burst exceeds a threshold value, for instance), and the period is made shorter if this fluctuation speed exceeds a threshold value.

Embodiment 22

A special feature of this embodiment is that, when using a plurality of antennas (for example, multi-sector antennas), an OFDM signal is transmitted from only one antenna in the case of a propagation environment in which an inverse matrix determinant absolute value used by an interference compensation section is small whichever antenna is used. By this means, compatibility of transmission efficiency and error rate characteristics can be achieved.

When a plurality of antennas are used, as with multi-sector antennas, by changing the sector it is possible to select a propagation path for which error rate characteristics do not degrade even if different data are transmitted simultaneously from a plurality of antennas.

In this embodiment this point is taken into consideration, and when a plurality of antennas are used, as with multi-sector antennas, an OFDM signal is transmitted from only one antenna only in the case of a propagation environment in which an inverse matrix determinant absolute value used by an interference compensation section is small whichever antenna is selected.

Figure 45:
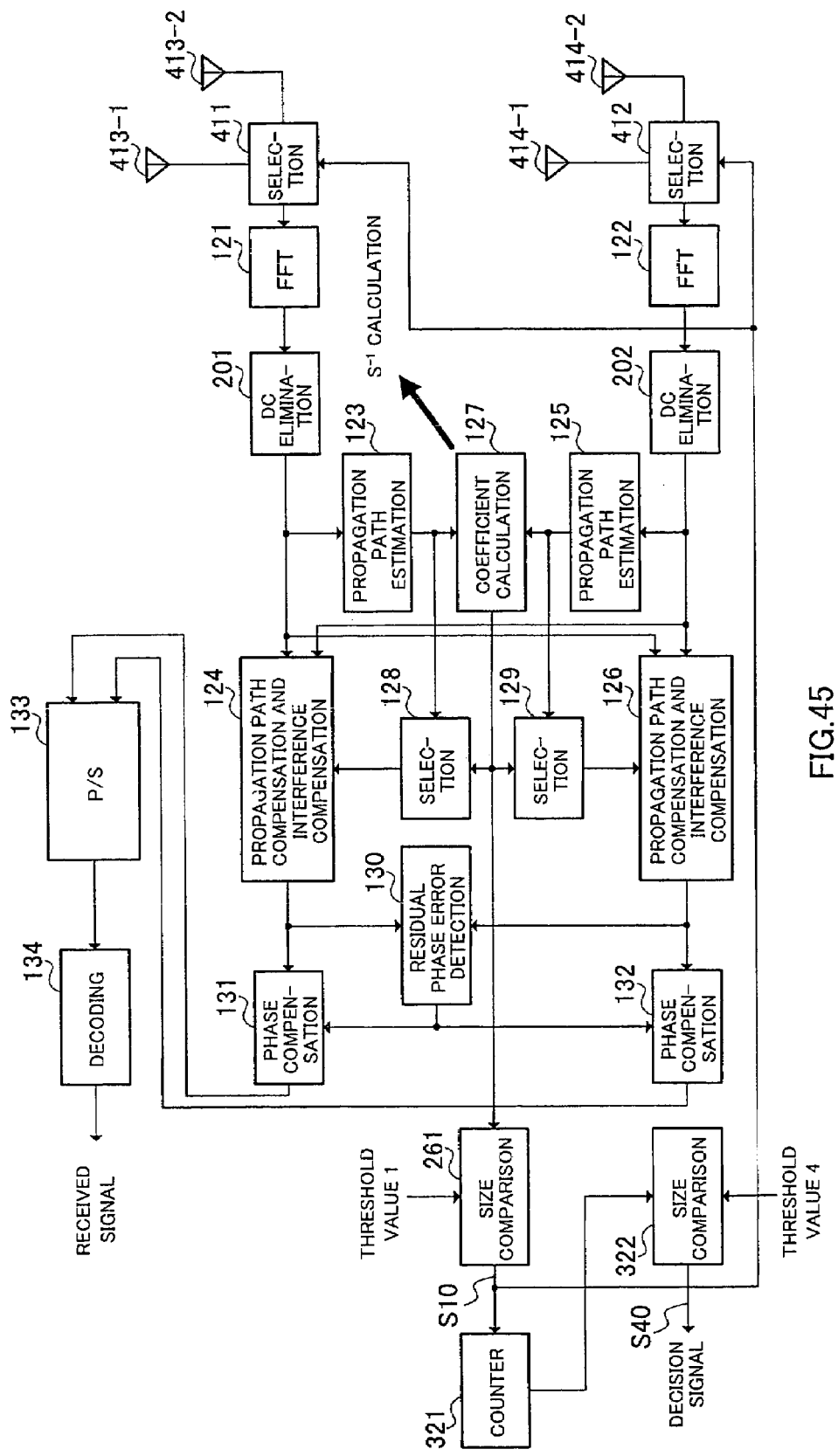
FIG. 45 is a block diagram showing the configuration of the receiving system of an OFDM communication apparatus according to Embodiment 22.

FIG. 45 shows the configuration of a receiving system of this embodiment. In FIG. 45, in which parts corresponding to those in FIG. 36 are assigned the same codes as in FIG. 36, receiving system 410 has multi-sector antennas 413-1, 413-2, 414-1, and 414-2, and selection sections 411 and 412 that select predetermined antennas from among those multi-sector antennas 413-1, 413-2, 414-1, and 414-2.

Selection sections 411 and 412 select a receiving antenna based on decision signal S10 from size comparison section 261. For example, first, selection section 411 selects antenna 413-1 and selection section 412 selects antenna 414-1, and reception signal receive demodulation is performed based on the received signals from these antennas. If a decision signal S10 indicating that absolute value |AD−BC| is below threshold value 1 is obtained by size comparison section 261 at this time, selection section 411 switches the receiving antenna to antenna 413-2, and selection section 412 switches the receiving antenna to antenna 414-2.

If, in receiving system 410, a decision signal S10 indicating that absolute value |AD−BC| is below threshold value 1 is still obtained by size comparison section 261 despite switching of the antennas in this way, decision signal S40 indicating that an OFDM signal is to be transmitted from only one antenna is sent from size comparison section 322 to the transmitting system. In the case illustrated in FIG. 45, threshold value 4 of size comparison section 322 is set to "1", and decision signal S40 indicating that an OFDM signal is to be transmitted from only one antenna is sent when the counter 321 count value becomes "2".

According to the above configuration, when a plurality of antennas are used, by transmitting an OFDM signal from only one antenna only in the case of a propagation environment in which an inverse matrix determinant absolute value used by an interference compensation section is small whichever antenna is selected, it is possible to achieve compatibility of transmission efficiency and error rate characteristics when using a plurality of antennas.

In this embodiment, a case has been described in which sector antennas are switched when an inverse matrix determinant absolute value used by an interference compensation section is small, but the sector antenna switching method is not limited to this. For example, it is also possible for sector antennas to be switched when the number of subcarriers for which an inverse matrix determinant absolute value used by an interference compensation section is below a threshold value exceeds a threshold value. Alternatively, sector antennas may be switched when there are consecutive subcarriers for which an inverse matrix determinant absolute value used by an interference compensation section is below a threshold value.

In above Embodiments 12 through 17 and 22, an inverse matrix determinant absolute value used by an interference compensation section has been used as a criterion for determining whether or not an OFDM signal is to be transmitted from only one or other of a plurality of antennas, but the present invention is not limited to this, and the essential point is only that an OFDM signal be transmitted from only one or other of a plurality of antennas when propagation path estimation precision is low.

Embodiment 23

Figures 46A, 46B:
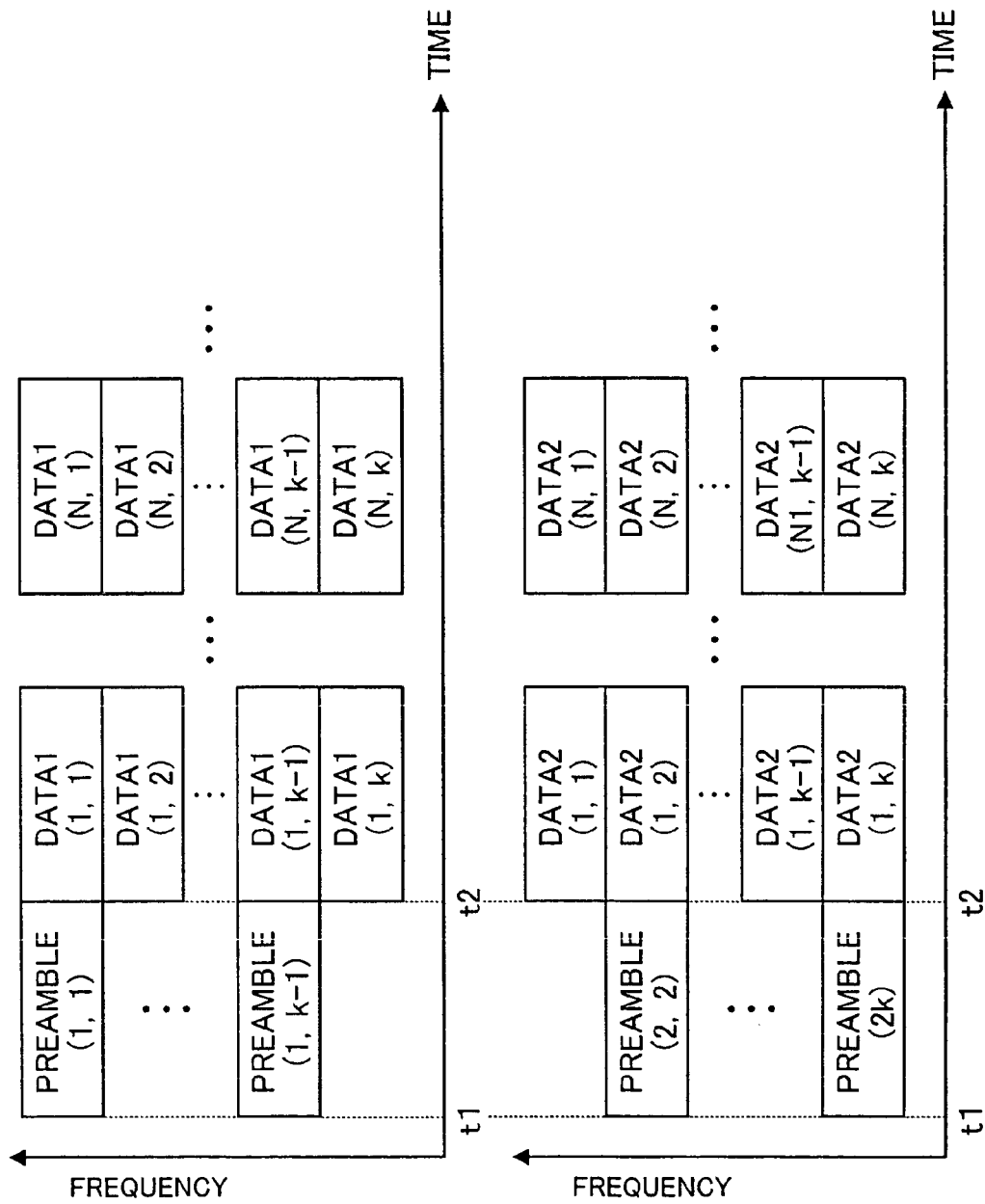
FIG. 46(A) is a drawing showing the relationship between propagation path estimation preambles, null signals, and data signals in an OFDM signal of Embodiment 23.
FIG. 46(B) is a drawing showing the relationship between propagation path estimation preambles, null signals, and data signals in an OFDM signal of Embodiment 23.

FIGS. 46(A) and (B) are schematic diagrams of OFDM signals transmitted from an OFDM communication apparatus of Embodiment 23 of the present invention. A special feature of this embodiment is that specific subcarriers of symbols that transmit a propagation path estimation preamble are made null signals, and another antenna transmits a propagation path estimation preamble from only subcarriers in which that null signal is inserted at the same time. Then, on the receiving side, the propagation path estimation results for subcarriers in which a null signal is inserted are calculated by means of interpolation. By this means, it is possible to prevent the occurrence of residual error deviation in propagation path estimation results, and to prevent degradation of error rate characteristics.

OFDM signals with the frame formats shown in FIGS. 46(A) and (B) are transmitted respectively from antennas AN1 and AN2 shown in FIG. 10. In FIGS. 46(A) and (B), DATA1 (N,K), for example, indicates that the N'th symbol relating to data 1 is transmitted by the K'th subcarrier at the time and frequency indicated by DATA1. Similarly, propagation path estimation preamble (1, k−1) indicates that the 1st symbol of the propagation path estimation preamble is transmitted by the (k−1)'th subcarrier at the time and frequency indicated by propagation path estimation preamble (1, k).

As can be seen from FIGS. 46(A) and (B), a propagation path estimation preamble is not transmitted from antenna AN2 for a subcarrier of the same time and frequency as a subcarrier by which a propagation path estimation preamble is transmitted from antenna AN1. Similarly, a propagation path estimation preamble is not transmitted from antenna AN1 for a subcarrier of the same time and frequency as a subcarrier by which a propagation path estimation preamble is transmitted from antenna AN2.

In addition, in this embodiment, as can be seen from looking at the first OFDM signal shown in FIG. 46(A) and the second OFDM signal shown in FIG. 46(B), although propagation path estimation preambles are not transmitted simultaneously by the same subcarrier within the same time from point t1 to point t2, propagation path estimation preambles are transmitted simultaneously using different subcarriers.

By this means, in an OFDM communication apparatus of this embodiment, by not placing propagation path estimation preambles on the same subcarrier of the same time between first and second OFDM signals, it is possible to prevent propagation path estimation preamble degradation due to interference between propagation path estimation preambles, and by placing propagation path estimation preambles on different subcarriers of the same time, it is possible to perform propagation path compensation with no residual phase error between first and second OFDM signals.

Figure 47:
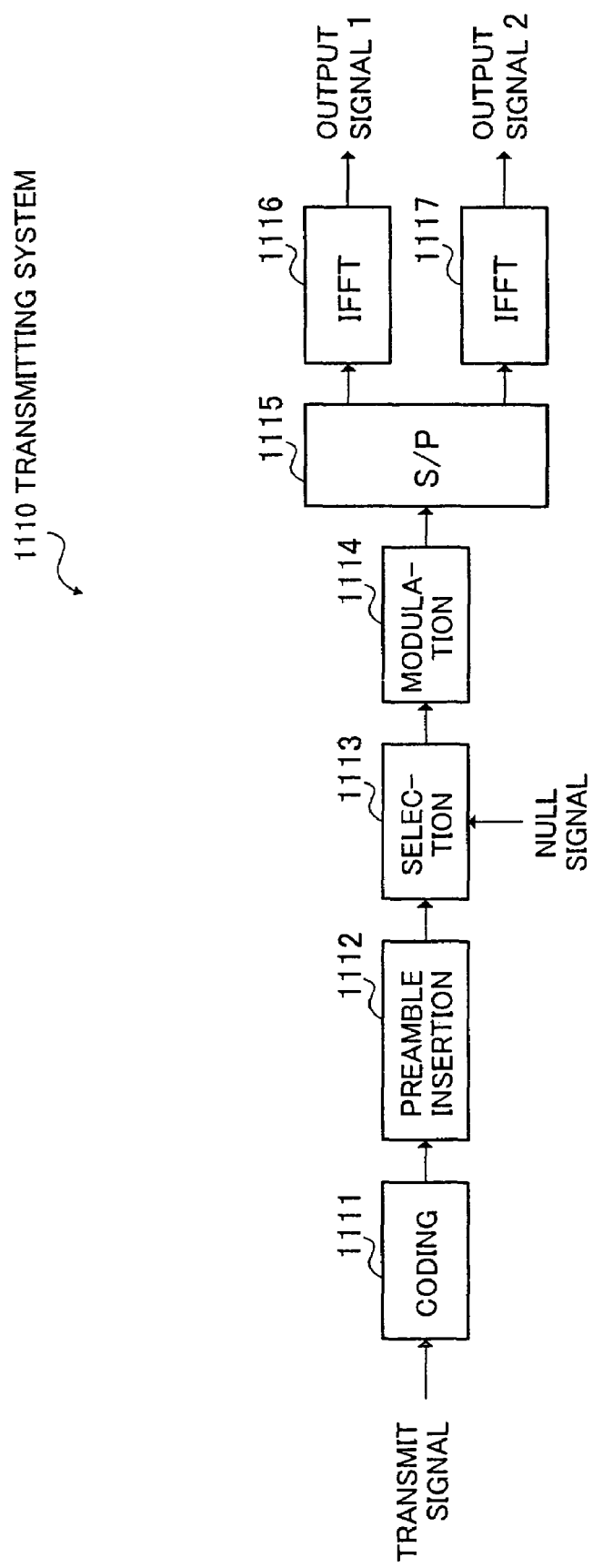
FIG. 47 is a block diagram showing the configuration of the transmitting system of an OFDM communication apparatus of Embodiments 23 and 24.

FIG. 47 is a block diagram showing the configuration of the transmitting system of an OFDM communication apparatus of this embodiment. In FIG. 47, reference numeral 1110 indicates the overall configuration of the transmitting system of an OFDM communication apparatus according to Embodiment 23. In transmitting system 1110, a transmit signal is input to a coding section 1111, and a signal that has undergone coding processing by coding section 1111 is sent to a preamble insertion section 1112.

In this embodiment, the transmit signal is a signal in which two data, data 1 and data 2, are alternately time division multiplexed on a frame-by-frame basis. For example, a signal comprising N symbols of data 1 is input to coding section 1111 during a period T, and then N symbols of data 2 are input to coding section 1111 during the next period T.

Preamble insertion section 1112 inserts one preamble symbol at the boundary position of data 1 and data 2 following coding processing (in the case of this embodiment, an N-symbol interval), and sends the data to a selection section 1113. A null signal (that is, a signal with a signal level of 0) is input to selection section 1113.

Selection section 1113 selects and outputs a null signal at timing such that a propagation path estimation preamble for data 1 is superimposed on an odd-numbered subcarrier and is not superimposed on an even-numbered subcarrier by a subsequent inverse fast Fourier transform section (IFFT) 1116. Selection section 1113 also selects and outputs a null signal at timing such that a propagation path estimation preamble for data 2 is superimposed on an even-numbered subcarrier and is not superimposed on an odd-numbered subcarrier by a subsequent IFFT 1117.

A modulation section 1114 executes digital modulation processing such as BPSK (Binary Phase Shift Keying), QPSK (Quadrature Phase Shift Keying), or 16-value QAM (Quadrature Amplitude Modulation), for example, on the signal selectively output by selection section 1113. The modulated signal is divided by a serial/parallel conversion section (S/P) 1115 into a data 1 signal and a data 2 signal, which are sent to IFFTs 1116 and 1117 respectively.

IFFTs 1116 and 1117 form OFDM signals as shown in FIGS. 46(A) and (B) by executing inverse fast Fourier transform processing on signals for data 1 and data 2 containing preambles and null signals. Output signals 1 and 2 resulting from inverse fast Fourier transform processing are superimposed on carriers of predetermined frequency by multipliers (not shown), band-limited to a predetermined frequency band by band-pass filters, and then transmitted from antenna AN1 and antenna AN2 respectively.

Figure 1:
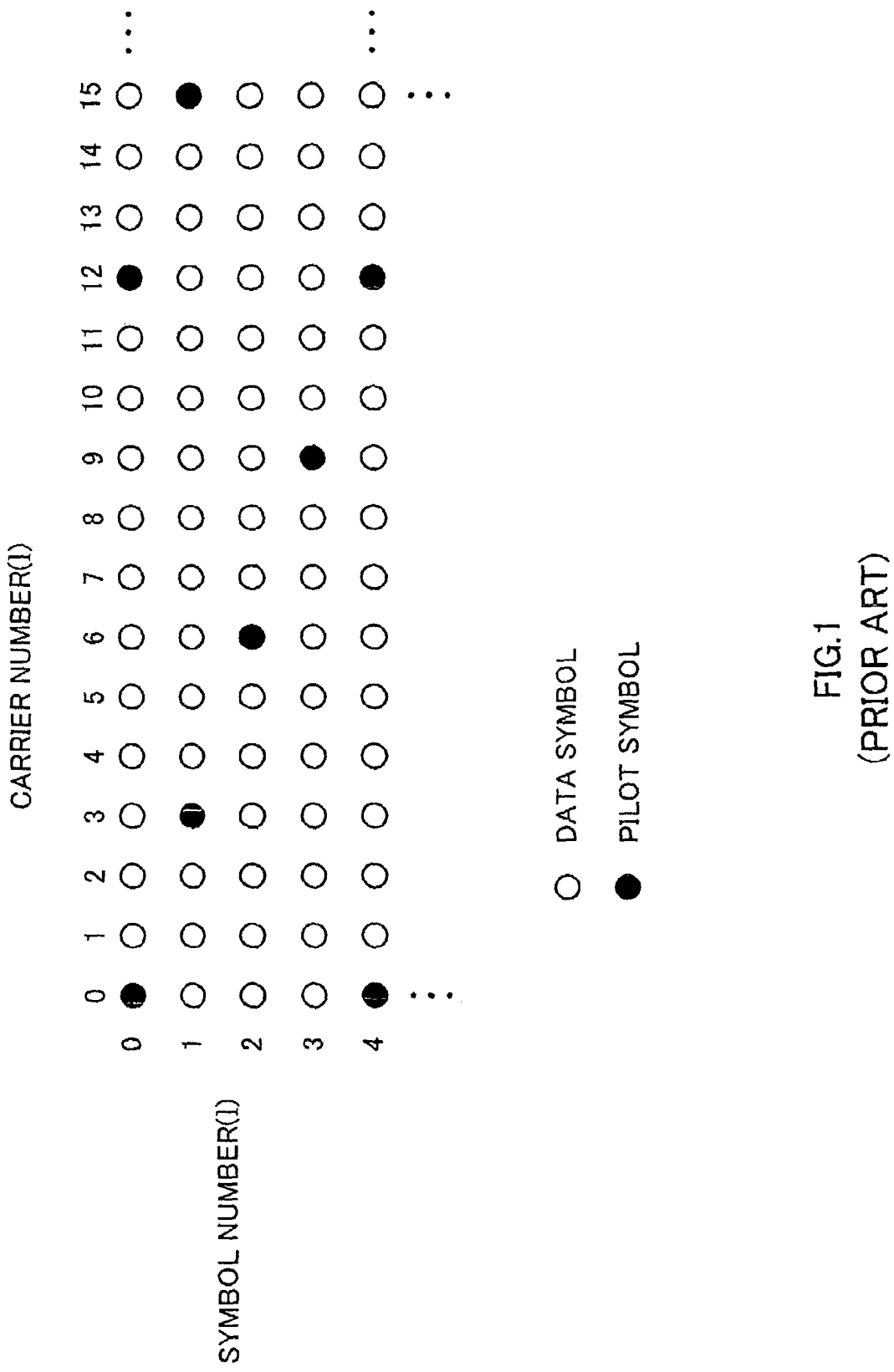
FIG. 1 is a drawing showing a sample pilot symbol arrangement in an OFDM signal.
Figure 2:
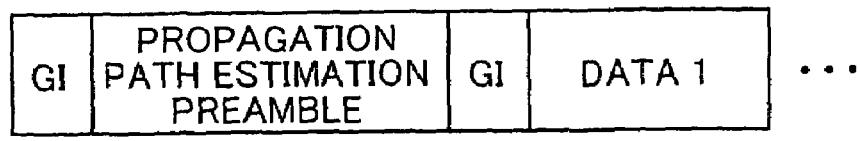
FIG. 2 is a drawing showing the frame configuration of an OFDM signal.
Figure 3:
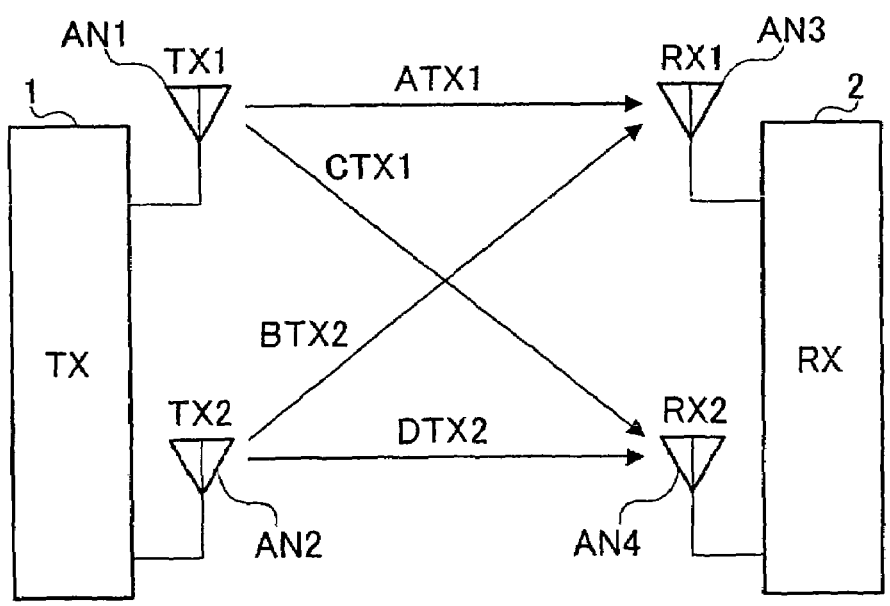
FIG. 3 is a drawing provided to explain propagation path estimation in an OFDM communication system.
Figures 4A, 4B:
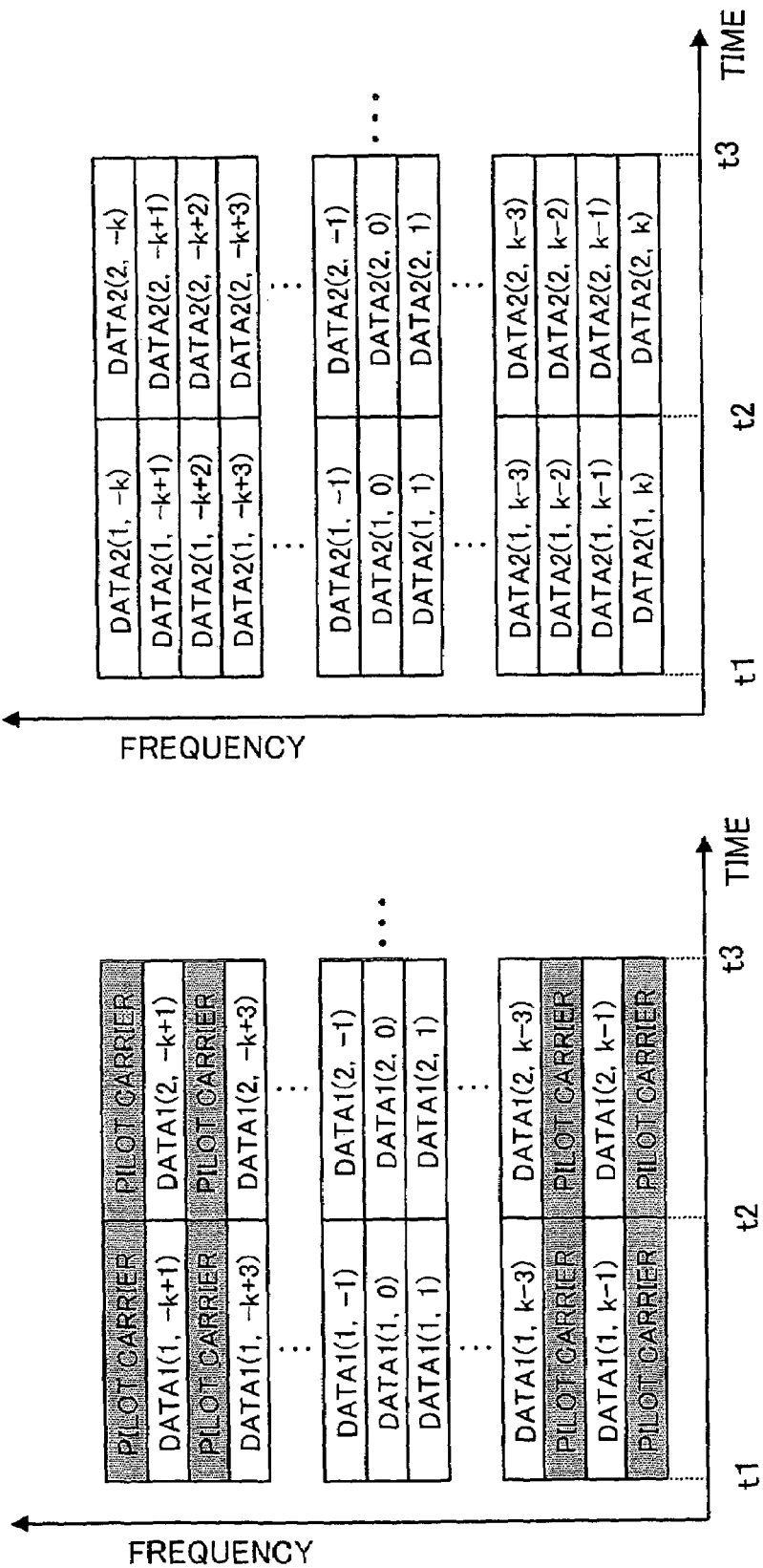
FIG. 4(A) is a drawing showing the relationship between pilot carriers and data signals in a conventional OFDM signal.
FIG. 4(B) is a drawing showing the relationship between pilot carriers and data signals in a conventional OFDM signal.
Figure 6:
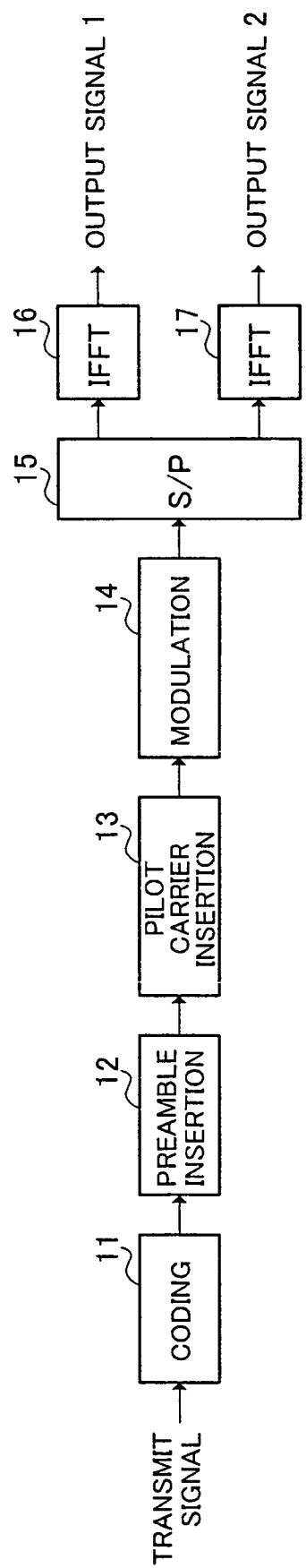
FIG. 6 is a block diagram showing the configuration of the transmitting system of a conventional OFDM communication apparatus.
Figure 7:
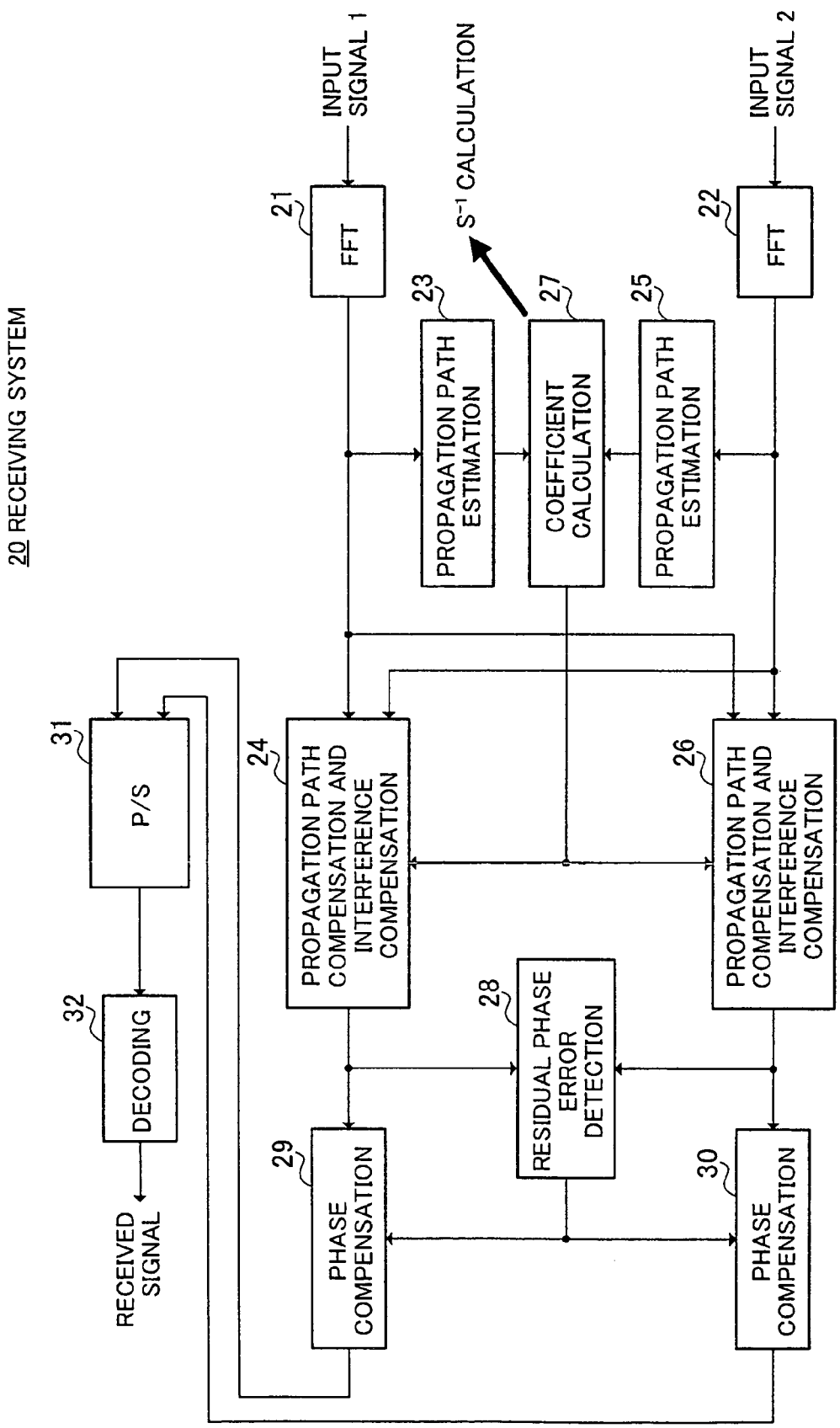
FIG. 7 is a block diagram showing the configuration of the receiving system of a conventional OFDM communication apparatus.
Figure 48:
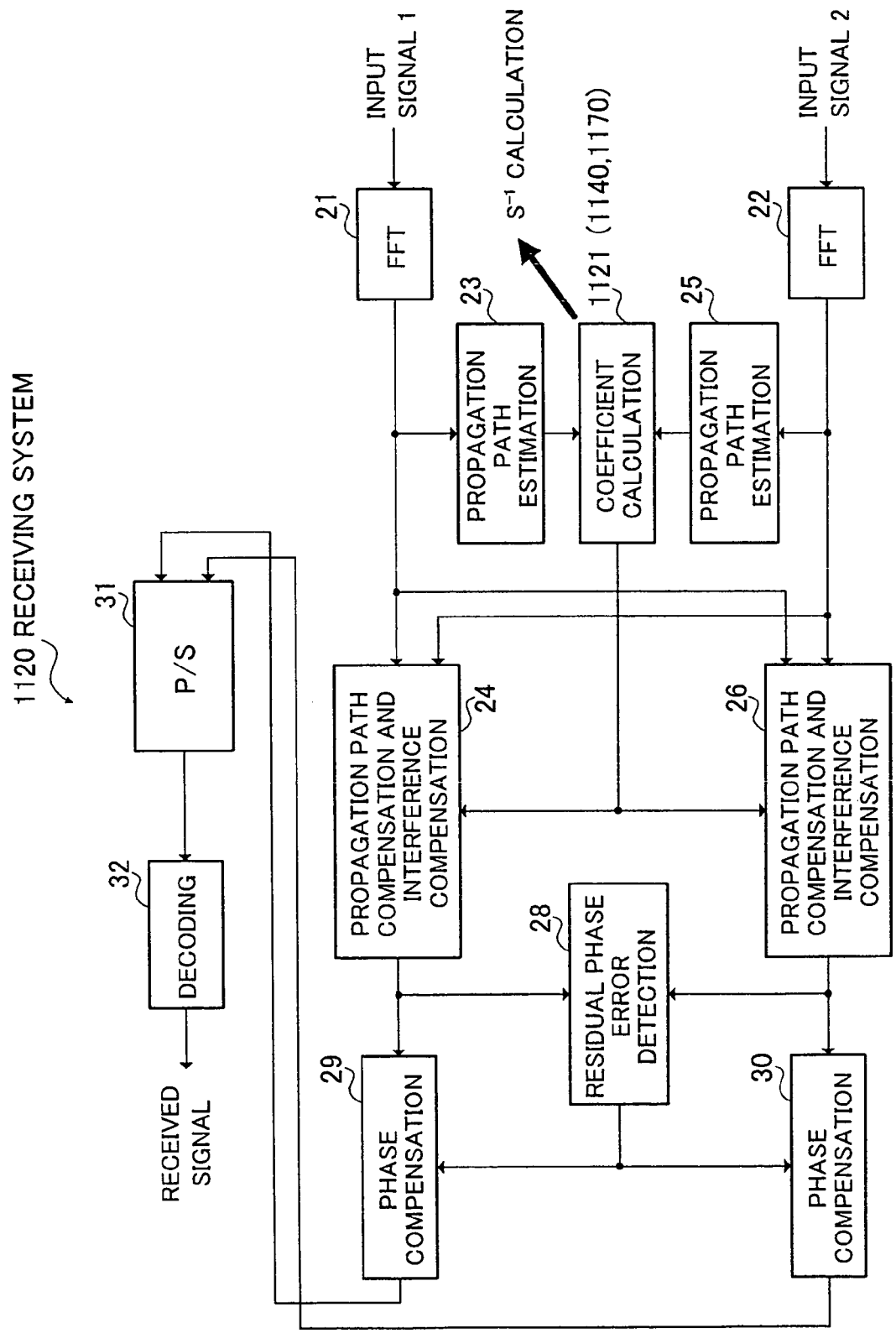
FIG. 48 is a block diagram showing the configuration of the receiving system of an OFDM communication apparatus of Embodiments 23 through 26.

FIG. 48 shows the configuration of the receiving system of an OFDM communication apparatus that receives OFDM signals transmitted from an OFDM communication apparatus that has transmitting system 1110 shown in FIG. 47. In FIG. 48, in which parts corresponding to those in FIG. 7 are assigned the same codes as in FIG. 7, receiving system 1200 of this embodiment has a similar configuration to that of transmitting system 20 in FIG. 7, but differs in the configuration of coefficient calculation section 1121.

Figure 8:
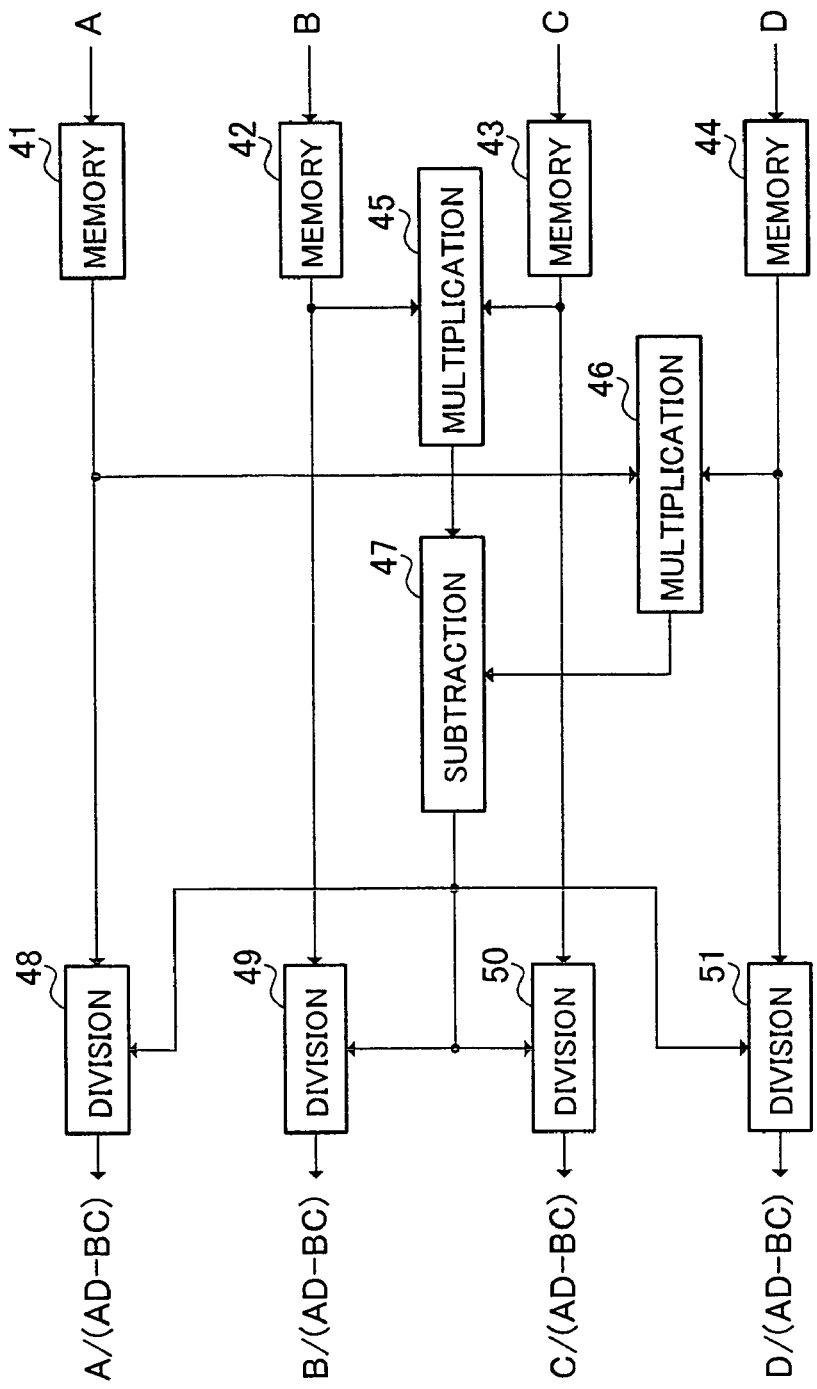
FIG. 8 is a block diagram showing the configuration of a coefficient calculation section.
Figure 49:
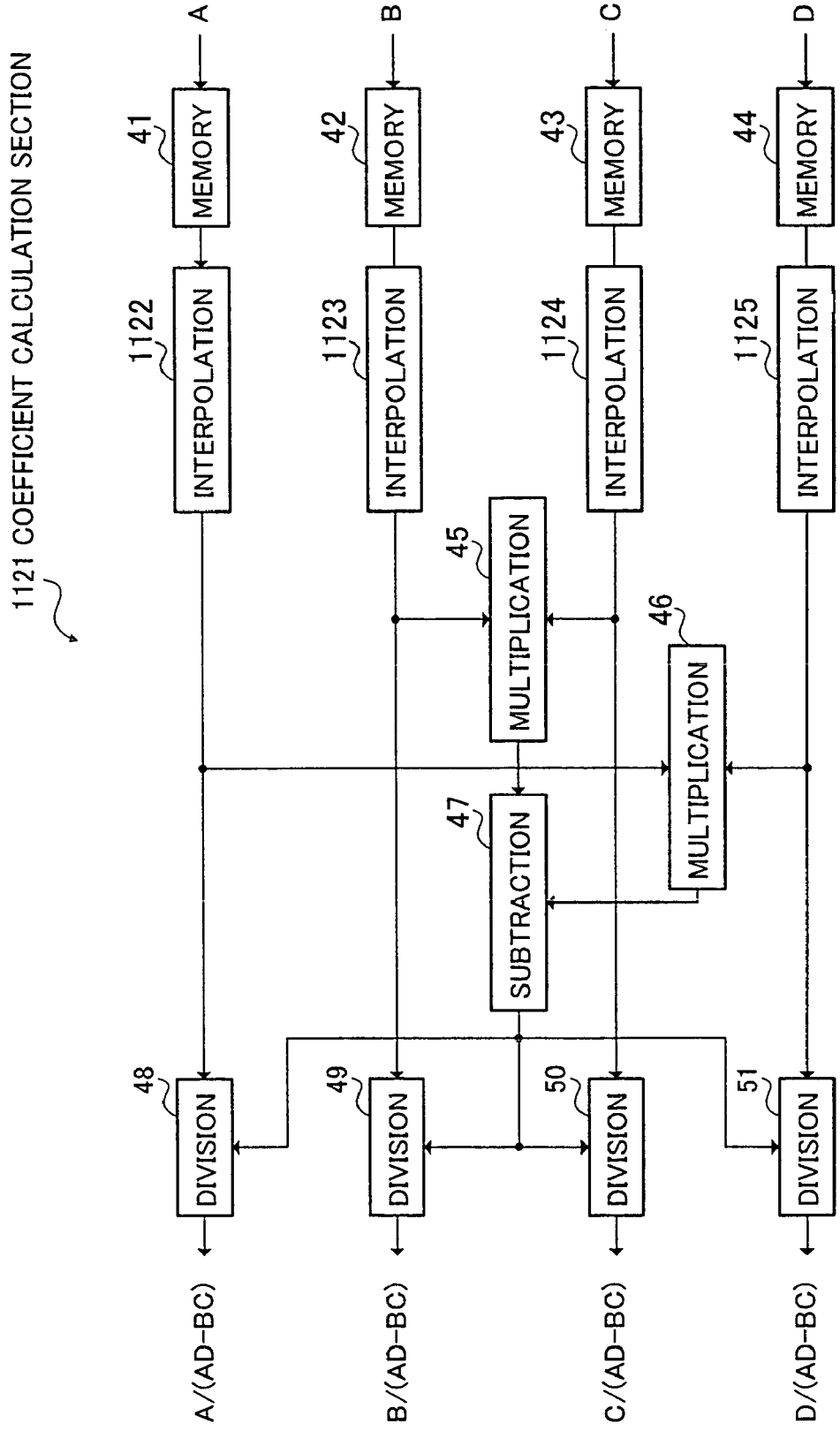
FIG. 49 is a block diagram showing the configuration of a coefficient calculation section of Embodiment 23.

The configuration of coefficient calculation section 1121 of this embodiment is shown in FIG. 49. In FIG. 49, in which parts corresponding to those in FIG. 8 are assigned the same codes as in FIG. 8, coefficient calculation section 1121 of this embodiment has a similar configuration to that of coefficient calculation section 27 in FIG. 8, but differs in having interpolation sections 1122 through 1125 corresponding to memories 41 through 45.

Coefficient calculation section 1121 stores four propagation path characteristics A, B, C, and D obtained by propagation path estimation sections 23 and 25 in memories 41 through 45, then sends them to corresponding interpolation sections 1122 through 1125. Each of interpolation sections 1122 through 1125 calculates the propagation path characteristic of a subcarrier that is missing due to insertion of a null signal by adding the propagation path estimation results of adjacent subcarriers and halving the result.

This procedure will now be explained in specific terms. Propagation path characteristic A and propagation path characteristic B are estimated by propagation path estimation section 23 corresponding to receiving antenna AN1, and are stored in memory 41 and memory 42 respectively. Propagation path characteristic C and propagation path characteristic D are estimated by propagation path estimation section 25 corresponding to receiving antenna AN4, and are stored in memory 43 and memory 45 respectively.

Propagation path characteristic A and propagation path characteristic B are found based on propagation path estimation preambles superimposed only on odd-numbered subcarriers as shown in FIG. 46(A), and propagation path characteristics A and B for even-numbered subcarriers are missing. Therefore, in this embodiment, the propagation path characteristics of these missing even-numbered subcarriers are found using propagation path characteristics estimated by means of propagation path estimation preambles of mutually adjacent odd-numbered subcarriers.

For example, in interpolation section 1122, propagation path characteristic A2 for a second subcarrier is found by means of the equation A2=(A1+A3)/2 using propagation path characteristic A1 for a first subcarrier and propagation path characteristic A3 for a third subcarrier estimated using propagation path estimation preamble (1, 1) and propagation path estimation preamble (1, 3). Interpolation section 1123 similarly calculates propagation path characteristic B for a missing even-numbered subcarrier using propagation path characteristic B for mutually adjacent odd-numbered subcarriers.

Meanwhile, propagation path characteristic C and propagation path characteristic D are found based on propagation path estimation preambles superimposed only on even-numbered subcarriers as shown in FIG. 46(B), and propagation path characteristics C and D for odd-numbered subcarriers are missing. Therefore, in this embodiment, the propagation path characteristics of these missing odd-numbered subcarriers are found using propagation path characteristics estimated by means of propagation path estimation preambles of mutually adjacent even-numbered subcarriers.

For example, in interpolation section 1124, propagation path characteristic C3 for a third subcarrier is found by means of the equation C3=(C2+C4)/2 using propagation path characteristic C2 for a second subcarrier and propagation path characteristic C4 for a fourth subcarrier estimated using propagation path estimation preamble (2, 2) and propagation path estimation preamble (2, 4). Interpolation section 1125 similarly calculates propagation path characteristic D for a missing odd-numbered subcarrier using propagation path characteristic D for mutually adjacent even-numbered subcarriers.

Figure 50:
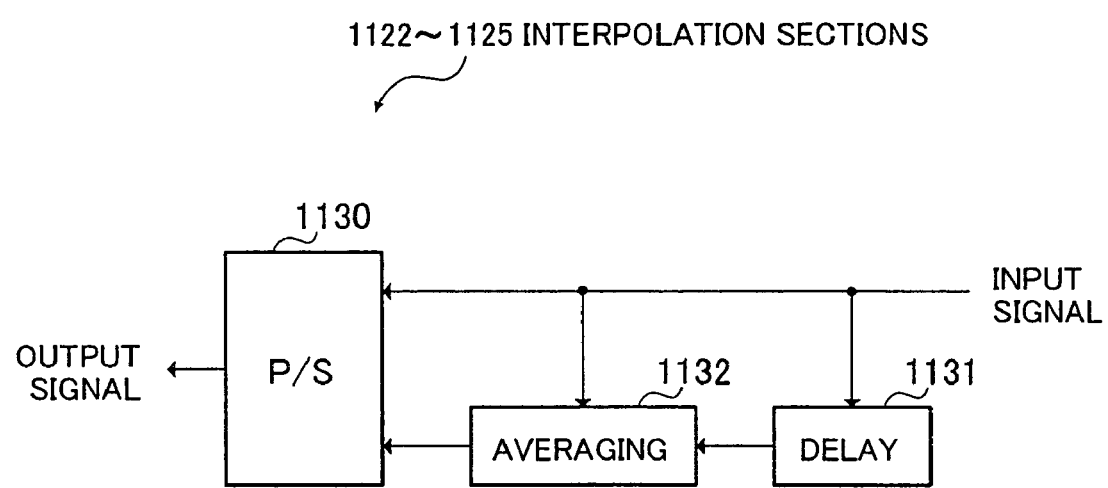
FIG. 50 is a block diagram showing the configuration of an interpolation section.

FIG. 50 shows sample configurations of interpolation sections 1122 through 1125. A description will be given taking the example of interpolation section 1122, which interpolates propagation path characteristic A. In interpolation section 1122, propagation path characteristic A1 for a first subcarrier is first input to a parallel/serial conversion section (P/S) 1130, and is also sent to an averaging circuit 1132 via a delay section 1131. Then propagation path characteristic A3 for a third subcarrier is input to parallel/serial conversion section (P/S) 1130, and is also sent to averaging circuit 1132 via delay section 1131. As a result, the average of propagation path characteristics A1 and A3 (that is, propagation path characteristic A2 for the second subcarrier) is found by averaging circuit 1132, and is sent to parallel/serial conversion section 1130. Parallel/serial conversion section 1130 arranges data in the order of propagation path characteristics A1, A2, and A3, and outputs this data as an output signal. By subsequent repetition of the same kind of processing, propagation path characteristics are found for the missing even-numbered subcarriers.

In the above configuration, for subcarriers of the same time and the same frequency in first and second OFDM signals transmitted at the same time, an OFDM communication apparatus of this embodiment places a propagation path estimation preamble on one subcarrier and places a null signal on the other subcarrier. As a result, a propagation path estimation preamble is received by a receiving apparatus without receiving interference from another signal, enabling good propagation path compensation to be performed on the receiving side based on that propagation path estimation preamble.

In addition, an OFDM communication apparatus of this embodiment does not place a propagation path estimation preamble on only one OFDM signal of the first and second OFDM signals, but performs transmission with propagation path estimation preambles placed in distributed fashion on both OFDM signals. As a result, propagation path characteristics A and B found from propagation path estimation preambles of an OFDM signal transmitted from antenna AN1, and propagation path characteristics C and D found from propagation path estimation preambles of an OFDM signal transmitted from antenna AN2, are both found based on propagation path estimation preambles transmitted at the same time, so that there is no residual phase error between propagation path characteristics A and B and propagation path characteristics C and D.

Thus, in an OFDM communication apparatus that receives and demodulates signals from an OFDM communication apparatus of this embodiment, a received signal can be subjected to propagation path compensation and demodulation based on propagation path characteristics A through D with no residual phase error, enabling a received signal with improved error rate characteristics to be obtained.

According to the above configuration, when OFDM signals are transmitted from a plurality of antennas AN1 and AN2, by placing a propagation path estimation preamble on one of subcarriers of the same frequency of the same time and placing a null signal on the other, and placing a propagation path estimation preamble on at least one subcarrier in each OFDM signal, it is possible to prevent the occurrence of residual phase error in propagation path estimation results. As a result, degradation of error rate characteristics can be prevented.

Also, on the receiving side, by interpolating a propagation path characteristic for a subcarrier by which a null signal is transmitted using propagation path characteristics of subcarriers on which a propagation path estimation preamble is superimposed adjacent to that subcarrier, it is possible to perform propagation path compensation for all subcarriers and obtain a received signal with little degradation of error rate characteristics.

In the above embodiment, a case has been described in which two OFDM signals are transmitted from two antennas AN1 and AN2, but the present invention is not limited to this, and can also be applied to cases where any number of OFDM signals are transmitted using any number of antennas. For example, when there are three antennas, a propagation path estimation preamble can be transmitted at intervals of two subcarriers, and a null signal inserted in the two subcarriers therebetween.

Embodiment 24

A special feature of this embodiment is that subcarriers that transmit a null signal are made variable. By this means, in this embodiment it is possible to prevent degradation of error rate characteristics when the multipath delay time is long.

That is to say, when the multipath delay time is long, propagation path characteristic deviation between adjacent subcarriers increases. In this case, if subcarriers that transmit a null signal are fixed, error rate characteristic degradation increases since the propagation path estimation error of subcarriers that transmit a null signal increases. In consideration of this point, in this embodiment subcarriers that transmit a null signal are made variable.

Figures 51A, 51B:
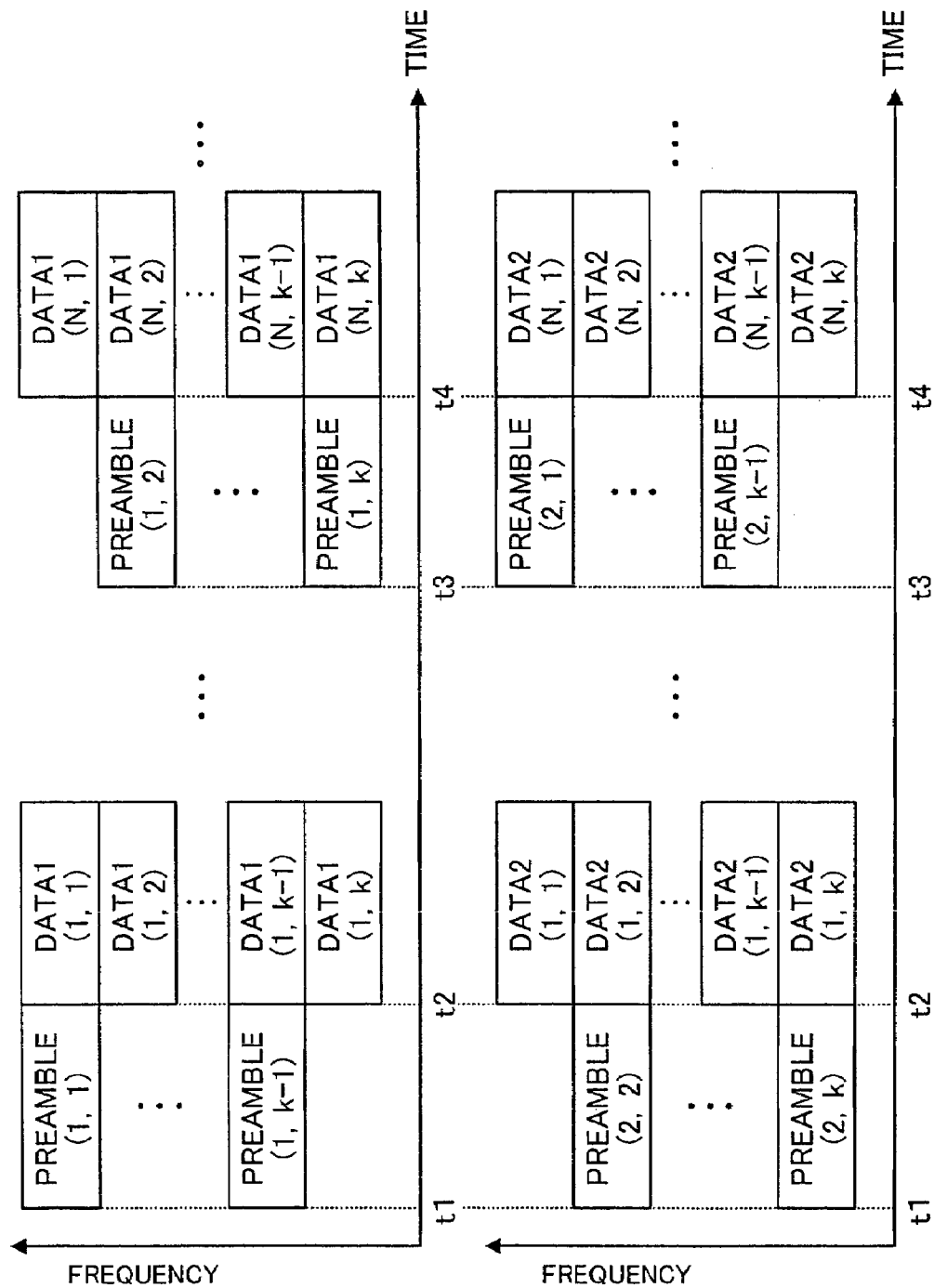
FIG. 51(A) is a drawing showing the relationship between propagation path estimation preambles, null signals, and data signals in an OFDM signal of Embodiment 24.
FIG. 51(B) is a drawing showing the relationship between propagation path estimation preambles, null signals, and data signals in an OFDM signal of Embodiment 24.

The frame formats of OFDM signals transmitted from antenna AN1 and antenna AN2 in this embodiment are shown in FIGS. 51(A) and (B). As can be seen from these drawings, at a particular time, propagation path estimation preambles are superimposed on odd-numbered subcarriers from antenna AN1, and propagation path estimation preambles are superimposed on even-numbered subcarriers from antenna AN2. On the other hand, when propagation path estimation preambles are next sent after a given data transmission period, propagation path estimation preambles are superimposed on even-numbered subcarriers from antenna AN1, and propagation path estimation preambles are superimposed on odd-numbered subcarriers from antenna AN2.

Actually, in propagation path estimation result updating, averaging processing is performed on a plurality of symbols (for example, 8 symbols, indicated by N in FIGS. 51(A) and (B)), and therefore by varying the subcarriers that transmit a null signal, propagation path estimation error can be reduced and degradation of error rate characteristics can be prevented.

The configuration of an OFDM communication apparatus for achieving this will now be described, using FIG. 47 again. In order to form OFDM signals with the frame formats shown in FIGS. 51(A) and (B), it is only necessary to change the timing of null signal selection by selection section 1113 in FIG. 47 as compared with Embodiment 23.

Figure 52:
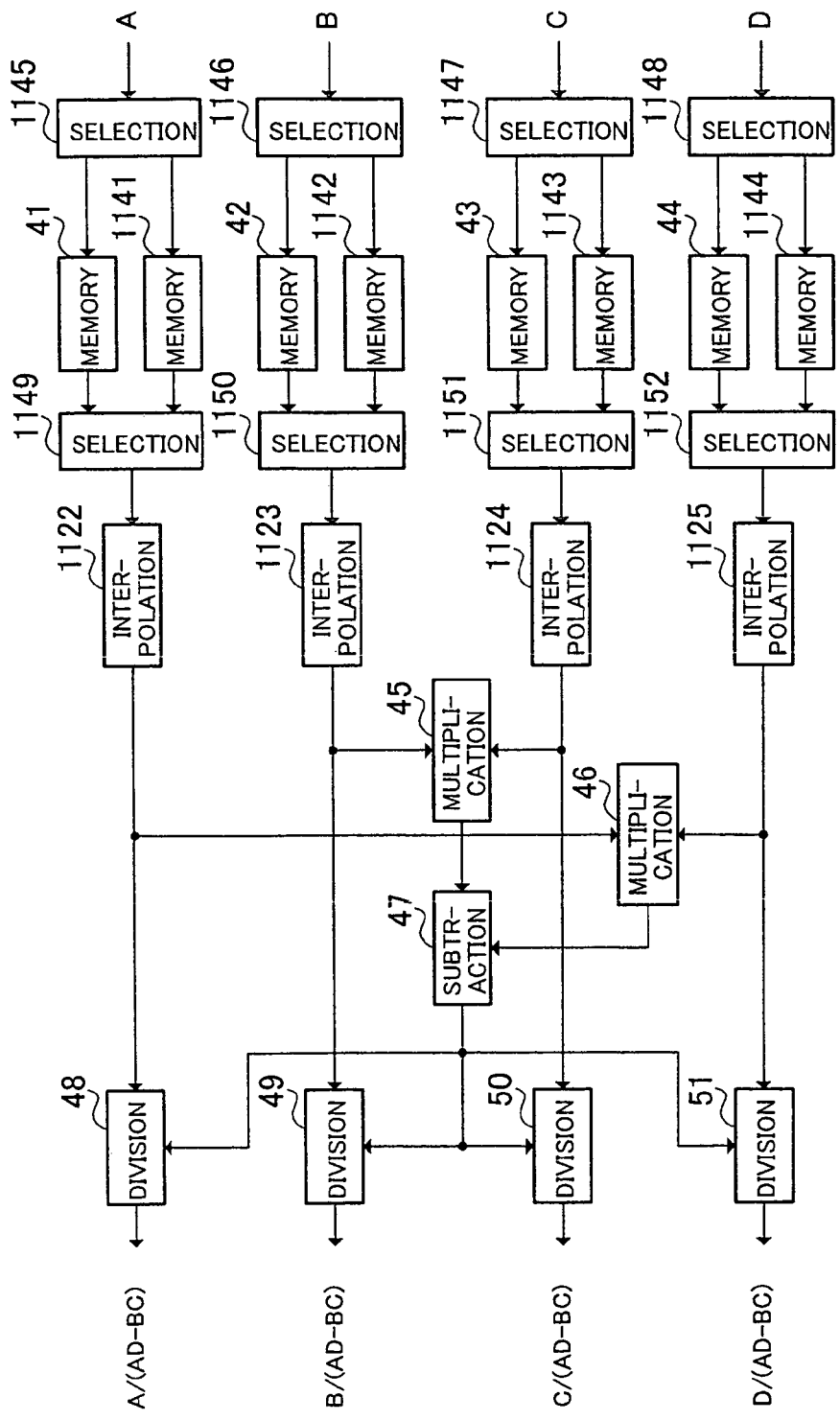
FIG. 52 is a block diagram showing the configuration of a coefficient calculation section of Embodiment 24.

In a receiving system that receives and performs propagation path compensation on OFDM signals with the frame formats shown in FIGS. 51(A) and (B), it is only necessary to modify the configuration of coefficient calculation section 1121 described above with respect to FIG. 49. The configuration of a coefficient calculation section of this embodiment is shown in FIG. 52. In FIG. 52, in which parts corresponding to those in FIG. 49 are assigned the same codes as in FIG. 49, coefficient calculation section 1140 has a similar configuration to that of coefficient calculation section 1121 of Embodiment 23, but differs in that there are two memories each—memories 41 and 1141, memories 42 and 1142, memories 43 and 1143, and memories 44 and 1141—corresponding respectively to propagation path characteristics A through D, and in that selection sections 1145 through 1148 are provided before, and selection sections 1149 through 1152 after, memories 41 and 1141, memories 42 and 1142, memories 43 and 1143, and memories 44 and 1141, respectively.

The procedure regarding propagation path characteristics A will now be described in specific terms. First, a plurality of propagation path characteristics A estimated based on propagation path estimation preamble (1, 1) . . . propagation path estimation preamble (1, k–1) superimposed on odd-numbered subcarriers in the period from t1 to t2 shown in FIG. 51(A) are stored in memory 41 via selection section 1145. Propagation path characteristics A stored in memory 41 are sent to interpolation section 1122 via selection section 1149. Using propagation path characteristics A of odd-numbered subcarriers as described in Embodiment 23, interpolation section 1122 calculates (interpolates) the propagation path characteristics of even-numbered subcarriers therebetween. Then propagation path characteristics A for all subcarriers in period t1 to t2 are found.

Next, a plurality of propagation path characteristics A estimated based on propagation path estimation preamble (1, 2) . . . propagation path estimation preamble (1, k) superimposed on even-numbered subcarriers in the period from t3 to t4 are stored in memory 1141 via selection section 1145. Propagation path characteristics A stored in memory 1141 are sent to interpolation section 1122 via selection section 1149. Using propagation path characteristics A of even-numbered subcarriers, interpolation section 1122 calculates the propagation path characteristics of odd-numbered subcarriers therebetween. Then propagation path characteristics A for all subcarriers in period t3 to t4 are found. A similar procedure is used for propagation path characteristics B, C, and D, and therefore a description thereof will be omitted here.

In the above configuration, OFDM signal subcarriers each undergo different fading due to frequency selective fading according to the multipath conditions. When the multipath delay time is long, only the same subcarriers undergo frequency selective fading for a long period, and if propagation path estimation preambles are placed on these subcarriers, propagation path compensation cannot be performed satisfactorily.

However, in this embodiment, subcarriers on which propagation path estimation preambles are placed are varied at time intervals, making it possible to prevent degradation of the error rate of specific subcarriers even when the multipath delay time is long.

According to the above configuration, by making subcarriers on which propagation path estimation preambles are placed variable according to time, in addition to providing the configuration of Embodiment 23, error rate characteristics can be improved even when the multipath delay time is long.

Embodiment 25

A special feature of an OFDM communication apparatus of this embodiment is that an OFDM signal in which a propagation path estimation preamble comprising two consecutive symbols is placed is transmitted from a first antenna AN1, and an OFDM signal in which a propagation path estimation preamble with one symbol temporally immediately before and one symbol temporally immediately after that propagation path estimation preamble comprising two consecutive symbols is transmitted from a second antenna AN2.

By this means, as compared with above-described Embodiment 23 and Embodiment 24, it is possible to estimate the propagation path characteristics of all subcarriers based on actually received propagation path estimation preambles, without performing interpolation processing, enabling much more precise propagation path characteristics to be obtained for each subcarrier even when the multipath delay time is long.

Figures 53A, 53B:
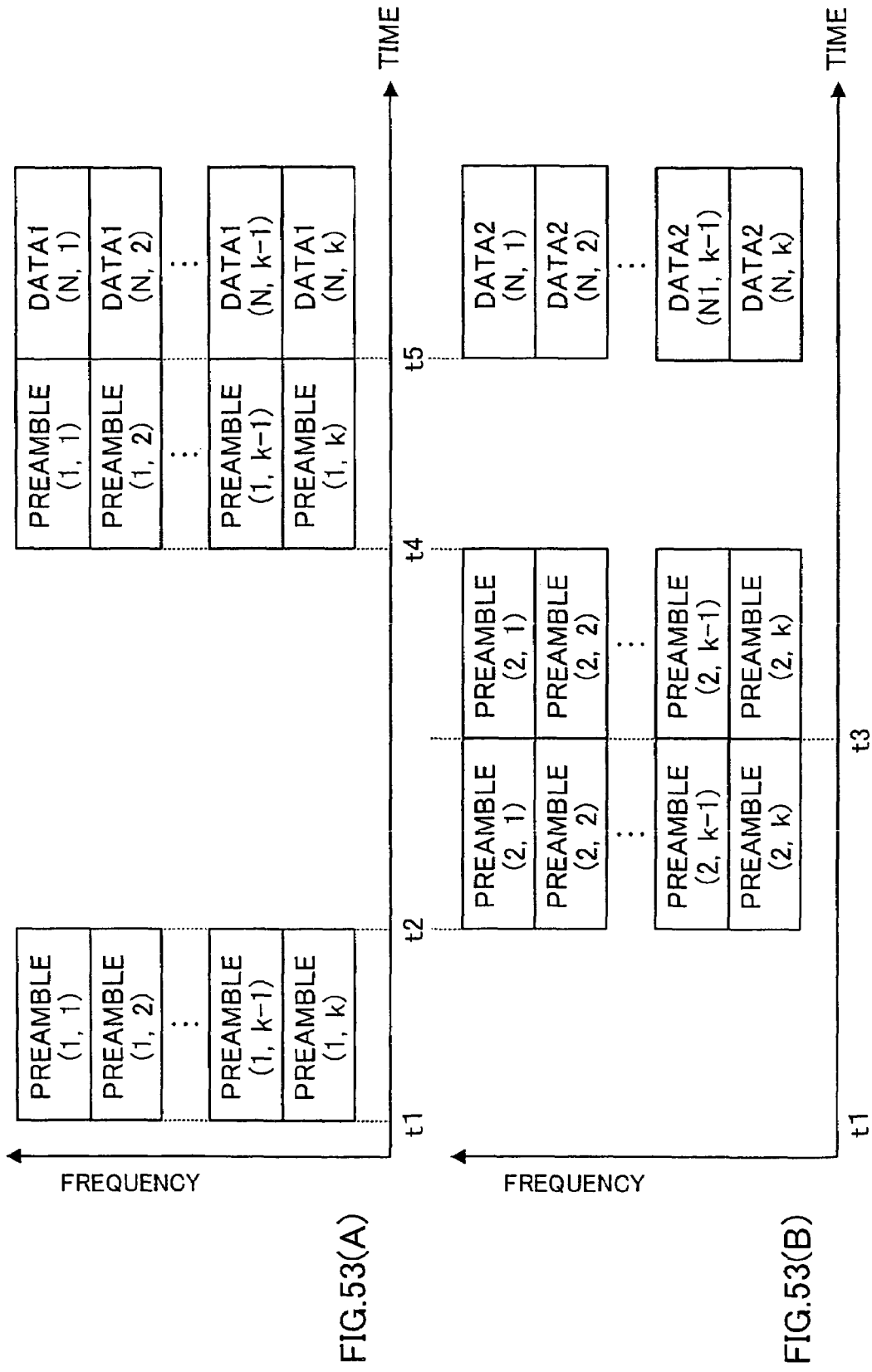
FIG. 53(A) is a drawing showing the relationship between propagation path estimation preambles, null signals, and data signals in an OFDM signal of Embodiment 25.
FIG. 53(B) is a drawing showing the relationship between propagation path estimation preambles, null signals, and data signals in an OFDM signal of Embodiment 25.

The frame formats of OFDM signals transmitted from antenna AN1 and antenna AN2 in this embodiment are shown in FIGS. 53(A) and (B). As shown in FIG. 53(B), in particular time periods t2 to t3 and t3 to t4, an OFDM signal in which propagation path estimation preambles comprising two consecutive symbols are placed is transmitted from antenna AN2 using all subcarriers.

On the other hand, in time period t1 to t2 immediately before time period t2 to t3 and time period t3 to t4, an OFDM signal in which one-symbol propagation path estimation preambles are placed is transmitted from antenna AN1 using all subcarriers. Similarly, in time period t4 to t5 immediately after time period t2 to t3 and time period t3 to t4, an OFDM signal in which one-symbol propagation path estimation preambles are placed is transmitted from antenna AN1 using all subcarriers.

Figure 54:
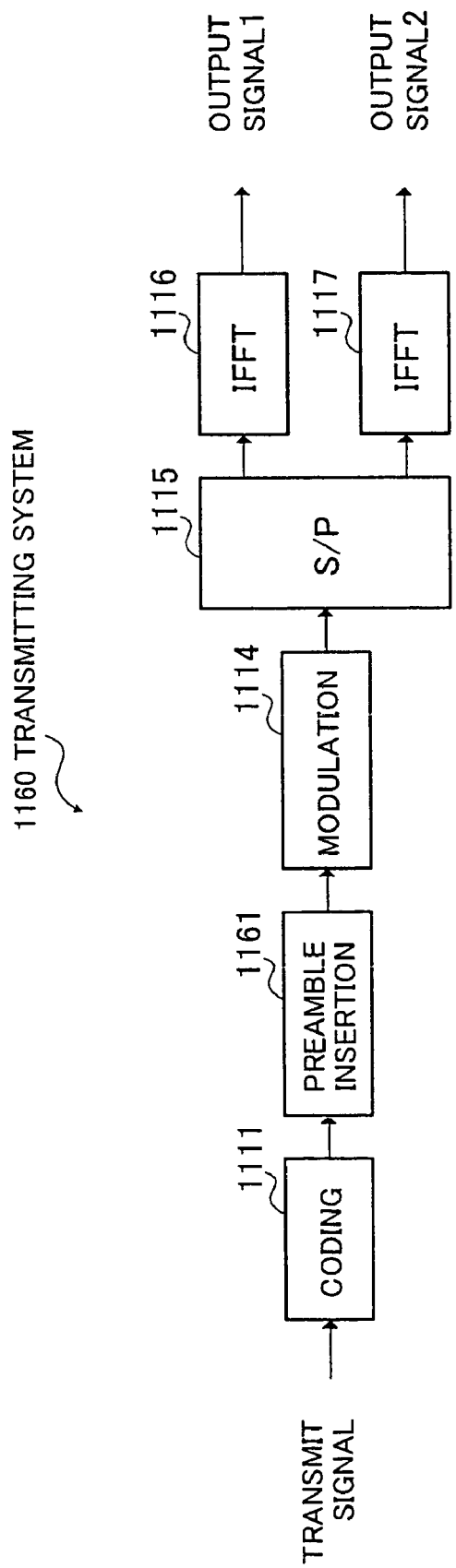
FIG. 54 is a block diagram showing the configuration of the transmitting system of an OFDM communication apparatus of Embodiment 25.

A sample configuration of an OFDM communication apparatus that forms OFDM signals with the kind of frame formats shown in FIGS. 53(A) and (B) is shown in FIG. 54. In FIG. 54, in which parts corresponding to those in FIG. 47 are assigned the same codes as in FIG. 47, transmitting system 1160 has a similar configuration to that of transmitting system 1110 in FIG. 47, but differs in that the function of preamble insertion section 1161 is different, and selection section 1113 (FIG. 47) is omitted.

That is to say, preamble insertion section 1161 inserts in a coded signal a propagation path estimation preamble comprising two consecutive symbols so that output signal 2 that has undergone inverse Fourier transform processing by IFFT 1117 has a frame format as shown in FIG. 53(B). Also, preamble insertion section 1161 inserts a propagation path estimation preamble one symbol at a time in a coded signal at timing such that output signal 1 that has undergone inverse Fourier transform processing by IFFT 1116 has a frame format as shown in FIG. 53(A).

In the above configuration, in the two OFDM signals transmitted from an OFDM communication apparatus of this embodiment, propagation path estimation preambles are transmitted in different time periods t1 to t2, t2 to t3, t3 to t4, and t4 to t5, as shown in FIGS. 53(A) and (B), and therefore residual phase error deviations between antennas occur in propagation path characteristics A and B, and C and D, found based on the respective propagation path estimation preambles on the receiving side.

Figure 55:
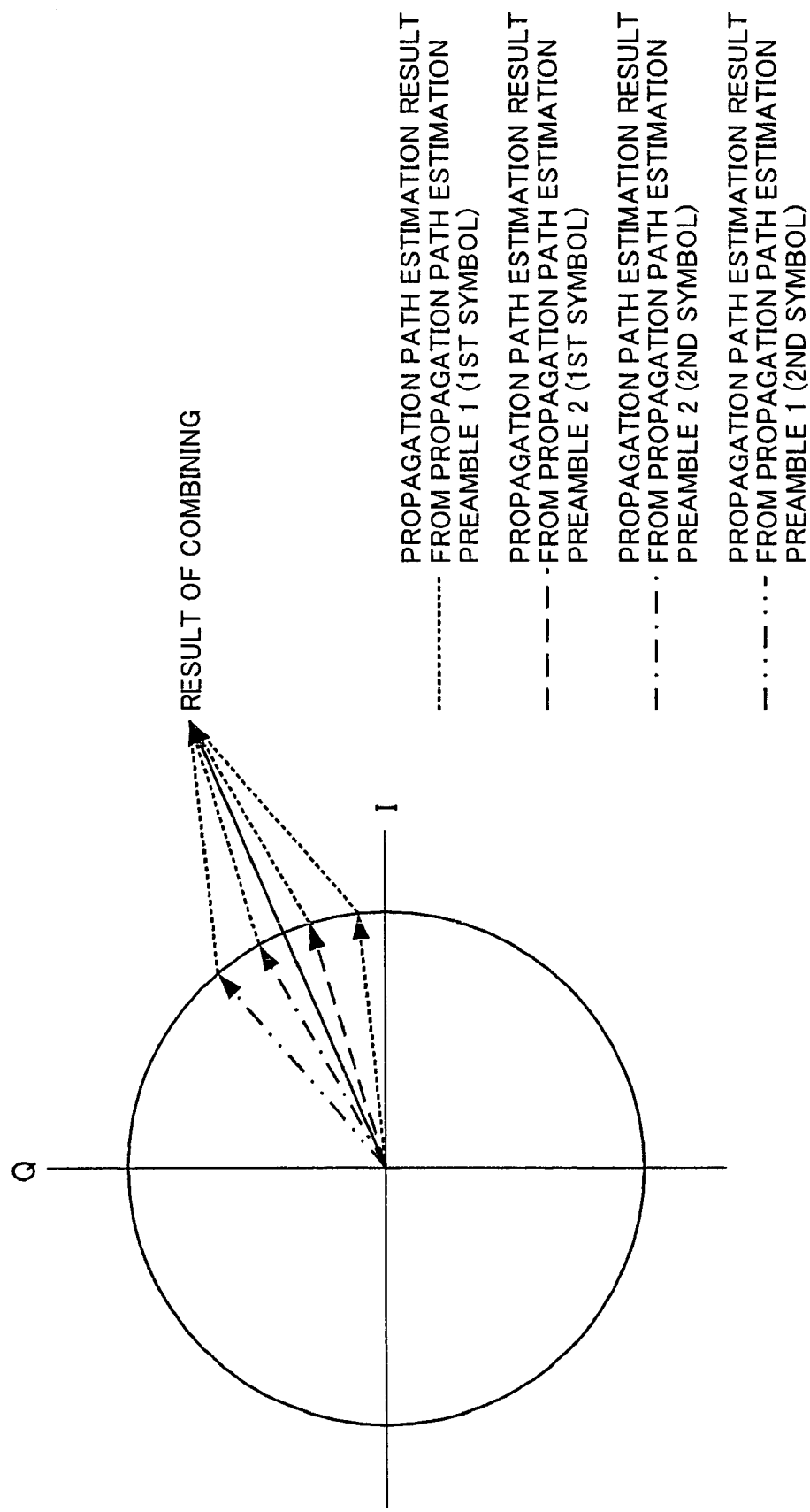
FIG. 55 is an I-Q plane drawing provided to explain the operation of Embodiment 25.

However, as shown in FIG. 55, these residual phase error deviations between the antennas are canceled overall when combined, and therefore receiving system coefficient calculation section 1121 (FIG. 47) can obtain as a result coefficients for propagation path compensation that are unaffected by residual phase error deviations between the antennas. By this means, it is possible to obtain a received signal with an improved error rate.

In FIG. 55, a dotted line illustrates residual phase error deviation of propagation path estimation preambles transmitted in time period t1 to t2 (FIG. 53(A)), a dash-dot-dot line illustrates residual phase error deviation of propagation path estimation preambles transmitted in time period t4 to t5 (FIG. 53(A)), a dashed line illustrates residual phase error deviation of first propagation path estimation preamble symbols of propagation path estimation preambles comprising two consecutive symbols (FIG. 53(B)), and a dash-dot line illustrates residual phase error deviation of second propagation path estimation preamble symbols of propagation path estimation preambles comprising two consecutive symbols (FIG. 53(B)). As shown in FIG. 55, with these propagation path estimation preambles, residual phase error deviations between antennas disappear when they are combined.

When OFDM signals with the kind of frame formats shown in FIGS. 53(A) and (B) are transmitted, propagation path estimation preambles can be placed on all subcarriers, and therefore propagation path characteristics can be found using actual propagation path estimation preambles for all subcarriers regardless of multipath delay time, enabling a received signal with good error rate characteristics to be obtained in any multipath environment.

According to the above configuration, by transmitting from a specific antenna an OFDM signal in which a propagation path estimation preamble comprising two consecutive symbols is placed, and transmitting from another antenna an OFDM signal in which a propagation path estimation preamble with one symbol temporally immediately before and one symbol temporally immediately after that propagation path estimation preamble comprising two consecutive symbols, it is possible to implement an OFDM communication apparatus that enables error rate characteristics to be greatly improved.

Embodiment 26

A special feature of an OFDM communication apparatus of this embodiment is that, in addition to the provision of the configuration of Embodiment 23, a propagation path estimation preamble of two symbols or more is placed within a burst interval of an OFDM signal, and subcarriers on which a propagation path estimation preamble is placed are changed according to each symbol.

By this means, in this embodiment, as compared with Embodiment 23, with the second symbol a propagation path estimation preamble is placed on a subcarrier on which a null signal is placed with the first symbol, and therefore propagation path estimation characteristics improve for subcarriers overall. Also, the precision of interpolated values can be improved when subcarriers in which a null signal is inserted are found by interpolation.

Figures 56A, 56B:
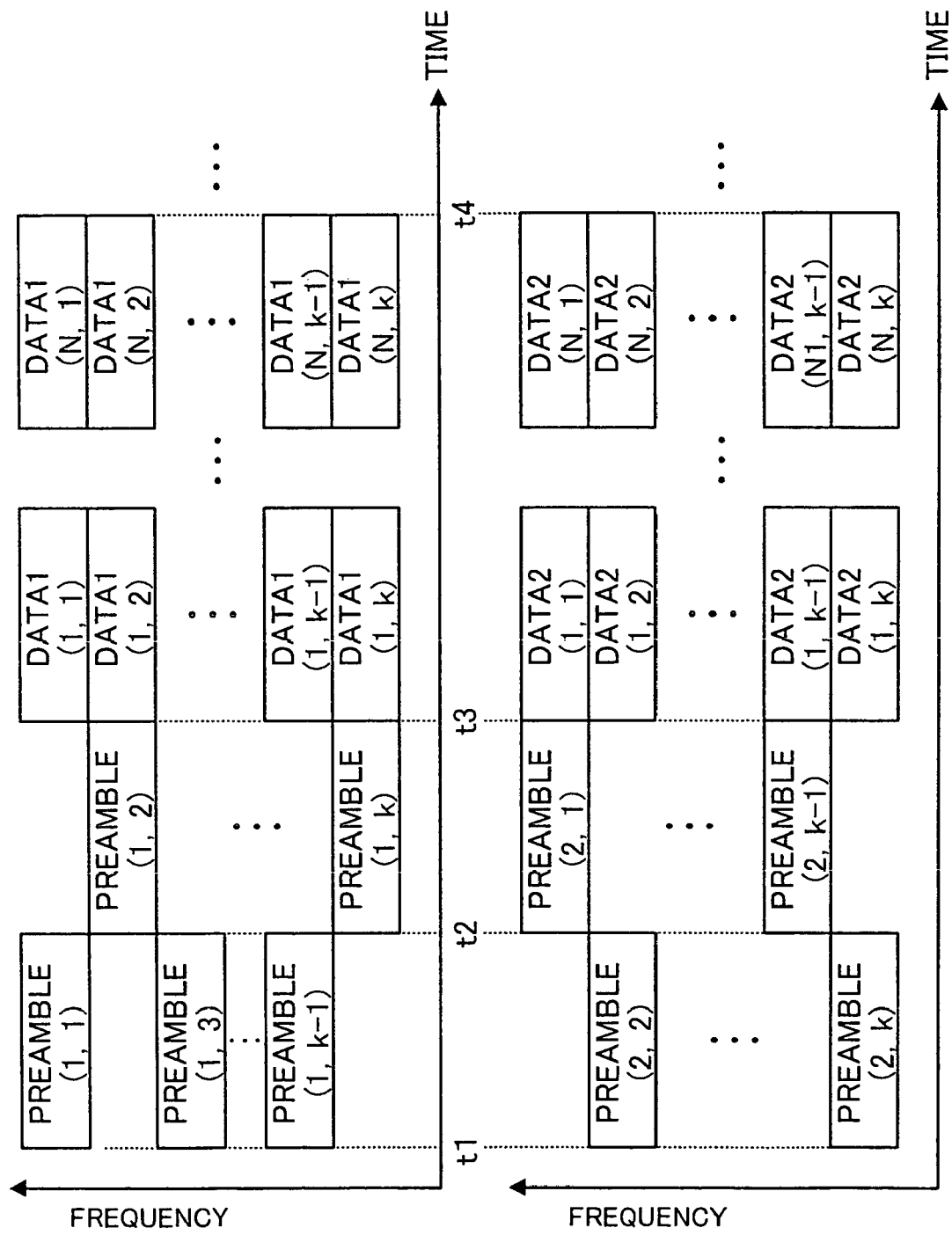
FIG. 56(A) is a drawing showing the relationship between propagation path estimation preambles, null signals, and data signals in an OFDM signal of Embodiment 26.
FIG. 56(B) is a drawing showing the relationship between propagation path estimation preambles, null signals, and data signals in an OFDM signal of Embodiment 26.

The frame formats of OFDM signals transmitted from antenna AN1 and antenna AN2 in this embodiment are shown in FIGS. 56(A) and (B). As shown in these drawings, in time period t1 to t2, in a first OFDM signal propagation path estimation preambles are placed on odd-numbered subcarriers, and a null signal is placed on even-numbered subcarriers, while in a second OFDM signal, propagation path estimation preambles are placed on even-numbered subcarriers, and a null signal is placed on odd-numbered subcarriers.

In contrast to this, in following time period t2 to t3, in the first OFDM signal propagation path estimation preambles are placed on even-numbered subcarriers, and a null signal is placed on odd-numbered subcarriers, while in the second OFDM signal, propagation path estimation preambles are placed on odd-numbered subcarriers, and a null signal is placed on even-numbered subcarriers.

Thus, in an OFDM communication apparatus of this embodiment, subcarriers on which propagation path estimation preambles are placed are varied within a burst interval. A burst interval indicates an interval of up to the time period from t1 to t4, and indicates the unit transmit signal interval for which propagation path compensation is performed by means of propagation path estimation preambles.

OFDM signals with the kind of frame formats shown in FIGS. 56(A) and (B) can be formed by inserting two propagation path estimation preamble symbols for antennas AN1 and AN2 shown in FIGS. 56(A) and (B) by means of preamble insertion section 1112 and selection section 1113 in FIG. 47 described in Embodiment 23, and also inserting a null signal at predetermined timings.

Figure 57:
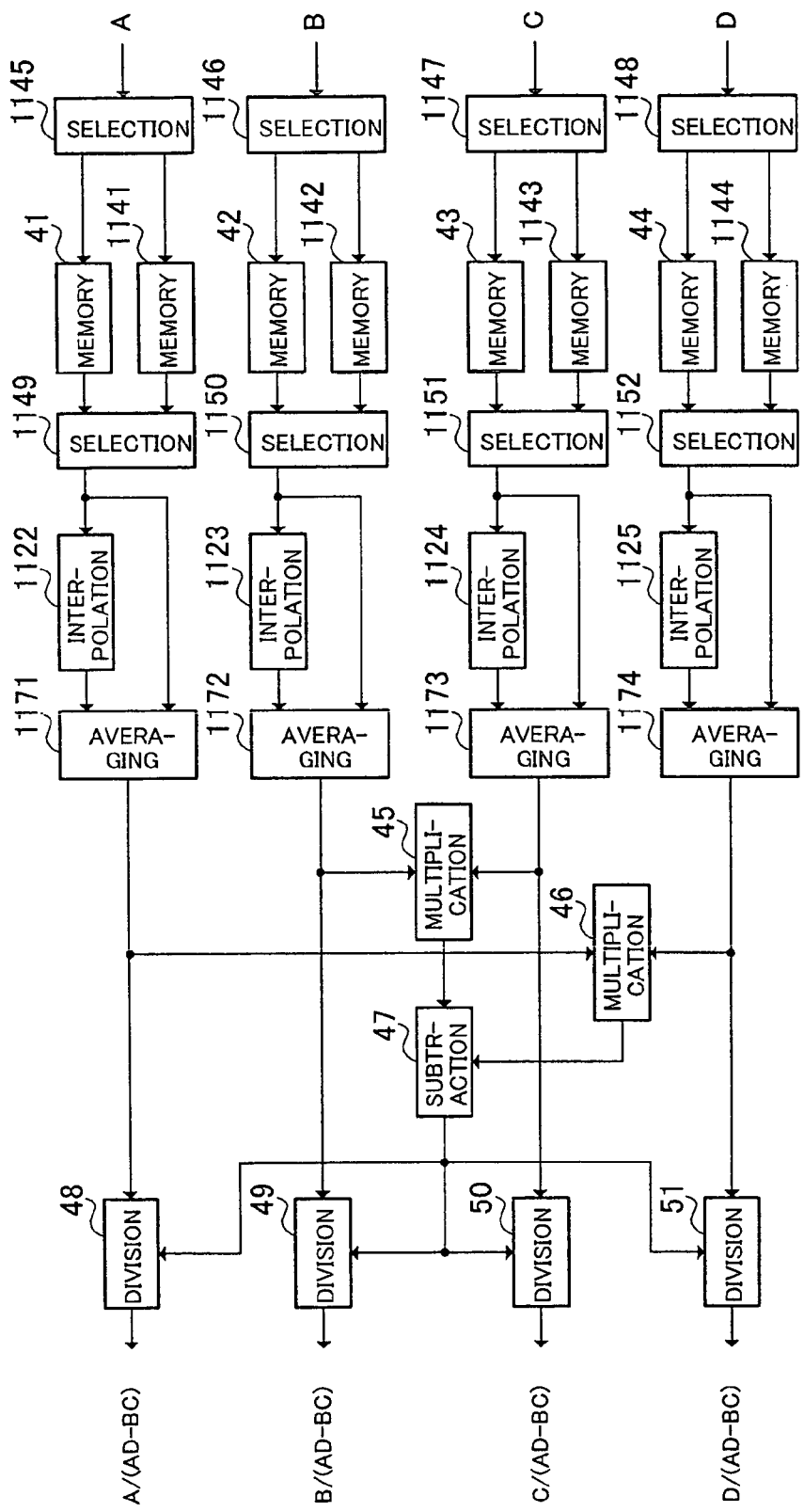
FIG. 57 is a block diagram showing the configuration of a coefficient calculation section of Embodiment 26.

A receiving system that receives and demodulates OFDM signals with the kind of frame formats shown in FIGS. 56 (A) and (B) requires only modification of the configuration of coefficient calculation section 1121 of receiving system 1120 in FIG. 48 as shown in FIG. 57.

In FIG. 57, in which parts corresponding to those in FIG. 52 described in Embodiment 24 are assigned the same codes as in FIG. 52, coefficient calculation section 1170 of this embodiment has a similar configuration to that of coefficient calculation section 1140 in FIG. 52, but differs in having averaging sections 1171 through 1174 that average propagation path characteristics A through D in the time direction.

A description will now be given, focusing on averaging section 1171 of averaging sections 1171 through 1174. Using propagation path characteristic A estimated based on propagation path estimation preamble (1, 1) and characteristic A estimated based on propagation path estimation preamble (1, 3) in FIG. 56(A), interpolation section 1122 finds propagation path characteristic A of the subcarrier therebetween by interpolation. In this way, interpolation section 1122 finds an interpolated value of propagation path characteristic A in the time direction.

The interpolated value found by interpolation section 1122 is sent to averaging section 1171, and propagation path characteristic A estimated based on propagation path estimation preamble (1, 2) is also input to averaging section 1171 via memory 1141 and selection section 1149. Averaging section 1171 finds the final propagation path characteristic A of a subcarrier in which a null signal is placed by averaging the interpolated value input from interpolation section 1122 and propagation path characteristic A input from selection section 1149. Similar processing is performed by averaging sections 1172 through 1174.

Thus, in this embodiment, by placing a propagation path estimation preamble of two symbols or more within a burst interval of an OFDM signal, and changing subcarriers on which a propagation path estimation preamble is placed according to each symbol, the receiving side can obtain an interpolated value that takes account of the time direction as well as the frequency direction for a subcarrier on which a null signal is placed, making it possible to obtain a received signal with error rate characteristics improved to a much greater extent than in Embodiment 23 in any multipath environment.

The present invention is not limited to the above-described embodiments, and various variations and modifications may be possible without departing from the scope of the present invention.

(1) A first mode of the present invention is an OFDM communication method whereby OFDM signals on which different data are superimposed are transmitted from a plurality of antennas, and a specific subcarrier of those OFDM signals is transmitted as a pilot carrier, wherein a pilot carrier is transmitted from only one antenna among the plurality of antennas, and a null signal is transmitted from an antenna other than that antenna by means of a subcarrier of a frequency band corresponding to a subcarrier that transmits a pilot carrier.

According to this method, interference on the propagation path of a pilot carrier can be prevented, enabling highly precise residual phase error to be detected on the receiving side. As a result, a received signal with improved error rate characteristics can be obtained.

(2) In a second mode of the present invention, in (1), an antenna that transmits a pilot carrier is switched among a plurality of antennas.

According to this method, in addition to obtaining the effect in (1), it is possible to prevent a drop in residual phase error detection precision over a long period when channel fluctuation is slow.

(3) A third mode of the present invention is an OFDM communication method whereby OFDM signals on which different data are superimposed are transmitted from a plurality of antennas, and a specific subcarrier of those OFDM signals is transmitted as a pilot carrier, wherein subcarriers of different frequency bands are transmitted as pilot carriers from a plurality of antennas, and a pilot signal is transmitted by a subcarrier at an antenna corresponding to a subcarrier by which a null signal is transmitted at another antenna.

According to this method, interference on the propagation path of a pilot carrier can be prevented, enabling highly precise residual phase error to be detected on the receiving side, and in addition to being able to obtain a received signal with improved error rate characteristics, it is possible to reduce the peak power of OFDM signals transmitted from each antenna.

(4) In a fourth mode of the present invention, in (1) through (3), for a specific subcarrier, data is transmitted from only one antenna of a plurality of antennas, and a null signal is transmitted by a subcarrier of a frequency band corresponding to a subcarrier that transmits that data from an antenna other than that antenna.

According to this method, in addition to obtaining the effects in (1) through (3), data transmitted by a specific subcarrier does not receive interference from a corresponding subcarrier of another OFDM signal, enabling the error rate characteristics of this data to be improved.

(5) In a fifth mode of the present invention, in (4), a specific subcarrier is made a subcarrier at a distance from the center frequency of an OFDM signal.

According to this method, data is transmitted by a subcarrier at a distance from the center frequency which is susceptible to adjacent channel interference and the effects of analog filter amplitude deviation and group delay deviation, enabling data error rate characteristics to be improved.

(6) In a sixth mode of the present invention, in (4) or (5), an antenna that transmits data in a specific subcarrier is switched among a plurality of antennas.

According to this method, in addition to obtaining the effect in (4) or (5), peak power can be reduced, and it is also possible to prevent the reception level of a specific subcarrier remaining low when channel fluctuation is very slow.

(7) In a seventh mode of the present invention, in (1) through (6), for the DC point subcarrier, data is transmitted from only one antenna and a null signal is transmitted from another antenna.

According to this method, in addition to obtaining the effects in (1) through (6), data transmitted by the DC point subcarrier, whose error rate characteristics are more susceptible to degradation than those of other subcarriers due to DC offset of the analog circuitry, does not receive interference from a corresponding subcarrier of another OFDM signal, enabling the error rate characteristics of data transmitted by that subcarrier to be improved.

(8) In an eighth mode of the present invention, in (1) through (3), a specific burst signal is transmitted from only one antenna and a null signal is transmitted from another antenna while this burst signal is being transmitted.

According to this method, in addition to obtaining the effects in (1) through (3), a specific burst signal does not receive any interference at all from a transmit signal from another antenna on the propagation path, and therefore receiving-side error rate characteristics for a specific burst signal improve. As a result, error rate characteristics can be greatly improved for only a specific burst signal, making it possible to implement radio communications that have diversity.

(9) In a ninth mode of the present invention, in (8), a specific burst signal is divided into a plurality, and an antenna that transmits a divided burst signal is switched.

According to this method, in addition to obtaining the effect in (8), the number of transmit subcarriers of one antenna can be reduced, enabling the peak power thereof to be reduced.

(10) In a tenth mode of the present invention, a specific burst signal of (8) is taken to be a burst signal for which better quality is required than for other burst signals.

According to this method, in addition to obtaining the effect in (8), if an important burst signal such as a control burst signal or retransmission burst signal, for example, is selected as a specific burst signal, that specific burst signal does not receive any interference at all from a transmit signal from another antenna on the propagation path, and therefore receiving-side error rate characteristics improve. Also, since burst signals such as control burst signals or retransmission burst signals for which better quality is required than for other burst signals constitute a small proportion of all burst signals, there is almost no decrease in transmission efficiency. As a result, the error rate characteristics can be greatly improved without much decrease in transmission efficiency.

(11) In an eleventh mode of the present invention, the OFDM communication method of (8) is applied only to uplink communications.

According to this method, in the OFDM communication method in (8), transmission efficiency falls to the extent that while a specific burst signal is being transmitted, a null signal is transmitted from another antenna. Taking this into consideration, in this mode, the method in (8) is not used for a downlink in which there is a large volume of transmission data, but is used only for an uplink. As a result, a fall in overall system throughput is suppressed, and the error rate characteristics of a specific burst signal transmitted by means of an uplink can be improved without increasing the hardware scale of a terminal station.

(12) A twelfth mode of the present invention is an OFDM communication method whereby OFDM signals on which different data are superimposed are transmitted from a plurality of antennas, propagation path estimation precision when a transmitted OFDM signal is received is found, and if that propagation path estimation precision is lower than a predetermined threshold value, an OFDM signal is transmitted from only one antenna of the plurality of antennas.

According to this method, it is possible to suppress degradation of error rate characteristics in a propagation environment in which propagation path estimation precision is poor.

(13) In a thirteenth mode of the present invention, in (12), when an OFDM signal is received, propagation path characteristics between antennas are found based on a known signal superimposed on that OFDM signal, and propagation path estimation precision is found based on the size of an inverse matrix determinant absolute value when those propagation path characteristics are expressed as matrix constituents.

According to this method, the fact that when an inverse matrix determinant absolute value is small, the actual value of the number of operation bits is small, and therefore the precision of compensation by an interference compensation section falls and error rate characteristics degrade, is taken into consideration, and an OFDM signal is transmitted from only one antenna when an inverse matrix determinant absolute value is small. As a result, it is possible to suppress degradation of error rate characteristics in a propagation environment in which the precision of compensation by an interference compensation section is low.

(14) In a fourteenth mode of the present invention, in (13), a threshold value decision is made for the size of an inverse matrix determinant absolute value, and if the inverse matrix determinant absolute value is smaller than the threshold value, an OFDM signal is transmitted from only one antenna of a plurality of antennas, and also, that threshold value is varied according to the OFDM signal reception quality.

According to this method, as the detection error of an inverse matrix determinant absolute value increases when channel quality is poor, when channel quality is poor the aforementioned threshold value is made a large value. That is to say, control is performed in the direction of transmitting an OFDM signal from only one antenna. As a result, reception quality is also taken into consideration, and it is possible to greatly and unerringly suppress degradation of error rate characteristics, and to suppress an unnecessary decrease in transmission efficiency.

(15) In a fifteenth mode of the present invention, in (13), a threshold value decision is made for the size of an inverse matrix determinant absolute value using a first threshold value, and if the number of subcarriers for which an inverse matrix determinant absolute value is smaller than the first threshold value is greater than a second threshold value, an OFDM signal is transmitted from only one antenna of a plurality of antennas.

According to this method, the fact is taken into consideration that, while it is possible to improve error rate characteristics through the error correction effect of a decoding section when there are few subcarriers for which an inverse matrix determinant absolute value is small, there can be no great expectation of an error rate correction effect by the decoding section when there are many subcarriers for which an inverse matrix determinant absolute value used is small, and thus an OFDM signal is transmitted from only one antenna when there are many such subcarriers. As a result, it is possible to improve error rate characteristics while achieving transmission efficiency.

(16) In a sixteenth mode of the present invention, in (13), a threshold value decision is made for the size of an inverse matrix determinant absolute value, and if the number of consecutive subcarriers for which an inverse matrix determinant absolute value is smaller than the threshold value is greater than or equal to a predetermined number, an OFDM signal is transmitted from only one antenna of a plurality of antennas.

According to this method, the fact that the effectiveness of error correction decreases when data of poor quality is concentrated is taken into consideration, and an OFDM signal is transmitted from only one antenna in the case of a propagation environment in which there are consecutive subcarriers for which an inverse matrix determinant absolute value is small—that is, when subcarriers of poor quality are concentrated. As a result, it is possible to improve error rate characteristics while achieving transmission efficiency.

(17) In a seventeenth mode of the present invention, in (16), the threshold value used for determining whether or not the number of consecutive subcarriers for which an inverse matrix determinant absolute value is smaller than a threshold value is greater than or equal to a predetermined number is varied according to the OFDM signal reception quality.

According to this method, in addition to obtaining the effect in (16), reception quality is also taken into consideration in controlling whether or not an OFDM signal is to be transmitted from only one antenna, making it possible to greatly improve error rate characteristics while achieving transmission efficiency.

(18) In an eighteenth mode of the present invention, in (1), (3), or (12), a burst signal transmitted last within a predetermined communication unit period is transmitted as an OFDM signal from only one antenna of a plurality of antennas.

According to this method, the fact that the processing delay of a receiving-side interference compensation circuit is greater than that of an ordinary coherent detection circuit is taken into consideration, and the processing delay of the last burst signal can be shortened by transmitting the last burst signal to be transmitted as an OFDM signal from only one antenna. As a result, the time from terminating reception to starting transmission can be shortened, which is extremely useful in a system for which this time is stipulated.

(19) In a nineteenth mode of the present invention, in (1), (3), or (12), when a communicating-party station is performing OFDM communication with another station in addition to the local station, an OFDM signal is transmitted to the communicating-party station from only one antenna of a plurality of antennas.

According to this method, it unnecessary to secure by means of complex control a time period in which communication is performed between terminals.

(20) A twentieth mode of the present invention is an OFDM communication method where by OFDM signals on which different data are superimposed are transmitted from a plurality of antennas, wherein OFDM signals are normally transmitted from a plurality of antennas, and periodically, OFDM signals are transmitted from only one antenna.

According to this method, periodical updating of propagation path estimation results (propagation path tracking) can be performed on the receiving side, making it possible to suppress degradation of error rate characteristics when propagation path fluctuation is fast relative to the propagation path estimation preamble interval.

(21) In a twenty-first mode of the present invention, in (20), the period for transmitting OFDM signals from only one antenna of a plurality of antennas is varied according to the required transmission efficiency, required reception quality, or propagation path fluctuation speed.

According to this method, in addition to obtaining the effect of (20), it is possible to greatly suppress degradation of error rate characteristics while effectively suppressing a decrease in transmission efficiency.

(22) A twenty-second mode of the present invention employs a configuration comprising a plurality of antennas, an OFDM signal forming section that forms a plurality of OFDM signals transmitted from a plurality of antennas by executing orthogonal frequency division multiplexing processing of a plurality of transmit data, a known signal insertion section that inserts a known signal into a predetermined subcarrier of each OFDM signal, and a null signal insertion section that inserts a null signal in a predetermined subcarrier of each OFDM signal, wherein the known signal insertion section inserts a known signal into one OFDM signal of a plurality of OFDM signals, and the null signal insertion section inserts a null signal in a subcarrier of a frequency band corresponding to a subcarrier in which a known signal is inserted in an OFDM signal other than an OFDM signal in which a known signal is inserted by the known signal insertion section.

According to this configuration, it is possible to prevent interference on a propagation path of a pilot carrier on which a known signal is placed, enabling highly precise residual phase error to be detected on the receiving side. As a result, a received signal with improved error rate characteristics can be obtained.

(23) A twenty-third mode of the present invention employs a configuration comprising a plurality of antennas, an OFDM signal forming section that forms a plurality of OFDM signals transmitted from a plurality of antennas by executing orthogonal frequency division multiplexing processing of a plurality of transmit data, a known signal insertion section that inserts a known signal into a predetermined subcarrier of each OFDM signal, and a null signal insertion section that inserts a null signal in a predetermined subcarrier of each OFDM signal, wherein the known signal insertion section inserts a known signal in subcarriers of different frequency bands of a plurality of OFDM signals, and the null signal insertion section inserts a null signal in a subcarrier of another OFDM signal of a frequency band corresponding to a subcarrier in which a known signal is inserted in a particular OFDM signal.

According to this configuration, it is possible to prevent interference on a propagation path of a pilot carrier on which a known signal is placed, enabling highly precise residual phase error to be detected on the receiving side and a received signal with improved error rate characteristics to be obtained, and additionally making it possible to reduce the peak power of OFDM signals transmitted from each antenna.

(24) A twenty-fourth mode of the present invention is an OFDM communication system employing a configuration that has a first OFDM communication apparatus that forms a plurality of OFDM signals on which different transmit data are superimposed and transmits a plurality of OFDM signals from a plurality of antennas, and a second OFDM communication apparatus that receives a plurality of OFDM signals using a plurality of antennas, wherein the second OFDM communication apparatus comprises a propagation path characteristic calculation section that calculates a plurality of propagation path characteristics between a plurality of antennas based on a plurality of OFDM received signals, and a decision section that decides the precision of a calculated propagation path characteristic; and the first OFDM communication apparatus transmits an OFDM signal from only one antenna of a plurality of antennas when the precision of a found propagation path characteristic is lower than a predetermined value based on a decision result of the decision section.

According to this configuration, it is possible to suppress degradation of error rate characteristics in a propagation environment in which propagation path estimation precision is poor.

(25) A twenty-fifth mode of the present invention employs a configuration comprising a plurality of antennas, an OFDM signal forming section that forms a plurality of OFDM signals transmitted from a plurality of antennas by executing orthogonal frequency division multiplexing processing of a plurality of transmit data, and a transmission control section that normally transmits a plurality of OFDM signals from a plurality of antennas and periodically transmits an OFDM signal from only one antenna of a plurality of antennas.

According to this configuration, periodical updating of propagation path estimation results (propagation path tracking) can be performed on the receiving side, making it possible to suppress degradation of error rate characteristics when propagation path fluctuation is fast relative to the propagation path estimation preamble interval.

(26) A twenty-sixth mode of the present invention is an OFDM communication method whereby a plurality of OFDM signals on which different data are superimposed are transmitted simultaneously from a plurality of antennas, wherein for subcarriers of the same frequency of the same time among the aforementioned plurality of OFDM signals, the aforementioned propagation path estimation known signal is placed on one subcarrier and a null signal is placed on another subcarrier, and the aforementioned propagation path estimation known signal is placed on at least one subcarrier in each OFDM signal.

According to this method, a propagation path estimation known signal is placed on at least one subcarrier among a plurality of subcarriers of the same time in each OFDM signal, and therefore all of the plurality of OFDM signals have a propagation path estimation known signal of the same time. As a result, residual phase error at the time of reception of propagation path estimation known signals of each OFDM signal is extremely small, and if propagation path estimates are found based on these propagation path estimation known signals and propagation path compensation is performed based thereupon, it is possible to obtain received signals with improved error rate characteristics.

(27) A twenty-seventh mode of the present invention employs a configuration comprising a signal insertion section that inserts a propagation path estimation known signal and null signal at predetermined positions in a plurality of different transmit data, an OFDM signal forming section that forms a plurality of OFDM signals by executing orthogonal frequency division multiplexing processing on each transmit data in which the aforementioned propagation path estimation known signal and null signal are inserted, and a plurality of antennas that transmit OFDM signals, wherein, for subcarriers transmitted at the same time among a plurality of OFDM signals, the signal insertion section inserts the aforementioned propagation path estimation known signal and null signal at positions such that, when the aforementioned propagation path estimation known signal is placed on a subcarrier of a particular OFDM signal, a null signal is placed on a subcarrier corresponding thereto of another OFDM signal and the aforementioned propagation path estimation known signal is placed on at least one subcarrier of each OFDM signal.

According to this configuration, in subcarriers of the same time and the same frequency in a plurality of OFDM signals transmitted at the same time, a propagation path estimation known signal is placed in a particular OFDM signal, and a null signal is placed in another OFDM signal, with the result that the propagation path estimation known signal of a particular OFDM signal does not receive interference from another OFDM signal. In addition, as a propagation path estimation known signal is placed on at least one subcarrier among a plurality of subcarriers of the same time in each OFDM signal, all of the plurality of OFDM signals have a propagation path estimation known signal of the same time.

As a result, residual phase error at the time of reception of propagation path estimation known signals of each OFDM signal is extremely small, and if propagation path estimates are found based on these propagation path estimation known signals and propagation path compensation is performed based thereupon, it is possible to obtain received signals with improved error rate characteristics.

(28) A twenty-eighth mode of the present invention employs a configuration wherein the signal insertion section in (27) inserts in subcarriers of the same time in the aforementioned plurality of OFDM signals the aforementioned propagation path estimation known signal and null signal so that the propagation path estimation known signals are placed virtually uniformly between OFDM signals.

According to this configuration, in OFDM signals whereby a plurality of subcarriers are transmitted at the same time, a propagation path estimation known signal is placed on a plurality of subcarriers for each OFDM signal, making it possible for propagation path estimates to be found much more accurately, and enabling error rate characteristics to be greatly improved.

For example, to consider a case in which two OFDM signals are transmitted, each having 10 subcarriers, for subcarriers of the same time, in the first OFDM signal a propagation path estimation known signal is placed on five subcarriers and a null signal is placed on five subcarriers, and in the second OFDM signal a propagation path estimation known signal is placed on the five subcarriers on which a null signal is placed in the first OFDM signal and a null signal is placed on the five subcarriers on which a propagation path estimation known signal is placed in the first OFDM signal. In this way, it is possible to perform deviation-free propagation path compensation based on the same number of propagation path estimation known signals for the first OFDM signal and the second OFDM signal. Also, for subcarriers on which a null signal is placed but no propagation path estimation known signal is placed, if there are a certain number of propagation path estimation known signals, these can be used to perform interpolation with good precision.

(29) A twenty-ninth mode of the present invention employs a configuration wherein the signal insertion section in (27) inserts the aforementioned propagation path estimation known signal and null signal in each OFDM signal so that subcarriers on which the aforementioned propagation path estimation known signal and null signal are placed vary at time intervals.

According to this configuration, it is possible to greatly improve error rate characteristics when the multipath delay time is long (when mild multipath fluctuation occurs). Here, OFDM signal subcarriers each undergo different fading due to frequency selective fading according to the multipath conditions. When the multipath delay time is long, only the same subcarriers undergo frequency selective fading for a long period, and if propagation path estimation known signals are placed on these subcarriers, propagation path compensation cannot be performed satisfactorily. Taking this into consideration, in the present invention subcarriers on which propagation path estimation known signals are placed are varied at time intervals, making it possible to prevent degradation of the error rate of specific subcarriers even when multipath fluctuation is mild.

(30) A thirtieth mode of the present invention employs a configuration comprising a signal insertion section that inserts a propagation path estimation known signal at predetermined positions in a plurality of different transmit data, an OFDM signal forming section that forms a plurality of OFDM signals by executing orthogonal frequency division multiplexing processing on each transmit data in which the aforementioned propagation path estimation known signal is inserted, and a plurality of antennas that transmit OFDM signals, wherein the signal insertion section inserts the aforementioned propagation path estimation known signal so that two propagation path estimation known signal symbols are placed consecutively as an OFDM signal supplied to a specific antenna, and inserts the propagation path estimation known signal at positions such that the propagation path estimation known signal is placed with one symbol temporally immediately before and one symbol temporally immediately after the aforementioned two consecutive propagation path estimation known signal symbols as an OFDM signal supplied to another antenna.

According to this configuration, upon combination at the time of reception of the propagation path estimation known signals in an OFDM signal in which two consecutive propagation path estimation known signal symbols are placed and another OFDM signal in which propagation path estimation known signals are placed prior and subsequent thereto, residual phase error occurring between the propagation path estimation known signals is canceled, enabling propagation path characteristics free of residual phase error to be found for each. As a result, it is possible to obtain a received signal with an improved error rate.

(31) A thirty-first mode of the present invention employs a configuration wherein the signal insertion section in (27) inserts the aforementioned propagation path estimation known signal so that two or more propagation path estimation known signal symbols are placed within a unit transmit signal interval containing a signal subjected to propagation path compensation by means of the propagation path estimation known signal, and inserts the propagation path estimation known signal at a position such that a subcarrier on which the propagation path estimation known signal is placed varies according to each symbol.

According to this configuration, considering the unit transmit signal interval in one OFDM signal, a propagation path estimation known signal of two symbols or more is placed so as to be distributed over a plurality of subcarriers, making it possible for data superimposed on a plurality of subcarriers using this propagation path estimation known signal to undergo thorough propagation path compensation, and enabling the overall error rate to be greatly improved.

(32) A thirty-second mode of the present invention is an OFDM communication apparatus that receives OFDM signals transmitted by the OFDM communication apparatus in (27), and has a configuration comprising a plurality of antennas that receive aforementioned OFDM signals, a propagation path estimation section that estimates propagation path characteristics between the aforementioned plurality of antennas and the plurality of antennas of the OFDM communication apparatus in (27) based on aforementioned propagation path estimation known signals contained in received signals received by the antennas, an interpolation section that interpolates propagation path characteristics of subcarriers on which a null signal is placed using the propagation path characteristics of adjacent subcarriers on which aforementioned propagation path estimation known signals are placed, and a propagation path compensation section that executes propagation path compensation for signals allocated to subcarriers using the aforementioned propagation path characteristics.

According to this configuration, highly precise propagation path compensation can be performed for subcarriers on which a propagation path estimation known signal is placed, using that propagation path estimation known signal. Moreover, highly precise propagation path compensation can also be performed for subcarriers on which a null signal is placed, by performing propagation path compensation using propagation path characteristics interpolated by means of propagation path estimation known signals placed on adjacent subcarriers of the same time. As a result, the error rate can be improved for all subcarriers.

This application is based on Japanese Patent Application No. 2002-107105 filed on Apr. 9, 2002, and Japanese Patent Application No. 2002-106059 filed on Apr. 9, 2002, entire content of which is expressly incorporated by reference herein.

INDUSTRIAL APPLICABILITY

The present invention is suitable for application to a case where communication combining OFDM communication and multi-antenna communication is performed.

The invention claimed is:

1. An orthogonal frequency division multiplexing (OFDM) communication apparatus comprising:
a plurality of antennas;
an OFDM signal forming section that forms a plurality of OFDM signals transmitted from the plurality of antennas by executing OFDM processing of a plurality of transmit data; and
a selection section that selects whether to insert a known signal or a null signal in a predetermined subcarrier of each OFDM signal in a cycle of predetermined time, wherein:
during a first cycle of time, the selection section inserts a known signal in a subcarrier of a first OFDM signal for transmission by a first antenna and inserts a null signal in a corresponding subcarrier of a second OFDM signal for transmission by a second antenna, such that the corresponding subcarriers within the first cycle of time have the same frequency band,
during a second cycle of time that does not overlap the first cycle of time, the selection section inserts a null signal in a subcarrier of a third OFDM signal for transmission by the first antenna and inserts a known signal in a corresponding subcarrier of a fourth OFDM signal for transmission by the second antenna, such that the corresponding subcarriers within the second cycle of time have the same frequency band,
the subcarrier conveying the known signal within the first OFDM signal has the same frequency band as the subcarrier conveying the null signal in the third OFDM signal, and
the subcarrier conveying the null signal in the second OFDM signal has the same frequency band as the subcarrier conveying the known signal in the fourth OFDM signal.

2. An orthogonal frequency division multiplexing (OFDM) communication method comprising the steps of:
forming a plurality of OFDM signals transmitted from a plurality of antennas by executing OFDM processing of each of a plurality of transmit data;
inserting, during a first cycle of time, a known signal in a subcarrier of a first OFDM signal for transmission by a first antenna and inserting a null signal in a corresponding subcarrier of a second OFDM signal for transmission by a second antenna, such that the corresponding subcarriers within the first cycle of time have the same frequency band; and
inserting, during a second cycle of time that does not overlap the first cycle of time, a null signal in a subcarrier of a third OFDM signal for transmission by the first antenna and inserting a known signal in a corresponding subcarrier of a fourth OFDM signal for transmission by the second antenna, such that the corresponding subcarriers within the second cycle of time have the same frequency band, wherein:
the subcarrier conveying the known signal within the first OFDM signal has the same frequency band as the subcarrier conveying the null signal in the third OFDM signal, and
the subcarrier conveying the null signal in the second OFDM signal has the same frequency band as the subcarrier conveying the known signal in the fourth OFDM signal.

* * * * *

UNITED STATES PATENT AND TRADEMARK OFFICE
CERTIFICATE OF CORRECTION

PATENT NO. : 7,463,577 B2
APPLICATION NO. : 10/488610
DATED : December 9, 2008
INVENTOR(S) : Hiroaki Sudo et al.

It is certified that error appears in the above-identified patent and that said Letters Patent is hereby corrected as shown below:

Title Page Item 73, Assignee, incorrectly reads:

"Panasonic Corporation, Osaka (JP)"

and should read:

"Panasonic Mobile Communications Co., Ltd., Kanagawa (JP);
Nippon Telegraph and Telephone Corporation, Tokyo (JP)"

Signed and Sealed this
Seventeenth Day of May, 2011

David J. Kappos
*Director of the United States Patent and Trademark Office*